United States Patent
Vandenberg

(10) Patent No.: US 8,955,210 B2
(45) Date of Patent: Feb. 17, 2015

(54) FASTENER, INSTALLATION TOOL AND RELATED METHOD OF USE

(75) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 33 days.

(21) Appl. No.: 13/452,581

(22) Filed: Apr. 20, 2012

(65) Prior Publication Data

US 2012/0204409 A1  Aug. 16, 2012

Related U.S. Application Data

(63) Continuation-in-part of application No. 12/908,549, filed on Oct. 20, 2010, and a continuation-in-part of application No. 12/908,531, filed on Oct. 20, 2010.

(60) Provisional application No. 61/480,399, filed on Apr. (Continued)

(51) Int. Cl.
 *B25C 3/00* (2006.01)
 *B25B 21/02* (2006.01)
 *B23P 11/00* (2006.01)
 (Continued)

(52) U.S. Cl.
 CPC .............. *B25B 23/00* (2013.01); *B25B 21/002* (2013.01); *B25B 23/005* (2013.01); *F16B 25/0015* (2013.01); *F16B 25/0063* (2013.01); *F16B 25/0073* (2013.01); *F16B 25/103* (2013.01)
 USPC ......... 29/525.11; 29/525.01; 29/456; 29/464; 173/1; 81/44

(58) Field of Classification Search
 USPC .............. 81/44; 29/525.01, 525.11, 456, 464, 29/243.5, 243.526; 173/1; 52/581, 582.1, 52/583.1, 587.1
 See application file for complete search history.

(56) References Cited

U.S. PATENT DOCUMENTS 126,366 A  4/1872 Wills
137,414 A  4/1873 Burdick
(Continued)

FOREIGN PATENT DOCUMENTS

CA  1242601  10/1988
CH  695482  6/2006
(Continued)

OTHER PUBLICATIONS

English Translation of German Patent DE 4331689 to Nishimura.*
(Continued)

*Primary Examiner* — Essama Omgba
*Assistant Examiner* — Darrell C Ford
(74) *Attorney, Agent, or Firm* — Warner Norcross & Judd LLP

(57) ABSTRACT

A fastener installation tool and related method are provided for installing fasteners in boards, where the boards are installed immediately adjacent one another, without a gap established therebetween. The tool can include an alignment projection that projects a preselected distance downwardly from a lower surface of the tool. The alignment projection can be disposed between opposing corners of first and second boards to install a fastener without establishing a gap between the boards. This construction can be suitable for installing boards constructed from materials that shrink over time, such as wet, treated lumber or other materials, and even non-shrinkable boards where tighter spacing is desired. A related method of installation is provided.

18 Claims, 35 Drawing Sheets

Related U.S. Application Data 29, 2011, provisional application No. 61/546,882, filed on Oct. 13, 2011, provisional application No. 61/294,681, filed on Jan. 13, 2010, provisional application No. 61/320,128, filed on Apr. 1, 2010.

(51) Int. Cl.
| | |
|---|---|
| B23P 17/00 | (2006.01) |
| B21D 39/00 | (2006.01) |
| B23P 19/00 | (2006.01) |
| B25B 23/00 | (2006.01) |
| B25B 21/00 | (2006.01) |
| F16B 25/00 | (2006.01) |
| F16B 25/10 | (2006.01) |

(56) References Cited

U.S. PATENT DOCUMENTS

| | | | |
|---|---|---|---|
| 138,784 | A | 5/1873 | Bourn |
| 411,202 | A | 9/1889 | Rose |
| 877,831 | A | 1/1908 | Creedon |
| 984,323 | A | 2/1911 | Vauclain |
| 1,016,383 | A * | 2/1912 | Wellman ............ 81/44 |
| 1,074,800 | A | 10/1913 | King |
| 2,774,969 | A | 12/1956 | Samples |
| 2,878,845 | A * | 3/1959 | Hale ............ 52/749.1 |
| 2,994,878 | A | 8/1961 | Abrahamsen |
| 3,010,496 | A * | 11/1961 | Bruce ............ 81/44 |
| 3,012,247 | A | 12/1961 | Sillars |
| 3,147,484 | A | 9/1964 | Nelson |
| 3,177,755 | A | 4/1965 | Kahn |
| 3,207,023 | A | 9/1965 | Knohl |
| 3,316,949 | A | 5/1967 | Canfield |
| 3,357,295 | A | 12/1967 | Smith |
| 3,360,176 | A * | 12/1967 | Gehl et al. ............ 227/148 |
| 3,738,218 | A | 6/1973 | Gutshall |
| 3,942,405 | A | 3/1976 | Wagner |
| 4,018,254 | A | 4/1977 | DeCaro |
| 4,068,554 | A | 1/1978 | Hirabayashi |
| 4,123,186 | A | 10/1978 | Hoadley |
| 4,146,071 | A | 3/1979 | Mueller et al. |
| 4,209,275 | A | 6/1980 | Kim |
| 4,241,638 | A | 12/1980 | Shimizu et al. |
| 4,323,326 | A | 4/1982 | Okada et al. |
| 4,329,099 | A | 5/1982 | Shimizu et al. |
| 4,439,077 | A | 3/1984 | Godsted |
| 4,572,720 | A | 2/1986 | Rockenfeller et al. |
| 4,586,862 | A | 5/1986 | Yamasaki |
| 4,625,597 | A | 12/1986 | Cast |
| 4,653,244 | A | 3/1987 | Farrell |
| 4,834,602 | A | 5/1989 | Takasaki |
| 4,930,225 | A * | 6/1990 | Phillips ............ 33/526 |
| 5,015,134 | A | 5/1991 | Gotoh |
| 5,083,483 | A | 1/1992 | Takagi |
| 5,188,496 | A | 2/1993 | Giannuzzi |
| 5,282,708 | A | 2/1994 | Giannuzzi |
| 5,302,205 | A * | 4/1994 | Priddy ............ 118/406 |
| 5,322,396 | A | 6/1994 | Blacker |
| 5,337,635 | A | 8/1994 | Habermehl |
| 5,341,706 | A | 8/1994 | Takagi |
| 5,351,586 | A | 10/1994 | Habermehl et al. |
| 5,452,630 | A | 9/1995 | Haas et al. |
| 5,469,767 | A | 11/1995 | Habermehl |
| 5,531,142 | A | 7/1996 | Adamo |
| 5,531,143 | A | 7/1996 | Habermehl et al. |
| 5,568,753 | A | 10/1996 | Habermehl et al. |
| 5,570,618 | A | 11/1996 | Habermehl et al. |
| 5,687,624 | A | 11/1997 | Tsuge et al. |
| D391,135 | S | 2/1998 | Habermehl et al. |
| 5,839,332 | A | 11/1998 | Fujiyama et al. |
| 5,871,486 | A | 2/1999 | Huebner et al. |
| 5,884,541 | A | 3/1999 | Habermehl et al. |
| 5,904,079 | A | 5/1999 | Tsuge et al. |
| 5,918,512 | A | 7/1999 | Habermehl et al. |
| 5,927,163 | A | 7/1999 | Habermehl et al. |
| 5,934,162 | A | 8/1999 | Habermehl |
| 5,988,025 | A | 11/1999 | Sasaki et al. |
| 6,027,004 | A | 2/2000 | Ramella et al. |
| 6,089,132 | A | 7/2000 | Habermehl |
| 6,098,442 | A | 8/2000 | Walldorf et al. |
| 6,109,144 | A | 8/2000 | Muro |
| 6,109,146 | A | 8/2000 | Muro |
| 6,158,939 | A | 12/2000 | Grossberndt et al. |
| 6,244,140 | B1 | 6/2001 | Habermehl |
| 6,296,433 | B1 | 10/2001 | Forsell et al. |
| 6,322,307 | B1 | 11/2001 | Glover |
| 6,328,516 | B1 | 12/2001 | Hettich |
| 6,332,741 | B1 | 12/2001 | Janusz |
| 6,345,940 | B2 | 2/2002 | Anjanappa et al. |
| 6,394,712 | B1 | 5/2002 | Weinstein et al. |
| 6,425,306 | B1 | 7/2002 | Habermehl |
| 6,439,085 | B1 | 8/2002 | Habermehl |
| 6,453,780 | B2 | 9/2002 | Habermehl |
| 6,481,937 | B1 | 11/2002 | Sommerfeld et al. |
| 6,514,026 | B1 | 2/2003 | Gerhard |
| 6,592,015 | B1 | 7/2003 | Gostylla et al. |
| 6,601,480 | B1 | 8/2003 | Habermehl |
| 6,604,901 | B1 | 8/2003 | Grossberndt et al. |
| 6,623,228 | B1 | 9/2003 | Hettich et al. |
| 6,666,638 | B2 | 12/2003 | Craven |
| 6,769,332 | B2 | 8/2004 | Muro |
| 6,843,402 | B2 | 1/2005 | Sims et al. |
| 6,915,724 | B2 | 7/2005 | Kigel et al. |
| 6,941,635 | B2 | 9/2005 | Craven |
| 6,941,847 | B2 | 9/2005 | Habermehl et al. |
| 7,021,010 | B2 * | 4/2006 | Smith et al. ............ 52/169.12 |
| 7,037,059 | B2 | 5/2006 | Dicke |
| 7,044,460 | B2 | 5/2006 | Bolton |
| 7,066,278 | B2 * | 6/2006 | Shotey ............ 173/20 |
| 7,156,600 | B2 | 1/2007 | Panasik et al. |
| 7,165,481 | B2 | 1/2007 | Kikuchi |
| 7,231,854 | B2 | 6/2007 | Kikuchi |
| 7,344,057 | B2 | 3/2008 | Dion et al. |
| 7,424,840 | B1 | 9/2008 | Huang |
| 7,454,996 | B2 | 11/2008 | Hsu |
| 7,487,699 | B2 | 2/2009 | Xu |
| 7,682,119 | B2 | 3/2010 | Chen |
| 7,695,228 | B2 | 4/2010 | Craven |
| D614,942 | S | 5/2010 | Gaudron |
| 7,866,236 | B2 | 1/2011 | Hsu |
| RE42,207 | E | 3/2011 | Janusz |
| D637,071 | S | 5/2011 | Gaudron et al. |
| 7,950,312 | B2 | 5/2011 | Matthiesen et al. |
| 7,992,469 | B2 | 8/2011 | Chang et al. |
| 8,162,196 | B2 | 4/2012 | Gasser et al. |
| 8,192,124 | B2 | 6/2012 | Wolpert et al. |
| D662,808 | S | 7/2012 | Vandenberg |
| 8,261,507 | B2 * | 9/2012 | Hahn et al. ............ 52/592.1 |
| D677,147 | S | 3/2013 | Vandenberg |
| 2003/0235483 | A1 | 12/2003 | Chen |
| 2004/0141827 | A1 | 7/2004 | Dicke |
| 2004/0144056 | A1 * | 7/2004 | Morton et al. ............ 52/650.3 |
| 2005/0247751 | A1 * | 11/2005 | Wywialowski et al. ............ 227/136 |
| 2005/0265806 | A1 | 12/2005 | Craven |
| 2005/0278934 | A1 * | 12/2005 | Orchard ............ 29/525.11 |
| 2006/0196682 | A1 * | 9/2006 | McGee et al. ............ 173/1 |
| 2007/0079978 | A1 * | 4/2007 | Miller et al. ............ 173/1 |
| 2007/0128001 | A1 | 6/2007 | Su |
| 2007/0175176 | A1 * | 8/2007 | Lane ............ 52/749.1 |
| 2007/0217887 | A1 | 9/2007 | Lin |
| 2007/0261350 | A1 * | 11/2007 | Hahn et al. ............ 52/582.1 |
| 2008/0025816 | A1 | 1/2008 | Chen et al. |
| 2008/0080951 | A1 | 4/2008 | Lin |
| 2008/0168735 | A1 * | 7/2008 | Guevremont ............ 52/585.1 |
| 2008/0264218 | A1 | 10/2008 | Wang et al. |
| 2008/0276761 | A1 | 11/2008 | Hale et al. |
| 2008/0296341 | A1 | 12/2008 | Francescon |
| 2009/0142159 | A1 | 6/2009 | Wolpert et al. |
| 2009/0314143 | A1 | 12/2009 | Chen |
| 2010/0083610 | A1 * | 4/2010 | King ............ 52/749.1 |
| 2010/0181362 | A1 * | 7/2010 | Martel et al. ............ 227/120 |
| 2011/0167757 | A1 * | 7/2011 | Vandenberg ............ 52/745.21 |
| 2011/0170984 | A1 | 7/2011 | Vandenberg |

(56) References Cited

U.S. PATENT DOCUMENTS

| | | | |
|---|---|---|---|
| 2011/0214377 A1* | 9/2011 | Tucker, Jr. | 52/403.1 |
| 2011/0232430 A1 | 9/2011 | Hale | |
| 2011/0303725 A1* | 12/2011 | Schaer et al. | 227/132 |
| 2012/0000327 A1 | 1/2012 | Park | |
| 2012/0048909 A1 | 3/2012 | Gensmann et al. | |
| 2012/0073410 A1 | 3/2012 | Hoffman et al. | |
| 2012/0204409 A1* | 8/2012 | Vandenberg | 29/468 |
| 2013/0051955 A1 | 2/2013 | Su et al. | |
| 2013/0174498 A1* | 7/2013 | Hovren | 52/105 |
| 2014/0033508 A1* | 2/2014 | Haug et al. | 29/525.01 |
| 2014/0137509 A1* | 5/2014 | Vandenberg | 52/745.21 |
| 2014/0224072 A1* | 8/2014 | Osborn | 81/44 |
| 2014/0260814 A1* | 9/2014 | Bullard | 81/44 |
| 2014/0304973 A1* | 10/2014 | Guthrie et al. | 29/525.11 |

FOREIGN PATENT DOCUMENTS

| | | |
|---|---|---|
| DE | 4228727 | 3/1994 |
| DE | 4331689 | 3/1994 |
| EP | 1595627 | 11/2005 |
| EP | 1920890 | 5/2008 |
| EP | 1932623 | 6/2008 |
| EP | 1938928 | 7/2008 |
| EP | 2258518 | 12/2010 |
| EP | 2397706 | 12/2011 |
| EP | 2076362 | 3/2012 |
| GB | 191001226 | 12/1910 |
| GB | 167620 | 8/1921 |
| GB | 1009630 | 11/1965 |
| GB | 2127927 | 4/1984 |
| JP | 10329049 | 12/1998 |
| WO | 2007091487 | 8/2007 |

OTHER PUBLICATIONS

Fiberon DeckPilot Mar. 2009.
Fiberon DeckPilot Dec. 2009.
Kreg Jig downloaded from http://kregtool.com/products/pht/product.php?PRODUCT_ID=109.
Kreg Jig Jr. downloaded from http://kregtool.com/products/phtlproduct.php?PRODUCT_ID=32.
Kreg Micro Pocket Drill Guide downloaded from http://kregtool.com/products/pht/product.php?PRODUCT_ID=113.
Bostitch Miiifn—Hardwood Flooring Cleat Nailer downloaded from http://www.bostitch.com/default.asp?Category=Flooring+Nailers&Type=PRO. . . .
Fastening Deck Boards by Kim Katwijk and Linda Katwijk; Sep. 1, 2009; Professional Deck Builder; Sep.-Oct. 2009; pp. 1-6.

* cited by examiner

FASTENER, INSTALLATION TOOL AND RELATED METHOD OF USE

BACKGROUND OF THE INVENTION

The present invention relates to fasteners, and more particularly to a side angled fastener, an installation tool and a related method of use.

There are a variety of commercially available fasteners that are designed to fasten a work piece, such as a wooden board or a composite element, to a substrate, such as a subfloor, joist or other underlying support structure. In many cases, these fasteners are in the form of threaded screws including: a large, bugle-shaped head to which an installation drive attaches (for example, a Phillips or star drive screw head); a shaft that projects from the head; threads on the shaft, and a conical, sharpened point, which centers the screw on a location, and initially pierces the board so that the screw can advance into it. These types of screws are typically drilled downward, in an orthogonal manner, into the top of a board to fasten the board to an underlying support, such as a joist. Most of the holding power of such screws come from the bugle-shaped head engaging the board.

Another type of screw includes the above features, that is, a large, bugle-shaped head that provides holding force, and a threaded shaft. However, instead of a sharpened conical point, these screws include a point having surfaces that meet at an acute angle between 15° and 35° to form a point. The acute angle of the surfaces enables the screw point to drill into a wood structure. While the acutely angled surfaces of such a screw can pre-drill a hole for the screw, the acutely angled surfaces also rapidly cut or drill into the wood. Accordingly, as soon as the first full threads engage the wood, they begin to quickly advance or feed the screw into the wood. This rapid advancement, caused by the threads twisting and subsequently thrusting the screw forward, sometimes leads to inadvertent splitting of the wood via a wedging action of the shaft and threads in the wood.

Recently, there have been developments in construction techniques and fastener technology that attach boards to a subfloor or underlying joist with screws, but that attempt to conceal the heads of those screws. This is achieved by advancing the screws at an angle through the sides of the boards, rather than the exposed upper surface or tops of the boards, and subsequently into an underlying support structure. When boards are placed side-by-side one another, these "side angled screws" are relatively unnoticeable by an observer looking straight down at the boards. Of course, at an angled view of the board, where portions of the sides of the boards may be visible, the screw heads may be somewhat visible, but usually not overly conspicuous.

An issue with conventional side angled screws concerns their configuration and the manner in which they advance into a work piece. Side angled screws typically include a conical, pointed tip. As soon as this pointed tip penetrates the board, the screw threads bite into the board, and rapidly draw the screw into the side of the board. As this occurs, the screw shaft is drawn between the grains or fibers or pieces of the board (depending on whether the board is constructed from wood or a composite). The drawing of the shaft between the grains or fibers frequently causes the lower corner of the board to splinter from the remainder of the board (if wooden) or to bulge out the lower corner of the board (if composite) due to the wedging action of the shaft and threads in the corner. Thus, conventional side angled screws can tend to damage the corner of the board into which they are advanced, particularly if they are imprecisely positioned or angled, or advanced too quickly into the board, or if the board is weak or dense. Typically, this will reduce the holding strength of the screw, which of course, is undesirable. Accordingly, there remains room for improving such fasteners.

To compliment side angled screws which include conical, pointed tips, certain tools have been developed to facilitate their installation. Generally, these tools include a jig, with a plate that sets atop a board to be fastened down, and a bore guide that generally aims the screw toward the side of the board into which the fastener is advanced. One specific tool includes a jig body that rests atop a board, a handle, and pins that extend downward from a flat bottom of the jig body, and that are configured to be positioned adjacent opposite sides of the board. The pins also position the fastened board a distance from the next adjacent board so that there is a notable gap between the boards. The jig body bore guide is disposed at an angle, and generally aimed at a location that is intended to correspond to the side of a board. The bore, however, is located a distance away from the side of the board, generally above the pins, and terminates at the bottom of the jig body. Because the bore terminates at the jig body, its end is located above the upper or top surface of the board, which is a good distance from the location where the tip first engages the side of the board.

While this tool can be used to install pointed end screws, it suffers some shortcomings. For example, because the bore guide is distanced from the side of the board, screws advanced through the bore sometimes are placed improperly relative to the lower corner of the board. Accordingly, when the screw is advanced, it can split off the lower corner of the board. Further, if the tool is not perfectly aligned, the pointed tip of the screw sometimes can grab and pull the screw into the board at an undesirable angle, which can cause the screw to bind against the bore of the jig body and slow its advancement, or cause additional wear and tear on the guide.

In addition, while the pins of the aforementioned tool can help locate the bore guide, those pins can also be a detriment. For example, the boards usually used in projects are of varying widths. The pins of the tool are joined with the jig body in fixed positions. Sometimes, the spacing between the pins is such that it does not match the varying widths of the board. Accordingly, the tool might not fit properly over some overly wide, "outlier" boards in a particular project. Alternatively, where certain boards are overly narrow, the tool may improperly align the bore guide too far from the side of the board, so that the screw misses the board or splinters off its lower corner.

Further, the tools mentioned above typically are used for applications where the boards are spaced a distance from one another so that upon installation, there is a noticeable gap or space between immediately adjacent, installed boards. Where the boards are prone to shrinkage, for example, by the boards drying over time, use of the above tool to install such boards can create unsightly or excessively wide gaps in the structure.

While conventional side angled screws and installation tools exist, there remains room for improvements to both the screws and the tools to better fasten down boards and other items with fasteners driven through the sides of the boards in a manner that generally conceals those fasteners.

SUMMARY OF THE INVENTION

A fastener including an end that pre-bores a hole for the remainder of the screw is provided. This fastener can be in the form of a screw that can be easily and consistently used in screwing operations where the fastener penetrates a surface of a work piece, such as a board or other building material, and optionally fastens the work piece or material to another work piece, article or underlying support structure.

In one embodiment, the fastener can be a screw, for example, a side angled screw, including a head attached to a body. The side angled screw can be adapted to be advanced into the side of a board at an angle. The head can include a drive feature that mates with a corresponding drive tool. The body can include a shaft, threads and an end.

In another embodiment, the screw can include an end that is generally "V" shaped. The end can include a chisel edge or point that is adapted to engage and scrape a surface of a work piece. Inclined surfaces can be opposed to one another across the chisel edge.

In yet another embodiment, the inclined surfaces can be disposed at an angle relative to one another, the chisel edge and/or a work piece into which the screw is advanced. Optionally, the inclined surfaces can be inclined at a negative rake angle when the end is engaged against a work piece. Further optionally, the inclined surfaces can be disposed at an obtuse angle relative to one another, for example, greater than 90° but less than about 180°, or about 135° to about 170°. Even further optionally, the inclined surfaces can be inclined at about 90°±10° relative to one another.

In still another embodiment, the screw end can be configured to scrape material from a work piece to pre-bore a hole for the remainder of the screw. Where included, the threads can auger the scraped material out from the hole to ensure there is sufficient room for the remainder of the screw to enter the hole without splitting or otherwise damaging the work piece adjacent the hole.

In even yet another embodiment, the screw end can include a thread that merges with at least one of the inclined surfaces associated with the chisel edge. The thread can include a leading portion that is located at or near the inclined surface, and that extends outwardly from an axis of the screw. The leading portion can engage and move chips or other material generated by the scraping action of the screw end, and subsequently auger that material up, along the thread. The leading portion optionally can form an extension of the chisel edge, with the thread beginning immediately adjacent the chisel edge.

In still yet another embodiment, the screw end can include a chisel brake point having at least two inclined surfaces disposed at an angle relative to one another. The screw end can act as a brake to retard the feed or advancement of the screw into a work piece for a preselected distance. Optionally, the braking action of the chisel brake point can be partially or fully overcome by threads on the screw engaging surrounding material of the work piece, where the threads eventually impart a forward advancing or feed force on the screw. When this occurs, the screw feeds or advances into the work piece at a faster feed rate.

In a further embodiment, the screw end including the chisel brake point can be configured for use with a screw that fastens a first work piece to a second work piece. The chisel brake point can retard advancement or feeding of the screw at least partially through the first work piece. When the screw has advanced into the first work piece a preselected distance, and optionally through the first work piece, the threads of the screw can engage the first work piece and increase the feed rate of the screw. Accordingly, the rate of advancement of the screw can change, due to the configuration of the screw (rather than a change in speed of a tool rotating the screw), with the braking action of the chisel brake point being reduced, and the rate of screw feed increasing in the first and/or second work piece.

In yet a further embodiment, a method is provided for using the screw including: providing a screw including a threaded shaft and an end, the end including a chisel edge and opposing inclined surfaces; constraining all but rotational and axial movement of the screw; engaging the screw against a work piece; rotating the screw so that the end scrapes material from the work piece surface; continuing to rotate the screw so that the end pre-bores a hole in the work piece into which the remainder of the screw enters; and continuing to advance the screw into the work piece, with the end continuing to scrape material from within the hole and the threads of the shaft augering the scraped material to eject material from the hole.

In still a further embodiment, a method is provided for installing a fastener, for example, a screw having a shaft, threads disposed on the shaft, and a chisel brake point located at an end of the fastener, into at least two work pieces. The method can include engaging the first work piece with the chisel brake point; advancing the fastener into and at least partially through the first work piece; retarding the advancement or feed rate of the fastener into and at least partially through the first work piece with the chisel brake point for a preselected distance; sufficiently engaging the threads of the fastener with the first work piece after the fastener is advanced the preselected distance, where the engagement of the threads increases the feed rate into and through at least one of the first work piece and the second work piece. Optionally, the engagement of the threads with the first work piece generates an advancement or feed force that is greater than a braking force of the chisel brake point, which braking force retards the feed of the fastener.

In still yet a further embodiment, an installation tool is provided. The tool can include a handle, a frame, and a tool screw guide or pilot element defining a screw bore that aligns a screw with a desired location on a work piece. The screw guide can prevent the screw from excessively wobbling as it rotates in the screw bore, relative to the work piece, so that the screw can be started in the surface of the work piece and advanced satisfactorily.

In another, further embodiment, the tool screw guide can include a spacer that extends downwardly from a body of the guide, and that sets a gap between adjacent boards or other construction materials joined with an installed screw. The screw bore can be defined at least partially within the spacer, so that the end of a screw is positioned and contained immediately adjacent the surface into which it is to be advanced.

In yet another, further embodiment, the tool guide can include a clamping mechanism that clamps the tool in place relative to a board or other construction element into which a screw is to be installed with the tool. The spacer can be a part of the clamping mechanism, and can move relative to the frame of the tool. The tool can include another spacer element distanced from the screw guide spacer. The distance can generally correspond to a width of a board or other construction element. The distance can be changed by moving the spacer relative to the spacer element sufficiently to clamp the board between these components. Accordingly, a screw installed with the tool can be precisely advanced into a surface of the board or other construction element.

In still another, further embodiment, the screw guide can include a material ejection port in communication with the screw bore. With this port, material scraped, extracted and/or removed from the hole produced by the screw can eject from the port, thereby preventing or impairing the material from hindering screw rotation within the tool.

In still yet another further embodiment, the installation tool can be configured to guide fasteners into a work piece having a tongue-and-groove configuration. The tool can include a fastener guide having a bore that aligns the fastener as it is advanced at a pre-determined portion on or near a side surface of the board adjacent a tongue of the board. Optionally, the guide can guide the fastener without splitting, bulging or otherwise damaging the tongue of the board. Further optionally, such an embodiment can be used to fasten porch-type boards to underlying substrates or flooring.

In still yet even another further embodiment, the installation tool can be in an automated format including a magazine for storing multiple fasteners and an extension that is joined with the tool guide. The extension can be further joined with a driving tool that can rotate the fasteners and advance them into a work piece as noted with the embodiments herein. Optionally, this tool can include a fastener feeding system that sequentially feeds fasteners one at a time into the guide and/or extension so that those fasteners can be advanced sequentially into the work piece at different locations.

In a different embodiment, the installation tool can be configured to install fasteners described herein or other conventional fasteners in boards that are installed adjacent one another with no gap therebetween. For example, where wet, treated wood or other materials are used to construct a structure, the boards can be placed immediately adjacent one another so that their side surfaces engage and contact one another, substantially along the lengths of the boards. Due to this engagement, there effectively is no or only a tiny gap between the adjacent boards, in which case, the boards effectively are not spaced from one another a preselected distance. The installation tool in this embodiment can be positioned atop one or both of the boards in the location where they abut one another, and can guide a fastener so that it advances into an upper corner, or edge, or exposed side surface of a board, through that board and optionally into an underlying substructure to secure the board in place.

In even a different embodiment, the installation tool can include a frame having a handle and a bottom surface. A guide for guiding the advancement of a fastener installed with the tool can extend through a portion of the frame and can define a longitudinal bore within which the fastener can be controllably rotated during advancement thereof.

In yet a different embodiment, the tool can include an alignment projection extending downwardly therefrom, optionally extending downwardly from the bottom surface a preselected distance. The preselected distance can be such that the alignment projection extends downwardly from the bottom surface a sufficient distance to align the guide, and more generally the fastener, with a corner or side surface of a board along a line of advancement, but without the alignment projection establishing a gap between the side surface of one board and the side surface of another, immediately adjacent board.

In still a different embodiment, the tool alignment projection can be configured to wedge or position between opposing corners of immediately adjacent boards. The alignment projection can engage a corner of an already-installed first board at a position that orients the trajectory of a fastener guided by the guide of the tool. Depending on the engagement of the alignment projection with the corner of the first board, the trajectory of the fastener can be established.

In still a different embodiment, the installation tool can be used to install fasteners in wet, treated wood, or boards of different materials prone to shrinkage over time, with no gap between adjacent boards. In the method, a first board can be installed. A second board can be installed adjacent the first board and moved so that adjacent side surfaces of each of the boards engage and contact one another substantially along the lengths of the boards. The installation tool can be positioned atop the second board and a force can be applied to an opposite, exposed side surface of the second board, distal from the first board, toward the first board with the installation tool. For example, with the alignment projection pushing against the opposite exposed side surface of the second board, or an adjacent upper corner of the second board near the exposed side surface, the tool pushes that second board so that the opposite side surface of the second board is pressed or pushed directly against the side surface of the adjacent first board. The tool can guide a fastener into the opposing side surface of the second board and/or an adjacent upper corner of the second board to secure that portion of the second board to an underlying substructure.

In this method, the installation tool optionally can be reversed end for end, and used so that the guide is alternatively positioned adjacent another side surface of the second board, generally in the region or plane where the first board abuts the second board. The alignment projection can be positioned so that an outer wedge engagement surface of the alignment projection engages a first upper corner of the first board. This engagement can dictate the orientation of the guide relative to the upper corner and/or side surface of the first board. In turn, this can effectively establish the trajectory of the fastener in the guide bore either higher or lower on the corner and/or side surface of the second board. In some cases, depending on the configuration of the upper corners of the respective boards, the trajectory can be placed either higher or lower on the corners and/or side surfaces.

In the method, the installation tool optionally can guide a second fastener into the second board adjacent the first board, thereby securing the second board in place with there being little or no gap between the respective first and second boards. Optionally, this can enable boards to be placed immediately adjacent one another to allow for shrinkage. This can be helpful where the boards are constructed from wet treated wood or some other type of material that shrinks over time or with exposure to the environment. With the installation of these types of shrinking materials, the absence of a gap between the boards, when installed with the above noted tool, can reduce the size of the resulting gap between the boards after the boards shrink over time.

The fastener described herein provides a simple and efficient structure that can pre-bore a hole for itself as it is advanced into a work piece. The fastener can be a screw that is easily advanced into a work piece at any angle, but optionally, the fastener is well suited to be advanced into the side of a work piece so that when installed, it is generally concealed from view from a viewer directly above the work piece. Where included, threads of the screw can auger material scraped by the screw out from the hole bored by the screw to promote efficient advancement of the screw and/or to prevent damage, such as splitting, of the work piece adjacent the hole and/or screw. Where included, the chisel edge brake point can selectively retard advancement or feed of the screw to prevent damage, such as splitting, of the work piece adjacent the hole and/or screw.

Further, the installation tool described herein can easily and consistently align a fastener with a desired surface of a work piece, and efficiently contain that fastener as it is rotated to prevent excessive wobble. The installation tool also can be securely and precisely joined with a work piece where it includes a clamping mechanism. This can promote accurate advancement of the fastener into the work piece. In addition, when a material ejection port is incorporated into the tool, it can facilitate dumping of material bored by the fastener out from a screw guide, which can prevent clogging of the guide, and impairment of fastener rotation. Further, where coupled with a fastener feeding system, the tool can rapidly and efficiently install fasteners in a variety of work pieces. Additionally, where the tool includes an alignment projection and is generally void of any board gap establishing structure, the tool can be used to install and fasten down shrinkable or non-shrinkable boards immediately adjacent one another, with no gap established by the tool between the side surfaces of those boards. Thus, when the boards shrink, the resulting gaps between them are not of an overly large, unsightly dimension.

These and other objects, advantages, and features of the invention will be more fully understood and appreciated by reference to the description of the current embodiment and the drawings.

DETAILED DESCRIPTION OF THE CURRENT EMBODIMENTS

Figure 1:
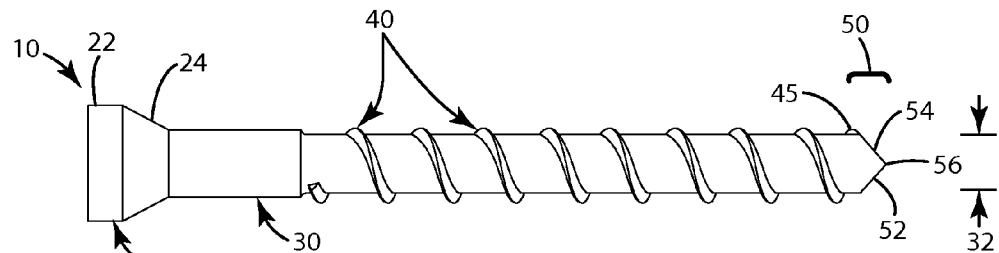
FIG. 1 is a side view of a current embodiment of a fastener.

A current embodiment of a fastener is illustrated in FIGS. 1-6 and generally designated 10. The fastener can be in the form of a threaded fastener, and more particularly, a screw 10 including a head 20 and a shaft 30. The head can include an upper portion 22 and a lower portion 24. The upper portion 22 can be of a uniform diameter 23 (FIG. 3), which can range from about 0.197 to 0.202 inches in diameter, or can be of other dimensions if desired. The upper portion 22 of the head can be generally cylindrical and of a uniform diameter from the end of the head where the opening to the drive feature is located, to where the upper portion 22 begins to transition to the lower portion 24, where it tapers down to the shaft 30 of the screw 10. Optionally, the lower portion can be in the form of a frustoconical portion.

The upper portion 22 of the head 20 can define a screw drive feature, such as a star drive, a Phillips head drive or any other suitable drive. The screw drive feature can define a hole 26 in the head, and can be compatible with any suitable drive feature, as noted above. Optionally, the hole 26 can be generally in the shape of a six-pointed star. The generic name of this type of drive feature is a star drive, or hexalobular internal drive feature, which is standardized by the International Organization for Standardization as ISO 10644. One optional type of star drive feature is a TORX drive, which drive comes in a variety of sizes, generally designated by a "T" and some number, such as T-10, T-15, and the like. TORX is a trade name of Textron, Inc. of Providence, R.I.

The particular drive and size of the hole 26 of the head 20 can vary, but as shown, it can be a T-15 size. The dimension from point-to-point of a T-15 hole in screw head can be about 0.128". The maximum torque range for such a head can be about 6.4 to about 7.7 Nm, as applied via a corresponding tool or head coupled within the hole. The hole 26 can be configured to accommodate a T-15 size TORX drive head. The hole 26 can be quite large, and thus the material 29 between the points of the hole and the outer diameter 23 of the head around the hole can be of a relatively small dimension. In some cases, the material between the outer diameter and the outermost portion of the points on the hole 26 can range from about 0.0325 to 0.035 inches. The hole 26 can be of a depth equal to, less than or greater than the depth 25 of the upper portion 22 of the head having the uniform diameter. Generally, the depth 25 of the upper portion can range from about 0.055 to 0.065 inches. Of course, where drive features, other than the optional T-15 drive are used, the dimensions of those features can widely vary depending on the application.

The drive feature can be connected to a rotary operated tool, such as a drill, that turns the head, and thus the screw 10, to advance the screw into a work piece as described in detail below. Optionally, the screw head can be of the same diameter as the shaft or smaller, or completely absent from the screw, with a drive feature simply included on or defined by the shaft 30 opposite the end 50.

Referring to FIG. 1, the shaft 30 of the screw 10 can be relatively cylindrical. The cylindrical portion can include threads 40 which protrude from it and wrap or coil around it. The threads can continue to the end 50 of the screw. Optionally, the threads can end or taper off a preselected distance from the end, for example 0.010" to about 0.5", or other distances as desired for the application. Further optionally, as described in the alternative embodiments below, one or more of the threads may be included in the end, possibly merging with and forming a portion of one or more inclined surfaces and/or the chisel edge. Even further optionally, the threads 40 can extend from the head 20 to the end 50 of the screw, depending on the application.

The threads can be configured at a particular pitch to theoretically provide a preselected feed rate of the screw into a work piece. For example, the threads may be pitched to provide a feed rate of about 1 to about 8 millimeters per full revolution of the screw about its longitudinal axis 200 (FIG. 5), also referred to as a screw axis. Other thread pitches can be selected to provide other desired theoretical feed rates.

Figure 2:
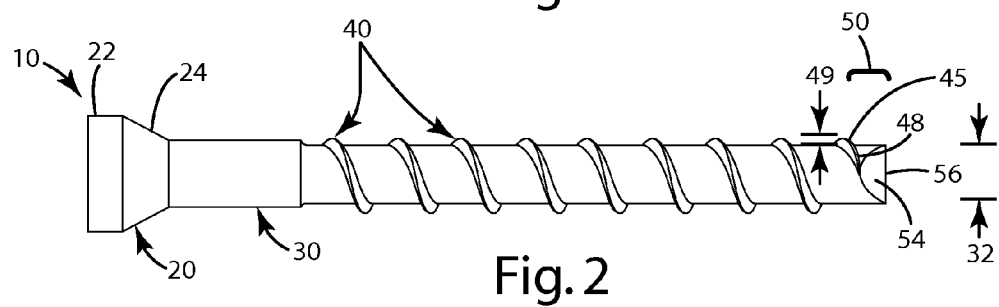
FIG. 2 is a second side view of the fastener.
Figure 3:
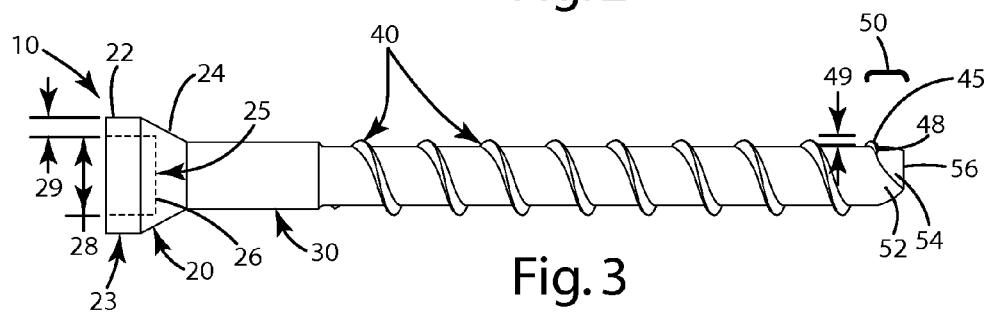
FIG. 3 is a third side view of the fastener.

The threads 40 can end at a last thread 45 as shown in FIGS. 1-5. The last thread 45 can terminate at a leading portion 48, which can have a thread height 49 (FIG. 2) that gradually decreases until it fades into the generally cylindrical portion of the shaft 30. Alternatively, although not shown, the last thread 45 can terminate abruptly, with the leading portion of the last thread having a thread height that is generally the same as the threads located above it on the shaft. With this configuration, the leading portion can terminate at a flat, beveled or sharpened forward surface as desired. Optionally, the location of the leading portion 48, and thus the end of the last thread 45 can vary relative to the chisel point 56. As shown in FIGS. 1-3, the leading portion 48 can terminate and fade or merge into the shaft 30 before the inclined surfaces 52 and 54 begin at the end 50, or at some other location relative to the inclined surfaces or chisel edge.

Figure 5:
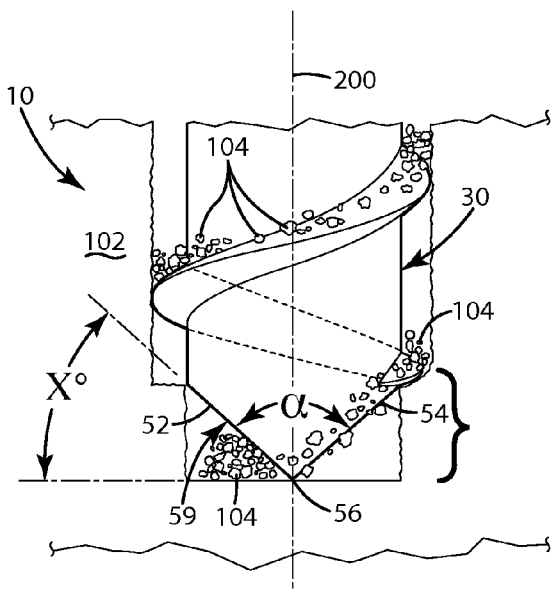
FIG. 5 is an enlarged side view of the end of the fastener engaging a work piece.

The leading portion 48 can end adjacent an apex of one of the inclined surfaces 54 as shown in FIGS. 3 and 5. If desired, however, the leading portion can terminate much farther up the shaft, away from the inclined surfaces, toward the head. Alternatively, the leading portion can terminate farther along the shaft, generally adjacent one of the inclined surfaces. Further, the leading portion can terminate the last thread somewhere between the opposing inclined surfaces 52 and 54, rather than at an apex or along some other portion of those surfaces. Other examples of the leading portion are presented in the alternative embodiments below.

Figure 4:
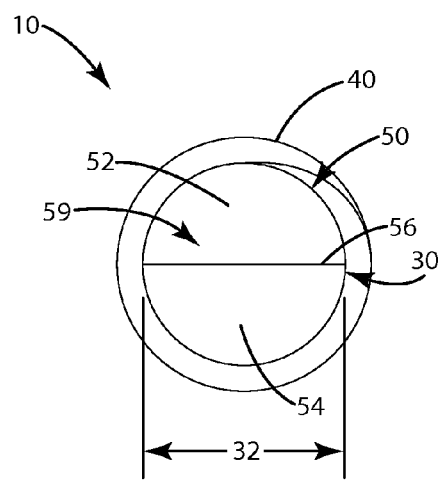
FIG. 4 is an end view of the fastener.

Returning to the end 50 of the screw in general, instead of being sharpened to a conical point (as with conventional screws), it instead can include a chisel edge 56 which includes inclined surfaces 52 and 54 diverging rearwardly from the chisel edge in a V-shaped configuration as seen in the side view of FIGS. 1, 4 and 5. The inclined surfaces 52 and 54 can be at a variety of angles relative to the longitudinal axis 200, for example 25°, 35°, 45°, 55°, 65°, 70°, 80°, or any angles therebetween that are suitable for the desired application. Optionally, the inclined surfaces 52 and 54 can be inclined at the same or different angles relative to the longitudinal axis 200.

Further optionally, the inclined surfaces 52 and 54 can be disposed at an obtuse angle α relative to one another as shown in FIG. 5. The obtuse angle can be any obtuse angle greater than 90° but less than 180°. Nonlimiting examples of ranges of suitable obtuse angles can have a lower limit of about 91°, 95°, 100°, 105°, 110°, 115°, 120°, 125°, 130°, 135°, 140°, 145°, 150°, 155°, 160°, 165°, 170°, 175°, and 179°; and a corresponding upper limit of 179°, 175°, 170°, 165°, 160°, 155°, 150°, 145°, 140°, 135°, 130°, 125°, 120°, 115°, 110°, 105°, 100°, 952°, and 91°. Several further exemplary ranges are between about 135° and about 170°, between about 145° and 160°, and about 130°.

Although shown as generally planar elements, the inclined surfaces 52 and 54 can include surfaces that are slightly curvilinear. For example, the inclined surfaces can be slightly concave or convex, or even wavy or serrated depending on the application. As a result, the chisel edge located where the inclined surfaces meet can likewise be curvilinear, for example, concave or convex. Where the inclined surfaces are generally planar, the chisel edge can be substantially linear.

As shown in FIGS. 2 and 4, the chisel edge 56 and corresponding inclined surfaces 52 and 54 can extend outwardly to an outer diameter 32 of the shaft 30. The inclined surfaces 52 and 54 can be diametrically and symmetrically opposed to one another about the chisel edge 56, and/or the axis 200. In such a configuration, the chisel edge 56 can lie along a line that bisects the outer circumference of the shaft, and can be of the same length as the diameter of the shaft. As illustrated in FIGS. 1 and 2, the chisel edge 56 can extend substantially linearly from one side of the outer diameter 32 of the shaft 30 to the other side of the diameter 32 of the shaft 30, and/or in a transverse manner across a majority of the diameter of the shaft 30 in any desired location.

Optionally, the chisel edge 56 can be offset a preselected distance from the diameter of the shaft. In which case, the inclined surfaces 52 and 54, while being opposed to one another across the chisel edge 56, might not be symmetric. For example, one of the inclined surfaces might be of a larger surface area than the other. The chisel edge and the respective inclined surfaces, or generally the end 30, can be void of any cutting edges that effectively cut into a surface of a work piece against which the end is engaged. Instead, as shown, the end can be configured to scrape the surface against which it is engaged when being advanced by a tool, and to act as a brake to retard advancement or feed of the screw into a work piece, as further explained below. Of course, depending on the application, one or more true cutting surfaces might be incorporated into the end 50.

Generally, the screw end 50 can include a chisel brake point 59, which as used herein, means that the end includes at least two inclined surfaces 52 and 54 disposed at an angle α relative to one another, where the end 50 functions as a brake to selectively retard advancement or feed of the screw 10 into and/or at least partially through a work piece. In some embodiments, the angle α can be about 85° to about 95°, optionally about 90°, further optionally an obtuse angle, and even further optionally, any of the angles noted in connection with the other embodiments herein. Further, although referred to as a "point," the actual structure of the chisel brake point can include an edge, rather than a true point, that is formed at the intersection of the two or more inclined surfaces. Optionally, the edge extends along a diameter, a chord or other transverse dimension of the shaft 30 and or end 50 of the fastener 10.

One mode of operation of a specific embodiment of the screw 10 and its end 50 will now be described with reference to FIGS. 5 and 6. When advanced into a work piece 102, the screw 10 rotates in the direction of the arrow 101. With such rotation, the inclined surface 52 can form a rake angle, specifically a negative rake angle X°, which indicates that X° is less than or equal to 90°, which corresponds to the angle α being 90 or an obtuse angle. Thus, when the screw 10 is rotated as illustrated by the arrow 101, the inclined surface 52 (having the negative rake angle) and/or the chisel edge 56 forcibly scrapes the surface of the work piece 102 due to drag and friction. As a result, the chisel edge 56 and respective inclined surfaces remove material 104 from the surface of the work piece 102 (or the bottom of the hole) via a scraping action. The amount of scraping can be increased or decreased based on the amount of force which is applied along the longitudinal axis 200 by a tool or user.

On the opposite side of the chisel edge 56, the inclined surface 54 also forms a negative rake angle, which can be the same as or different from the rake angle X of the inclined surface 52. This inclined surface 54 and/or the chisel edge 56 can scrape and remove material 104 from the work piece as described in connection with the other inclined surface.

Generally, without a tool to hold the screw 10 on the fixed axis 200, rotation of the screw 10 and the chisel edge 56 may cause the screw 10 to wobble uncontrollably against the work piece, making it difficult to advance the screw 10 into and/or through a desired location on the work piece. This can occur particularly in instances where the screw 10 is installed as a side angled screw, generally in a non-orthogonal manner into a surface of a work piece. Accordingly, an installation tool 70 as described herein is suitable for installing the screw 10 in a variety of work pieces.

Figure 6:
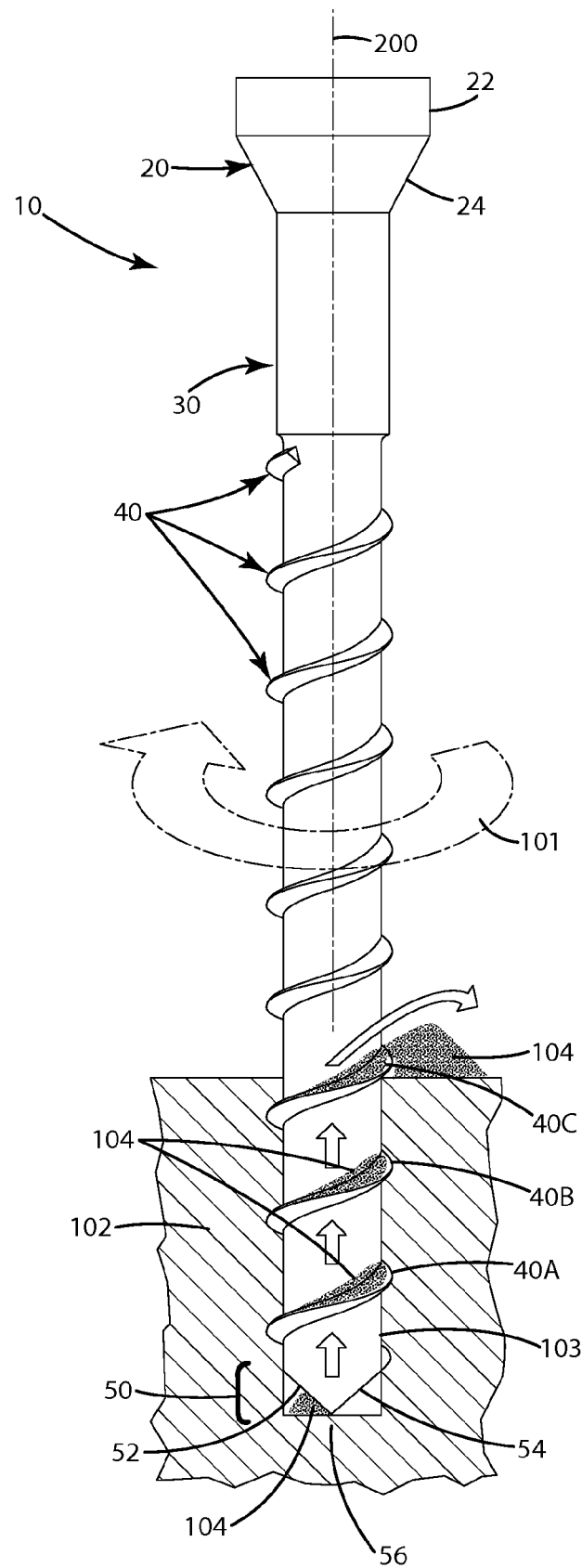
FIG. 6 is a side view of the fastener engaging a work piece.

Advancement or feed of the screw 10 into a work piece 102 can be further understood with reference to FIG. 6. As shown there, with the configuration of the screw end 50, and in particular, the chisel edge 56, the end 50 of the screw scrapes material 104 from the hole 103 which can be created by the scraping action of the end 50 within the work piece 102. The material 104 subsequently scraped from the bottom of the hole 103 can be augered upward, or otherwise away from the end 50, by the threads 40a, 40b, 40c (which can be part of the continuous thread 40) of the fastener 10 until the material is ejected from the hole, beyond the surface of the work piece 102.

Thus, in the embodiment of FIG. 6, the screw not only scrapes a hole in the work piece 102, but also removes the material from the hole so that the screw in effect can be threaded into a pre-bored hole (pre-bored by the screw end 50 and chisel edge 56) defined by the work piece. The scraping action of the end 50 can prevent the shaft 30 and threads 40 of the fastener from advancing or feeding too quickly into the work piece or otherwise advancing in a manner that will split the work piece into which it is drawn.

Figure 8:
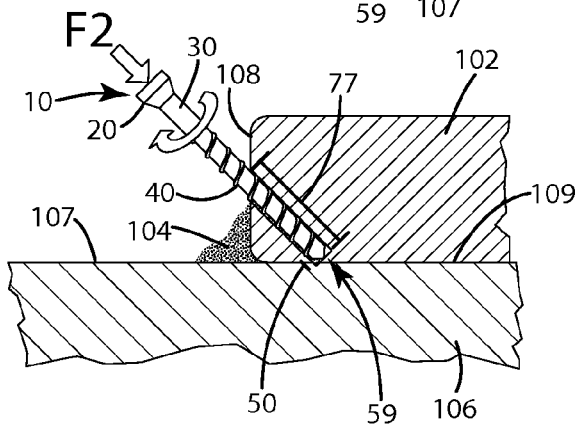
FIG. 8 is a second side view of the fastener advancing into the first work piece.
Figure 9:
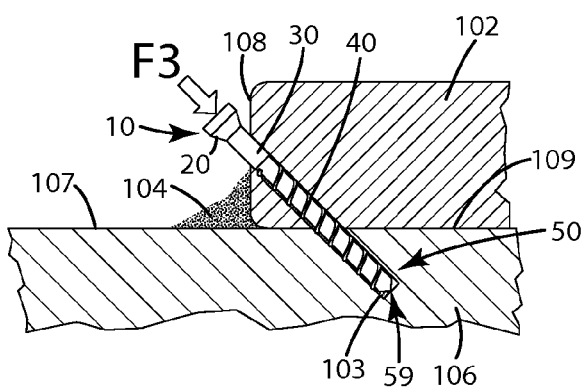
FIG. 9 is a third side view of the fastener as it further advances into the first and second work pieces.
Figure 10:
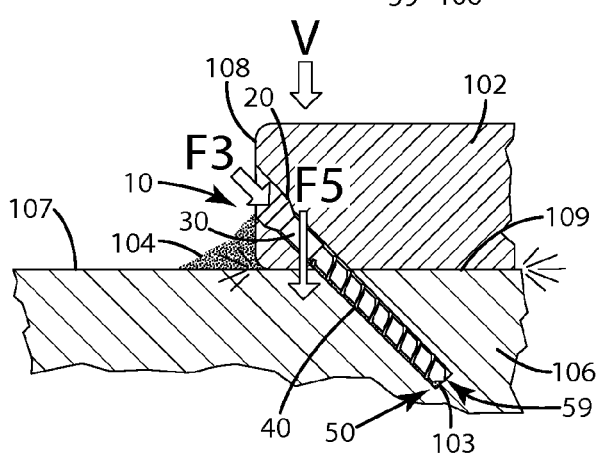
FIG. 10 is a fourth side view of the fastener as it is fully advanced into the first and second work pieces.

FIGS. 7-10 illustrate an example of a screw 10 of the current embodiment being installed in a first work piece 102 and a second work piece 106 to join those work pieces. Generally, the screw 10 joins the first work piece 102, which can, for example, be a board, to a second work piece 106, which can be a subfloor, joist or some other support structure. Also illustrated is the material 104 previously augered out from the hole 103 which the screw self-bored for itself. As shown in FIG. 10, the screw 10 can be advanced into the board 102 a desired distance so that the head is not too conspicuous when viewed from above. The screw 10 can be screwed into the side surface of the board at an angle β which optionally can be about 15° to about 65°; further optionally about 45° or any other desired angle. If desired, the screw can be advanced at a non-orthogonal angle to the surface of the board, or optionally an angle other than 90° relative to the surface of the board. Again, although shown connecting a board to an underlying joist, the screw 10 described herein can be used in any application where it is desirable to use a screw with a feature that pre-bores a screw hole with the screw itself. For example, it can be used to join corners of boards, used in cabinetry or as trim, particularly where the wood or other materials require a pilot hole to be pre-bored before installation of a screw to prevent splitting, or simply to facilitate advancement of the screw into the work piece.

Figure 7:
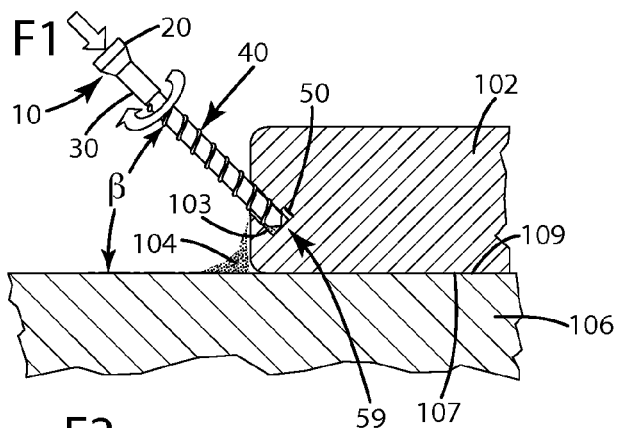
FIG. 7 is a first side view of the fastener being initially installed in a first work piece.

Further referring to FIGS. 7-10, a method of installing a current embodiment of the screw will now be described in more detail. As illustrated, the screw 10 includes a shaft 30, threads 40, a screw end 50 and the chisel brake point 59. The screw 10 can be advanced through a first work piece 102 and into a second work piece 106. As shown in FIG. 7, the first work piece 102 is engaged by the chisel brake point 59 and rotated in the direction of the arrow with a tool (not shown) joined with the screw head. A force F1 can be applied by a user to initiate the screw in boring into the side of the work piece 102 at some preselected angle β, which can be established by a user via an installation tool as described below or some other type of guide or tool. The screw 10 can be advanced into the work piece 102, and in so doing, the chisel brake point 59 can begin to scrape away material 104 from the hole 103 that the point creates in the work piece 102. The force F1, which is transferred to the screw 10 to bore the screw into the work piece 102, can be between about 1 and about 35 pounds, or more or less depending on the application, the type of wood or composite, and the type of installation tool.

Referring further to FIG. 7, the screw is advanced or fed at least partially into the work piece 102. During this advancement, the chisel brake point 59 bores away material 104 to create the hole 103 into which the screw 10 advances or feeds. The chisel brake point 59, retards the feed or advancement of the screw into the work piece 102, and generally provides a braking force to prevent the screw from being rapidly advanced into the work piece 102. In turn, this can impair and/or prevent damage to the material surrounding the screw 10, and can specifically prevent and/or impair splitting of materials, for example, wood in the area in which the screw is advanced. As a more specific example, the braking force can impair rapid advancement of the screw into the work piece 102, which advancement would otherwise typically be generated by the threads 40 engaging the work piece and thrusting it into the work piece, to prevent a lower corner of the work piece 102 from splitting off the remainder of the work piece. As shown in FIG. 8, the screw 10 can continue to be rotated, and fed into the work piece 102, with material 104 continuing to be augured by the threads 40 out from the hole bored by the chisel brake point 59.

As the screw 10 advances into the work piece 102, the chisel brake point 59 can act as a brake to retard or reduce the feed rate of the screw 10 into the work piece 102 for a preselected distance 77. This preselected distance can be anywhere from ⅛, ¼, ½, ¾, 1, 1¼, 1½, 1¾, 2, 2½, or more, or less, inches. As shown, the preselected distance 77 is about ½ to ¾ of an inch. Optionally, this distance can correspond to the distance between one surface 108 of the work piece 102 and a second surface 109 of the work piece 102, so that the feed rate of the screw generally is slowed through a portion or all of the first work piece, which may be more prone to splitting or damage.

Further, as shown in FIGS. 7 and 8, as the screw 10 advances, and the chisel brake point 59 acts to retard advancement of the screw into the work piece, the threads 40 also can engage the material of the work piece surrounding the bore 103 bored by the chisel brake point 59. During such engagement, the threads 40 can rotate or move relative to the sides of the bore 103 without substantially advancing the screw into the work piece upon such engagement, or generally without the threads thrusting the screw into the work piece at the theoretical feed rate for which the threads are designed. Optionally, this can contrast operation of conventional screws, where the engagement of the threads of those screws with the material surrounding the screw would typically lead to those threads thrusting the screw into the work piece at the theoretical rate of feed for which the threads were designed.

As the screw is advanced the preselected distance 77, shown in FIG. 8, the force F2 applied can be equal to or greater than the initial force F1 applied to initiate advancement of the screw. Further, the screw can rotate about the axis anywhere from optionally about 10 to about 100 rotations; further optionally about 15 to about 70 rotations; even further optionally about 20 to about 50 rotations, yet further optionally at least about 25 rotations, as it is advanced into the work piece 102, until the head of the screw engages the work piece. This can contrast a conventional sharp pointed screw, which typically might only be rotated about five to twelve times, depending on the number and characteristics of threads on the conventional sharp pointed screw. This also can contrast the design of the threads of the screw 10. For example, the threads may be designed to advance the fastener into the work piece so the head engages the work piece optionally within about 10 to about 20 rotations, further optionally in less than about 15 rotations of the fastener about the axis. The additional rotations of the embodiments to advance the fastener to a desired depth herein, for example, where the head engages the work pieces, can be attributed to the braking action or force generated by the chisel brake point 59 at the end of the screw, which slows or impairs advancement of the screw into the material of the first work piece 102.

When the screw has been advanced into the work piece 102 the preselected distance 77, a number of the threads 40 sufficiently engage the hole 103 which was pre-bored by the chisel brake point 59, and the material surrounding the hole of the work piece 102. Further rotation of the screw 10 in the direction of the arrow causes the threads to overcome the braking force created by the chisel brake point 59. Optionally, this overcoming of the braking force can occur when the preselected distance generally corresponds to the dimension of the work piece in the area where the screw 10 penetrates or is otherwise bored through the work piece 102. The engagement of the threads 40 with the hole 103 and subsequent overcoming of at least a portion of the braking force generated by the chisel brake point can increase the rate of advancement of the screw through the work piece 102, as well as the rate of advancement of the screw into and through a portion of the second work piece 106. Accordingly, the braking force and subsequent retarding forces and action of the chisel brake point 59 is overcome a desired amount so that the threads 40 advance the screw through the first work piece and into the second work piece at an increased rate of feed.

Optionally, the screw then can begin to advance into the second work piece 106. The rate of advancement or feed, when with the threads overcome at least a portion of the braking force, can result in the screw 10 being advanced or fed about 1, 2, 5, 7, 10, 12, 15, 20, 25, 30, 35, 40 and/or 50 (or any range between or above any of the aforementioned values) times faster than when the braking force of the chisel brake point was retarding advancement of the screw. With the threads 40 sufficiently engaging and advancing the screw into the work pieces, the force F3 in FIGS. 9, and F4 in FIG. 10, applied to the screw can be less than the forces F1 and F2 applied before with the braking force of the chisel brake point 59 was overcome by the forward thrust caused by the threads 40.

As shown in FIG. 9, the screw 10 can be advanced into the first work piece 102 and further into the second work piece 106. During this advancement, the chisel brake point 59 can provide a braking force, but most, if not all, of it is overcome by the feeding force generated by the threads 40 engaging the material surrounding the hole 103. The chisel brake point 59 also can pre-bore a hole 103 in the second work piece 106. Material 104 also can be augured out from the respective hole created by the screw in the second work piece 109. Where the installation tools described herein are used to install the screw, that material can be ejected from a material ejection port as described below.

With reference to FIG. 10, the screw 10 can continue to advance until the screw head 20 is sufficiently indented in or buried in the side surface 108 of the work piece 102. In some cases, the head of the screw is completely positioned in the hole 103, so that no portion of the head extends beyond the first surface 108 of the work piece 102. Optionally, the screw 10 can be advanced sufficiently so that it is at least partially hidden from a viewer "V" viewing the work piece generally from above. With the screw 10 installed as shown, optionally about 20% to 100%, further optionally about 50% to 90% of the holding force F5 of the screw 10 is provided via the screw shaft 30 and/or threads 40, rather than via the head 20 of the screw 10. Further, where screws 10 are similarly installed on opposite side surfaces of the work piece 102, with the screws generally pointing toward one another and embedded in the underlying work piece 106, those opposing screws can cooperatively provide sufficient force to hold down the work piece 102, with a substantial portion of the holding force being supplied via the shaft of the screws, rather than the heads of the screws.

Another feature of the screw of the embodiment herein concerns the chisel brake point 59 and its effect on feed of the screw. Optionally, the point 59 can include inclined surfaces that are at an angle relative to one another so that they provide a sufficient braking force such that the screw does not feed or advance into the first work piece 102 at a rate corresponding to the pitch of the threads 40 until after the chisel brake point at least partially penetrates through the work piece 102, for example, a preselected distance 77, or through the second surface 109 of the work piece. In such a manner, the screw can prevent or impair excessive wedging of the threads 40 and/or shaft 30 through the material of the work piece 102 surrounding the screw 10, thereby preventing or impairing damage such as splitting to that material and the corresponding corner edge of the work piece 102. With the screw substantially or fully penetrated through the first work piece 102, its rate of advancement can change, and generally increase, so that it advances at a faster rate into the second work piece 106. Of course, in so doing, the remaining portion of the screw in the first work piece 102, including the shaft 40 and head 20, can be advanced in and/or through the first work 102 piece at a greater rate than the rate before the screw penetrated the second surface 109 of the work piece 102.

In the above described mode of operation, the feed rate of the screw 10 into and/or through the work pieces also can change as the screw is advanced or fed into the first and/or second work pieces 102, 106. For example, as the screw 10 is turned in the direction of the arrow in FIG. 7, the feed rate of the screw 10 into the work piece 102 can be a percentage slower or less than the theoretical feed rate provided by the pitch and configuration of the threads 40. As a more specific example, the threads 40 can be configured to provide a theoretical feed rate of one millimeter per one revolution of the screw 10. Due to the braking forces provided by the chisel brake point 59, however, the actual feed rate of the screw 10 can be only 0.25 millimeters per one revolution of the screw 10. This braking force or action can retard advancement of the screw, or otherwise reduce the feed rate of the screw for the preselected distance 77 (FIG. 8). As more threads 40 of the screw engage the material surrounding the hole 103 bored by the chisel brake point 59, the braking force provided by the chisel brake point 59 can be overcome by the threads 40. The feed rate of the screw 10 can increase dynamically as more threads engage the material of the work piece 102, overcoming the braking force.

Thus, by example only, the feed rate of the screw into the work piece 102, after the chisel brake point 59 has advanced a preselected distance 77 into the work piece 102, can increase from 0.25 millimeters per one revolution (which is caused by the braking force of the chisel brake point) up to 1.0 millimeter per one revolution, which again can be the theoretical feed rate of the screw based on the pitch of the threads 40. When the screw 10 penetrates through the other surface 109 of the work piece 102, it can be advanced at a feed rate of about one millimeter per revolution. Accordingly, when it enters the second work piece 106 it can be advanced at the full theoretical feed rate, or at some percentage, for example, about 70%, 80% or 90%, of the full feed rate.

In general, the feed rate of the screw 10 into the work piece 102 can dynamically change from a first feed rate to a greater, second feed rate as the screw enters the work piece, nearing the preselected distance 77. This can occur because additional threads 40 of the screw 10 begin to engage the material around the hole pre-bored by the chisel brake point 59. As more threads engage the work piece 102, the forward force/thrust provided by those threads begins to overcome the braking force provided by the chisel brake point 59.

The aforementioned mode of operating the fastener 10 of the current embodiment and screw features also yields a suitable method for installing a fastener to join a first work piece with a second work piece. In this method, a fastener 10 is provided. The fastener can be the screw of any of the embodiments herein, having a chiseled brake point 59 and threads 40, where the threads are configured to advance the fastener 10 at a first feed rate, which for the sake of this example, can be a theoretical feed rate. The fastener 10, and in particular, the chiseled brake point 59 can be rotated and brought into engagement with the first work piece 102 as it is rotated. Initially, the chiseled break point can penetrate the side surface of the work piece, as generally shown in FIG. 7.

Optionally, the screw 10 can be held with an installation tool at a preselected angle, and generally aimed at the angle β at the side surface 108 of the work piece 102. The installation tool can also engage the head or other portions of the screw to rotationally restrain the fastener as it is advanced, and generally to prevent or impair excessive wobble of the screw in so doing. In general, the installation tool or some other driver, such as a drill, can rotate the fastener.

The fastener 10 can be advanced into the first work piece 102 at a second feed rate, less than the first feed rate, due to the chisel brake point 59 retarding advancement of the fastener 10 into the work piece 102 and providing a braking force that reduces the first feed rate of the fastener into the work piece to the second feed rate, or more generally impairing the fastener from increasing its feed rate to the theoretical feed rate of the screw 10.

Returning to the method, the chisel break point 59 can pre-bore a hole in the first work piece 102 and the second work piece 106. When the fastener is advanced so that it extends through the first work piece and engages the second work piece, the hole 103 generally is completely bored through the first work piece. The diameter of that hole 103 can be about the size of the widest diameter of dimension of the chisel brake point 59, but smaller than the outer diameter of the threads 40 of the fastener so that those threads can still bite into the material surrounding the hole and alter the feed rate of the fastener as described herein.

When the fastener 10 begins to advance and continues to advance into the second work piece as shown in FIG. 9, the threads 40 of the fastener generally pull the remaining shaft 30 (if any) above the threads, and the head 20 of the fastener into and/or through the pre-bored hole until rotation ends and the fastener achieves a desired depth of installation in the work pieces. As shown in FIG. 10, the fastener can be advanced so that the threads 40 are substantially located in the second work piece 106, but not the first work piece 102. The shaft 30 and head 20 of the fastener 10, however, can remain in the first work piece as the fastener 10 also continues to advance into the second work piece 106. As a result, the head 20 and optionally the shaft 30 can pull down the first work piece 102 into further securing engagement with the second work piece, and can further pull the second work surface 109 toward and into engagement with the first work surface 107.

Generally, the aforementioned depth of installation corresponds to the fastener head 20 being at least partially located, if not fully located within the pre-bored hole 103. The head 20 also can be generally concealed from view for a viewer V from above. For example, the head can be sufficiently buried in or located within the interior of the pre-bored holed in the first work piece so that it is not readily visible to a viewer V from above without close inspection. Sometimes, where the work piece is constructed from wood or composites, the material around the pre-bored hole may swell or at least partially fill the pre-bored hole above the head back in to even further conceal the head of the fastener 10.

The depth of the fastener 10 in the work pieces after installation also can correspond to a sufficient portion of the threads 40, and shaft 30 if desired, being located within the second work piece, and a sufficient portion of the shaft, as well as the head 20, being located in the first work piece, where the fastener joins the first and second work pieces to one another.

Figure 11:
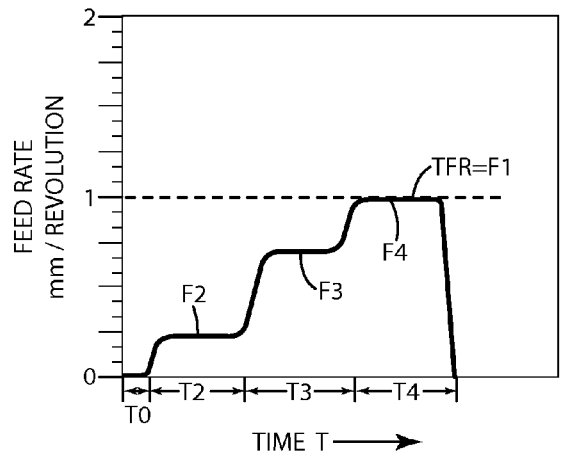
FIG. 11 is a chart illustrating the feed rate of the fastener into work pieces over time.

A chart illustrating the feed rates as the screw 10 is advanced is presented in FIG. 11. There, the y-axis represents the feed rate in millimeters of advancement into the work piece per revolution. The x-axis represents the passage of time as the fastener is installed, starting from when the fastener first engages the first work piece at T0, where time is equal to zero, to when the fastener is fully installed at TE. The theoretical feed rate TFR, also referred to as a first feed rate herein, is a function of the geometry of the thread, and more particularly, the pitch and/or angle of the threads as explained above. As shown in FIG. 11, during time T0, as the fastener is initially rotated, it begins to engage the work piece, so it does not feed into the work piece.

As the fastener 10 continues to rotate and penetrate into the work piece, the threads 40 engage the work piece. Generally, however, the threads during time T2 do not substantially advance the fastener 10 into the work piece. Much of the advancement, or the feed rate F2 in general, is due to the force being applied to the fastener through the head. Some or a small part of the advancement can be provided by the threads during T2. During T2, the chisel brake point 59 can pre-bore the hole for the remainder of the fastener.

The fastener 10 can continue to be rotated and advanced at feed rate F2 a preselected distance 77 (FIG. 8) into the work piece 102, with progressively more of the threads 40 of the fastener 10 engaging the work piece until that engagement of the threads with the work piece at least partially, if not substantially, overcomes the braking force. At about that point, the advancement of the fastener 10 can generally increase from the second feed rate F2 to a greater third feed rate F3, that is optionally between the second feed rate F2 and the first feed rate TFR. This increase in the feed rate is generally represented in FIG. 11 between the transition between F2 and F3. While the transition between the feed rates is shown as abrupt, it can occur gradually if desired.

The fastener 10 can continue to advance until it extends through the first work piece and engages the second work piece. Shortly after it engages the second work piece, the rate of advancement of the fastener can further increase, transitioning from the third feed rate F3 to the fourth feed rate F4. This increase can be due to many, if not all of the threads 40 engaging the work piece(s) to advance the fastener into the work piece(s). The fastener 10 can continue to be advanced at the fourth feed rate F4 that is optionally between the third feed rate and the first feed rate TFR, and optionally at or near the first feed rate or TFR.

In operating at the fourth feed rate F4, the fastener 10 can be advanced into the first surface 107 of the second work piece 106 as shown in FIG. 8. Generally, the fastener can be advanced into the second work piece, which can be an underlying work piece, such as a floor joist at a faster feed rate, such as the TFR because there is not much concern of splitting or damaging that structure as a result of the screw shaft being wedged or quickly advanced into the material of that work piece. Optionally, the fastener 10 can be advanced into the second work piece parallel to the longitudinal length of the second work piece. When the fastener is fully installed in the work pieces, the advancement stops, which is represented at TE in FIG. 11.

Generally, the changes from one feed rate to another as mentioned above can occur due to the geometry and interaction of the chisel brake point, threads and head of the fastener with one another and/or the work piece(s), rather than due to changes in the external forces F1, F2, F3, F4 or other forces applied to the fastener as it is advanced. Indeed, the forces F1, F2, F3 and F4 can be substantially the same throughout the advancement of the fastener into the work pieces. Likewise, the rate of revolutions per minute (RPMs) of the fastener can remain generally the same throughout the advancement of the fastener in to the work pieces. What can change however, is how fast the fastener advances under those RPMs, again, due to the geometry of the fastener and the interaction of its components.

Although the different feed rates F2, F3 and F4 are shown as transitioning from one to the other rather abruptly, those feed rates can transition from one to the other gradually, so that the transitions are less stepped. This can be achieved by varying the geometry of the threads, the chisel brake point, and or other features as desired.

I. First Alternative Fastener Embodiment

A first alternative embodiment of the fastener is illustrated in FIGS. 12-17 and generally designated 110. This embodiment is similar to the above embodiment above in construction and operation with a few exceptions.

Figure 15:
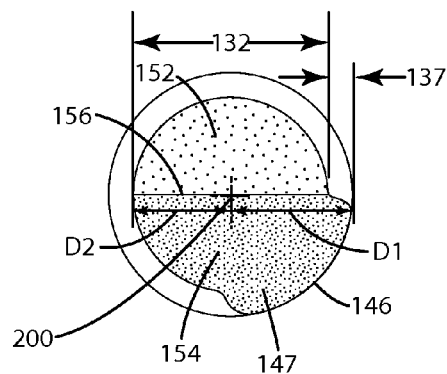
FIG. 15 is an end view of the first alternative embodiment of the fastener.
Figures 16, 17:
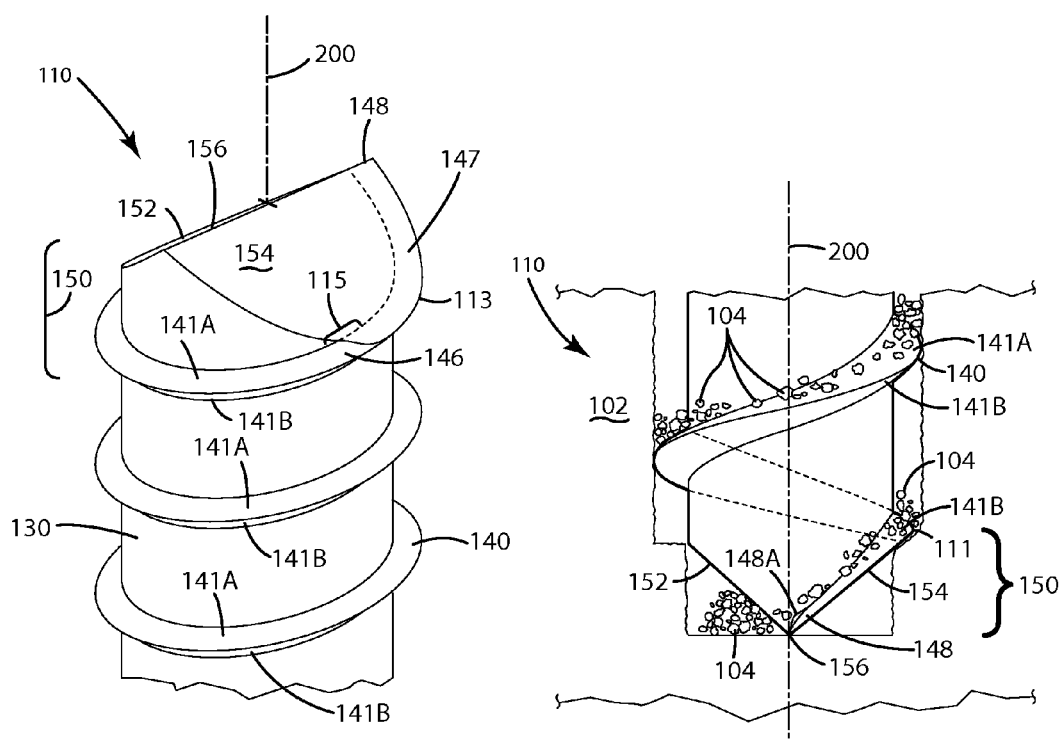
FIG. 16 is an enlarged perspective view of the first alternative embodiment of the fastener.
FIG. 17 is an enlarged side view of the end of the first alternative embodiment of the fastener engaging a work piece.

To begin, the end 150 of the fastener can include a different thread geometry and inclined surface configuration. For example, the end 150 can include a chisel edge 156 that extends across the diameter 132 (or some other chord or dimension) of the shaft 130. The chisel edge 156 can be in the form of and function like the chisel brake point explained above if desired. However, the chisel edge 156 also can extend slightly beyond the outer diameter 132 of the shaft 130 as shown in FIGS. 15 and 16 by a distance 137. In so doing, at least a portion of the last thread 146, for example, the leading portion 148, can form part of the chisel edge 156, or more generally the chisel brake point. With the last thread 146 forming this extension, the chisel edge 156 can be configured asymmetrically about the longitudinal axis 200. For example, a first portion of the chisel edge 156 can extend a first distance D1 from the longitudinal axis on one side of the axis, and a second portion located on the opposite side of the longitudinal axis can extend a second distance D2 on the other side of the longitudinal axis 200. The distance D1 generally can be greater than distance D2. This difference in the distances can be equal to the depth of the last thread, or some other dimension as desired.

The chisel edge 156 extends rearward from the very end of the fastener 150 generally in a V-shape with the inclined surfaces 152 and 154 inclined relative to one another at an angle μ which can be in the range of about 90° to about 105°, or optionally about 90° to about 135°, or further optionally about 90° to about 150°, or even further optionally 90°±10°. It has been discovered that with these ranges of angles incorporated into the chisel edge, the fastener 110 can pre-bore holes well into composite work pieces, as well as fiber or natural wood work pieces. For example, this range of angles is blunt enough so that it can slow or retard advancement of the screw into a wood board, and allow a hole to be pre-bored therein. Substantially more acute angles, where μ is less than 45°, on the other hand, can be too pointed, and can cause the fastener to rapidly drill into the wood board, almost at, if not at, the theoretical feed rate of the fastener and related threads. In turn, this rapid advancement of the fastener can split or damage the work piece.

The above range of angles is also sharp enough so that the end of the fastener can pre-bore a hole, rather than melt a hole in a work piece, such as a board, that is constructed from composites, such as a polymer or plastic or wood/plastic hybrid. Substantially more obtuse angles, where μ is greater than 170°, on the other hand, can be too blunt, and can cause the fastener end to simply melt a hole into the wood work piece, at a feed rate that is unsatisfactory for practical use. In addition, the melting of the work piece material can rapidly gum up the threads of the fastener, and prevent the melted material from ever making it to the surface of the work piece. In turn, this can cause the surrounding material to bulge and present aesthetic issues.

Returning to FIGS. 15-17, the inclined surfaces 152 and 154 can intersect at the chisel edge 156 and form at least portion of it. One or more of the inclined surfaces can transition to or merge with the last thread 146. More particularly, the last thread 146 can form at least a part of, and lie in the same plane or curvilinear surface as, one or more of the inclined surfaces 154. Depending on the angle of the inclined surface 154 relative to the longitudinal axis 200 or the other surface, more or less of the last thread 146 can form a part of that surface.

Figure 12:
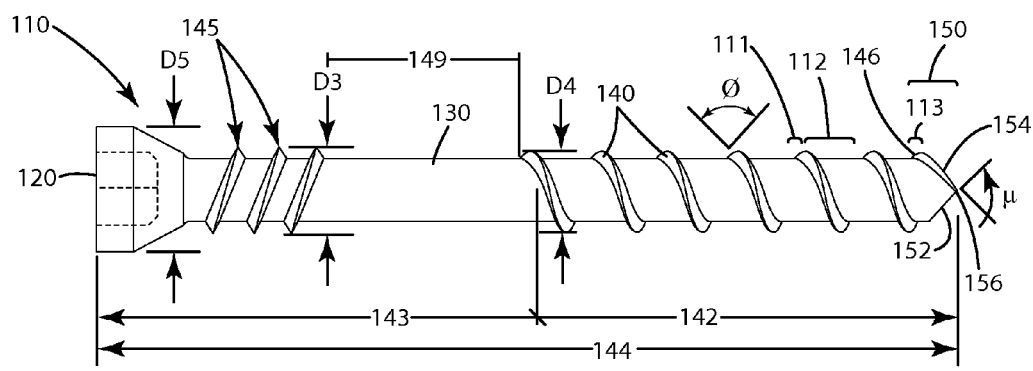
FIG. 12 is a side view of a first alternative embodiment of the fastener.
Figure 13:
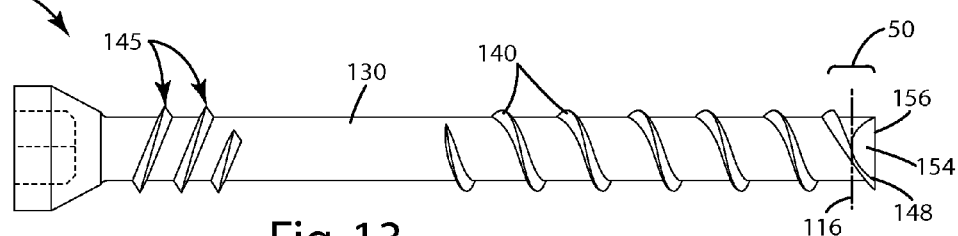
FIG. 13 is a second side view of the first alternative embodiment of the fastener.
Figure 14:
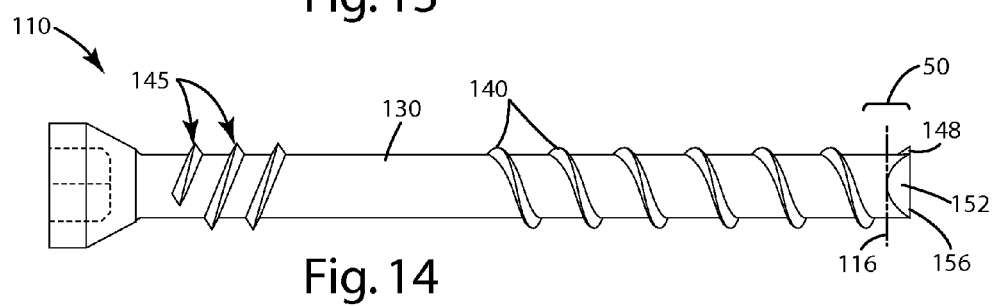
FIG. 14 is a third side view of the first alternative embodiment of the fastener.

Optionally, the inclined surfaces 152 and 154 can be located between a boundary 116 on the shaft 130 and the chisel edge 156 as illustrated in FIGS. 12-14. The boundary 116 can mark the location at which one or both of the inclined surfaces begin on the shaft 130 or within the end 150 of the fastener 110. Where included, the thread 140 and/or last thread 146 also can be formed beyond the boundary 116, in the end, between the boundary and the chisel edge or chisel brake point. Optionally, these threads can also extend rearward from that location toward the head in a continuous, generally uninterrupted manner as well.

As shown in FIGS. 15 and 16, the last thread 146 merges or transitions into the inclined surface 154 at the intersecting portion 147 of these elements. This intersecting portion 147 can lie within the same plane or curvilinear surface as the inclined surface 154, and can form a continuous surface with the inclined surface 154 as illustrated. The intersecting portion 147 can extend the inclined surface 154 beyond the shaft 130 a distance equal to the depth of the last thread 146, the leading portion 148, or some other distance. Thus, with this intersecting portion acting as extension of the inclined surface, the inclined surface 154 can have a greater surface area than the opposing inclined surface 152. Optionally, although not shown, a part of the last thread can extend beyond the chisel edge 156, in which case, that part can form a portion, and optionally another surface extension of the other inclined surface 152 as well.

Returning to FIGS. 15-17, the last thread 146 can include a leading portion 148 at which the last thread terminates. The leading portion 148 can be the part of the last thread that actually merges or transitions directly into the inclined surface(s), and can include at least a portion of or overlap the intersecting portion 147. The leading portion 148 can extend all the way to the chisel edge 156, or it can extend somewhat beyond the chisel edge and form part of the other inclined surface 152, or it can terminate somewhere adjacent the inclined surface 154, and/or the inclined surface 52.

The leading portion 148 can extend outward from the shaft 130 the full depth of the other threads 140, or some other preselected greater or lesser depth. The leading portion can transition rearward from the chisel edge 156 to the remainder of the last thread 146, which in turn furls or coils around the shaft 130 at or near the end 150, depending on the thread configuration, and transitions to the other threads 140 extending outward from the shaft. The leading portion 148, the last thread 146 and the other threads 140 can form a unitary thread that extends from the chisel edge 156 continuously up the shaft 130 optionally without any interruptions or voids in the thread, until it terminates somewhere in a middle region of the shaft 130.

Optionally, the threads 140, 146 and fastener 110 in general can be void of any self-tapping grooves or discontinuities that assist the fastener initially penetrating a very dense material, such as a metal. The upper and lower thread surfaces 141A and 141B of the last thread 146 and the remaining threads 140 likewise can be continuous from the chisel point to the end of the threads 140 in the middle region of the fastener 110. Of course, if voids or interruptions are desired in the threads for certain applications, they can be included.

Further optionally, the last thread 146 can merge with the inclined surface at the leading portion 148, with the last thread and all threads terminating at that location. As an example, there may be no additional thread or threads or portions of threads located between the chisel edge and the leading portion.

As shown in FIG. 17, the leading portion 148 optionally also can include a forward surface 148A which generally is located adjacent and forms a part of the lower thread surface 141B. The forward surface 148A can generally be inclined or effect relative to the axis optionally by about 0° to about 45°, further optionally about 2° to 10°. The forward surface 148A optionally can extend all the way to and generally intersect the chisel edge 156. Opposite the inclined surface 154, in some applications, the forward surface 148A can also form a partial extension of the chisel edge 156. If desired, the forward surface 148A can form a ramp from a location at or adjacent the chisel edge 156. This ramp can operate to scrape material from the bottom of the hole 103. This ramp also can operate to scoop or route material 104 adjacent the shaft 130, can be onto the lower thread surface 141B. As the fastener turns, the scooped material augered farther up the lower thread surface 141B.

The fastener of this first alternative embodiment as shown in FIG. 12 can be of a length 144, and generally divided into a first portion 142 and second portion 143. Optionally, the length 144 can be about 1.5 to about 2.0 inches, optionally about 1.8 inches, with the first portion 142 being about half the length 144 and the second portion 143 being about half the length as well. Of course, the screw may be of various other lengths, or example, it can be 2 inches, 3 inches, 4 inches or other increments therebetween depending on the application. Further, the first and second portions 142 and 143 can be subdivided in different ratios depending on the application.

The first portion 142 can include primary threads 140 and the chisel edge 156 described above. The first portion 142 can be about half the length 144 of the fastener, or about ⅓ or ¼ the length of the screw, or other portions as desired. The second portion 143 can be threadless and can include an optional head 120 of the fastener 110. The outside primary threads near the end 150 can be less sharp than the threads closer to the head 120 of the screw if desired to prevent the or impair those threads from biting into and advancing the fastener into the work piece at an undesired rate. Of course, the threads can be uniformly sharp from end to end. The pitch of the threads 140 optionally can be about 2 mm to about 4 mm, and further optionally about 3 mm. Generally, as used herein, the pitch refers to distance from one point on the thread to the corresponding point on an adjacent thread measured parallel to the axis 200.

The threads 140 and the last thread 146 can be of a thread design having a "V" profile or a buttress profile depending on the application. Further, as shown in FIG. 12, the threads and last thread can each include a thread angle Ø, which is generally the included angle formed between the upper and lower thread surfaces 141A and 141B. This angle can be optionally between 10° and 90°, further optionally between 30° and 70°, and still further optionally between 55° and 60°, and even further optionally about 60°.

The threads 40 each can also include crests 111 and roots 112 between each crest of the threads. As shown in FIGS. 12 and 16, the last thread can include a crest 113. This crest 113 can continue to the leading portion 148, or can terminate short of it as desired. The crest 113, and more generally the last thread 146 also can thin substantially in the intersecting portion 147 where the last thread 146 merges or transitions into the inclined plane 156. Indeed, the inclined surface 154 and intersecting portion 147 can extend outward to the crest 113, such that the planar, curved or other surface of the inclined surface and/or intersecting portion terminates at the crest 113 for at least a portion, if not all of the last thread 146 and/or the leading portion 148.

As illustrated in FIG. 16, the inclined surface 154, and more particularly the intersecting portion 147, can form a part of the last thread where the last thread merges into these elements. For example, the last thread in this region can generally include the lower thread surface 141B on one side of the crest 113 of the last thread, and can include the intersecting portion 147 that merges with the inclined surface 154 on the opposite side of the crest 113 of the last thread 146. As the last thread 146 furls or coils away from the leading portion 148 or the chisel edge 156, the inclined surface 154 and/or intersecting portion 147 themselves can merge or transition to the upper thread surface 141A in the transition region 115. This transition can be abrupt, with a perceivable drop off from the inclined surface 154 and/or intersecting portion 147 to the upper thread surface 141A, or it can be gradual, with inclined surface 154 and/or intersecting portion 147 angling or curving away from the upper thread surface 141A at a small angle or curvature.

While the second portion 143 can be unthreaded, it optionally can include secondary threads 145 as shown. These secondary threads 145 can be included on the shaft 130 at or near the head and can extend a predetermined distance within the second portion 143 of the length of the screw 110. The primary threads 140 and secondary threads 145 can be separated by a void located along the shaft 130. the void can be of a preselected length 149.

The secondary threads 145 can be of the same threading as the primary threads 140, or alternatively can include a reverse thread, generally running in the opposite direction of the threads 140 in the first portion 142. The pitch on the secondary threads 145 optionally can be about 2 mm to about 4 mm, and further optionally about 3 mm. The pitch on the secondary threads 145 can be about 1.5 to 2 times greater than the pitch on the primary threads 340, in addition to being reverse threaded along the shaft 130. Further, the outer diameter D3 of the reverse threads 145 can include an outer diameter that is smaller than the outer diameter D4 of the primary threads 140. As an example, the outer diameter of the reverse threads can be about 1.4 inches, and the outer diameter of the primary threads can be about 1.6 inches. Optionally, the outer diameter of reverse threads 145 can be about 0.1 to about 0.4 inches less than the outer diameter of the primary threads 140.

The head 120 of the fastener shown in FIG. 12 optionally can be of a diameter D5 that is greater than the other diameters D3 and D4. This larger size of the head can enable a drive tool to be attached to the head and driven. The larger size of the head can also enable the head to engage the material surrounding the pre-bored hole 103 and provide some holding force, in addition to the shaft, to hold the work pieces in a desired orientation.

In operation, the screw 110 can function and can be installed in a manner similar to the embodiments described above. Where the leading portion 148 and last thread 146 terminate adjacent or near one or more of the inclined surfaces, however, these features can provide enhanced augering. For example, as shown in FIG. 17, as the material 104 is scraped from the work piece within the pre-bored hole 103, the small pieces of material, which can be in the form of chips, fragments, fibers, or parts of the work piece are scraped from the bottom of the hole by the leading portion 148. In effect, these parts can be scooped or picked up by the leading portion 148 and the last thread 146, and where included, the forward surface 148A, and augered up the last thread to the other threads 140. The material 104 can travel on the lower thread surface 141B as illustrated, generally continuously up the threads until it is ejected out from the hole to the environment or into a tool as described below.

In applications where the work piece into which the fastener 110 is advanced is a composite board, the scooping and scraping action of the leading portion and end 150 can almost immediately auger out the material 104 from the pre-bored hole. This can prevent melting of that composite material due to excessive churning in the bottom of the hole, which in turn can prevent the screw from becoming gummed up with the melted material as it is augered up the threads, thereby impairing advancement of the screw into the composite.

Figure 18:
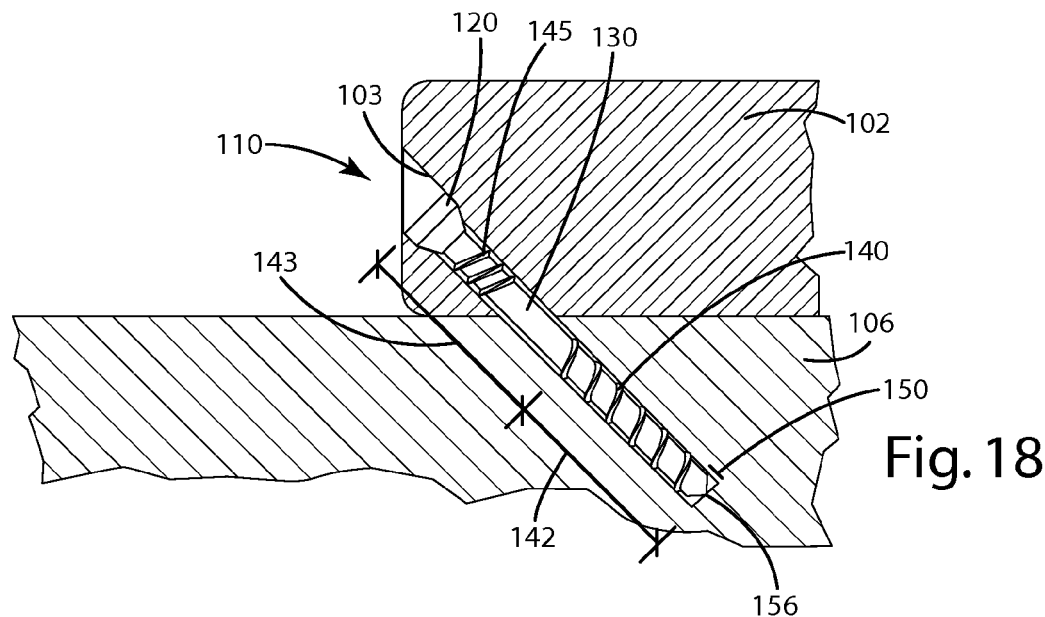
FIG. 18 is a side sectional view of the first alternative embodiment of the fastener installed in first and second work pieces.

FIG. 18 illustrates the fastener 110 installed in work pieces 102 and 106 at a predetermined angle, much like the embodiment described above. Leading up to that installation, the fastener 110 can undergo the operations, can be installed at the angles, and can feed at the feed rates as described in any of the embodiments herein to connect the work pieces 102 and 106.

As shown in FIG. 18, however, the optional additional secondary threads 145 can provide a slightly different holding effect than that of the embodiments described above. For example, where the secondary threads 145, which again may be reverse threads, are included, those reverse threads can assist in drawing the work piece 102 more toward the second work piece 106. Further because there is a void between the primary threads and the secondary threads, that void can allow the first work piece 102 to draw down against the second work piece 106. The optional reverse threads also can rotate within the pre-bored hole 103, thereby scraping the loose ends of material from that hole, which can provide a clean finished hole above the location where the head 120 comes to rest after being fully installed.

After the fastener 110 is fully installed, the optional reverse threads can provide additional holding power to prevent the work piece 102 from being removed from the second work piece 106 under force. For example, the added contact between the reverse threads and the material surrounding the pre-bored hole 103 can provide more friction between the fastener and the hole, which in turn can make much more force required to pull the work piece 102 away from work piece 106.

Optionally, a first fastener 110 is installed on one side of a work piece 102, such as a board, and a second fastener is installed directly across from the first fastener on an opposite side of the board, and in some cases in the same plane as the first fastener. Where these opposing fasteners optionally include the secondary threads, these threads can provide even more holding force to keep the work pieces fastened together.

II. Second Alternative Fastener Embodiment

Figure 19:
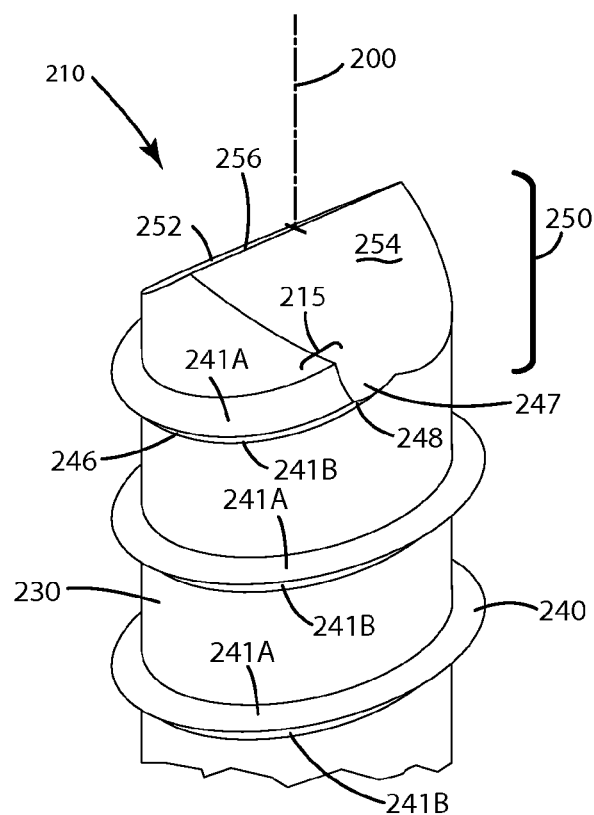
FIG. 19 is an enlarged perspective view of a second alternative embodiment of the fastener.

A second alternative embodiment of the fastener is illustrated in FIG. 19 and generally designated 210. This embodiment is similar to the above embodiments in construction and operation with a few exceptions. For example, the end 250 of the screw 210 can generally include a last thread 246 that is included within the primary threads 240. This last thread 246 can also include upper 241A and lower 241B thread surfaces, as can the remainder of the primary thread 240 as illustrated in FIG. 19. The last thread 246 can end at a leading portion 248. This leading portion 248, and more generally the last thread 246, can transition or merge with the inclined surface 254. This merging or transition can occur at the intersecting portion 247. This intersecting portion can form a continuation or extension of the surface of the inclined surface 254. The last thread 246 can also transition at the transition region 215 into the inclined surface 254. As can be seen in FIG. 19, the leading portion 248 is adjacent the chisel edge 256, but does not form a direct extension of that chisel edge 256. The surface area of the inclined surface 256 thereby can be increased by the area corresponding to the intersecting portion 247.

The operation of the second alternative embodiment in FIG. 19 is similar to that of the embodiment in FIGS. 12-18. For example, the leading edge 248 and/or last thread 246 acts to scoop up material and transfer it to the surfaces of the threads so that that material can be augured up and out of a pre-bored hole created by the chisel edge 256. Moreover, the chisel edge 256 and respective components can operate like a chisel break point as described in the embodiments herein. In some circumstances, however, the scooping action by the leading portion 248 can be slightly less than that of the embodiments described above due to the leading portion 248 not being disposed at the point of contact with the bottom of the pre-bored hole or the material, that is, directly adjacent the end forming an extension of the chisel edge 256. Optionally, if desired, the leading portion 248 can be moved to the lower most extremity of either of the inclined surfaces 252, 254. The chisel edge of this fastener surface can also include a chisel brake point as described above.

III. Third Alternative Fastener Embodiment

Figure 20:
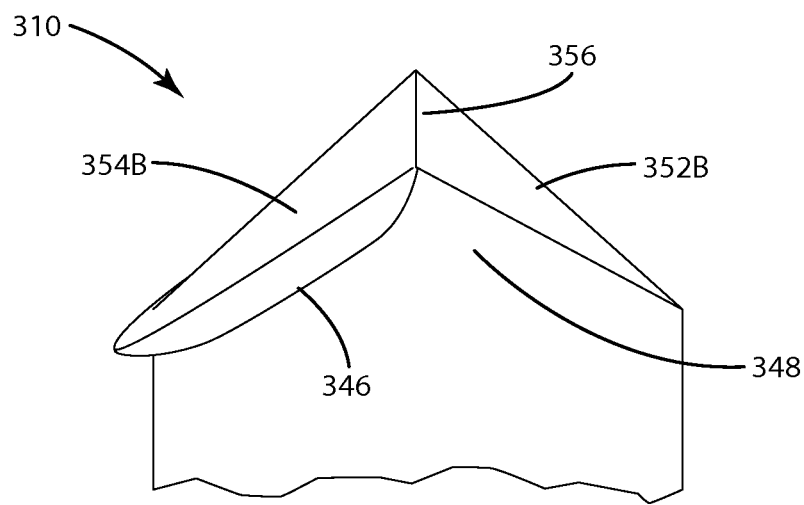
FIG. 20 is an enlarged side view of an end of a third alternative embodiment of the fastener.
Figure 21:
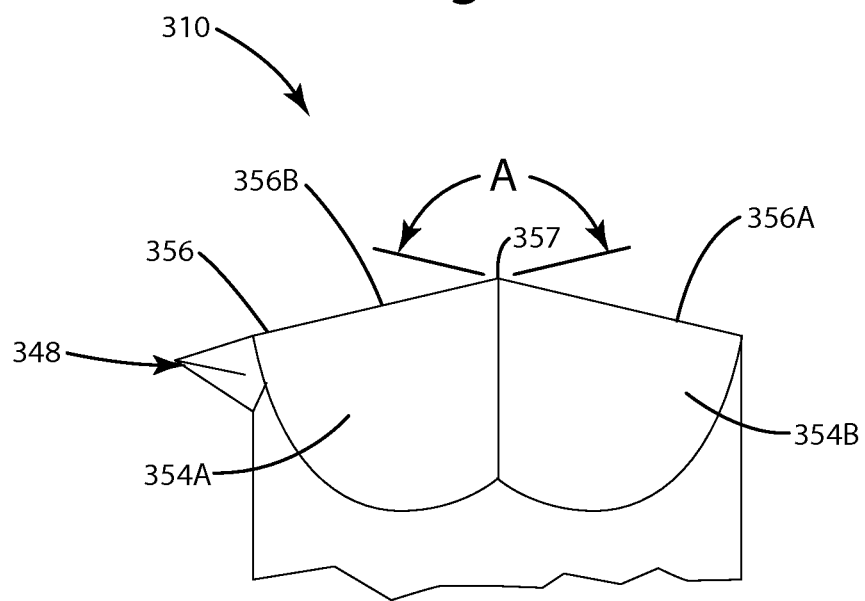
FIG. 21 is another enlarged side view of the end of the third alternative embodiment of the fastener.

A third alternative embodiment of the screw is illustrated in FIGS. 20 and 21 generally designated 310. This embodiment is similar to the above embodiments in construction and operation with a few exceptions. For example, the chisel edge 356 includes a small apex or point 357 at which the chisel edge sub portions 356A and 356B intersect. In this chisel edge construction, the chisel edge sub portions can be at an angle A relative to one another. This angle can generally be an obtuse angle, that is, greater than 90° and optionally less than 180°. In this embodiment, the inclined surfaces can be divided into sub portions 352a and 352b, and 354a and 352b, or additional sub portions if desired. These sub portions can include the negative rake angles or other angles of the inclined surfaces of the embodiments described above. The screw of this embodiment also can include a last thread 346 with a leading portion 348 that merges or transitions into one or more of the inclined surfaces, generally forming an extension of those surfaces, the chisel edge, or other components of the end of the screw. Further, the chisel edge of this fastener can include a chisel brake point and can operate like the embodiments described above.

IV. Installation Tools

As mentioned above, a tool can be used to start and advance the above mentioned fasteners, or other fasteners, into one or more work pieces to join those work pieces in the manners explained above. For example, a tool can be used to start a screw and subsequently advance the screw through the side of a board and subsequently into an underlying or adjacent joist or other structure.

Figure 22:
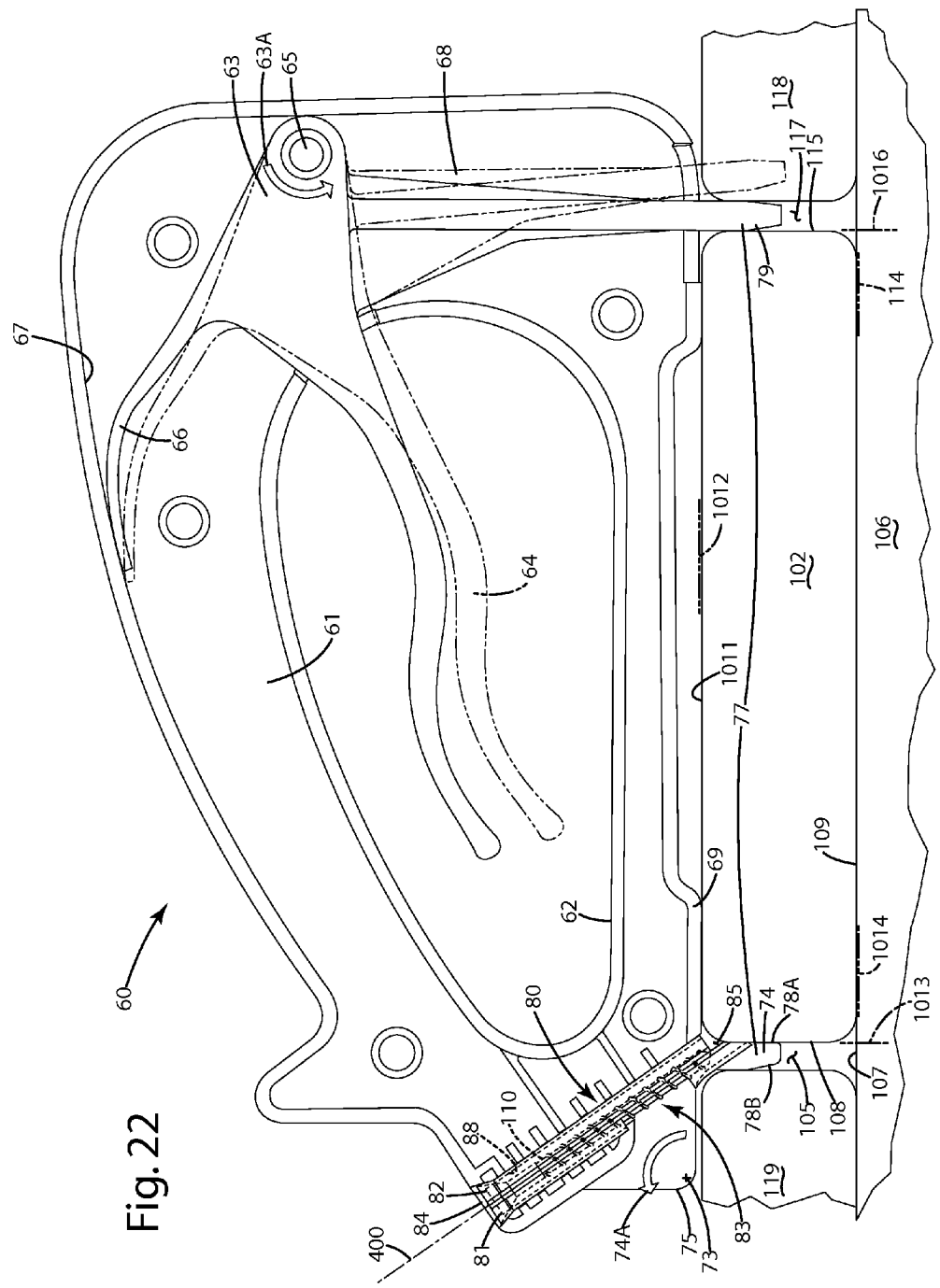
FIG. 22 is a side view of a current embodiment of a fastener installation tool.
Figure 23:
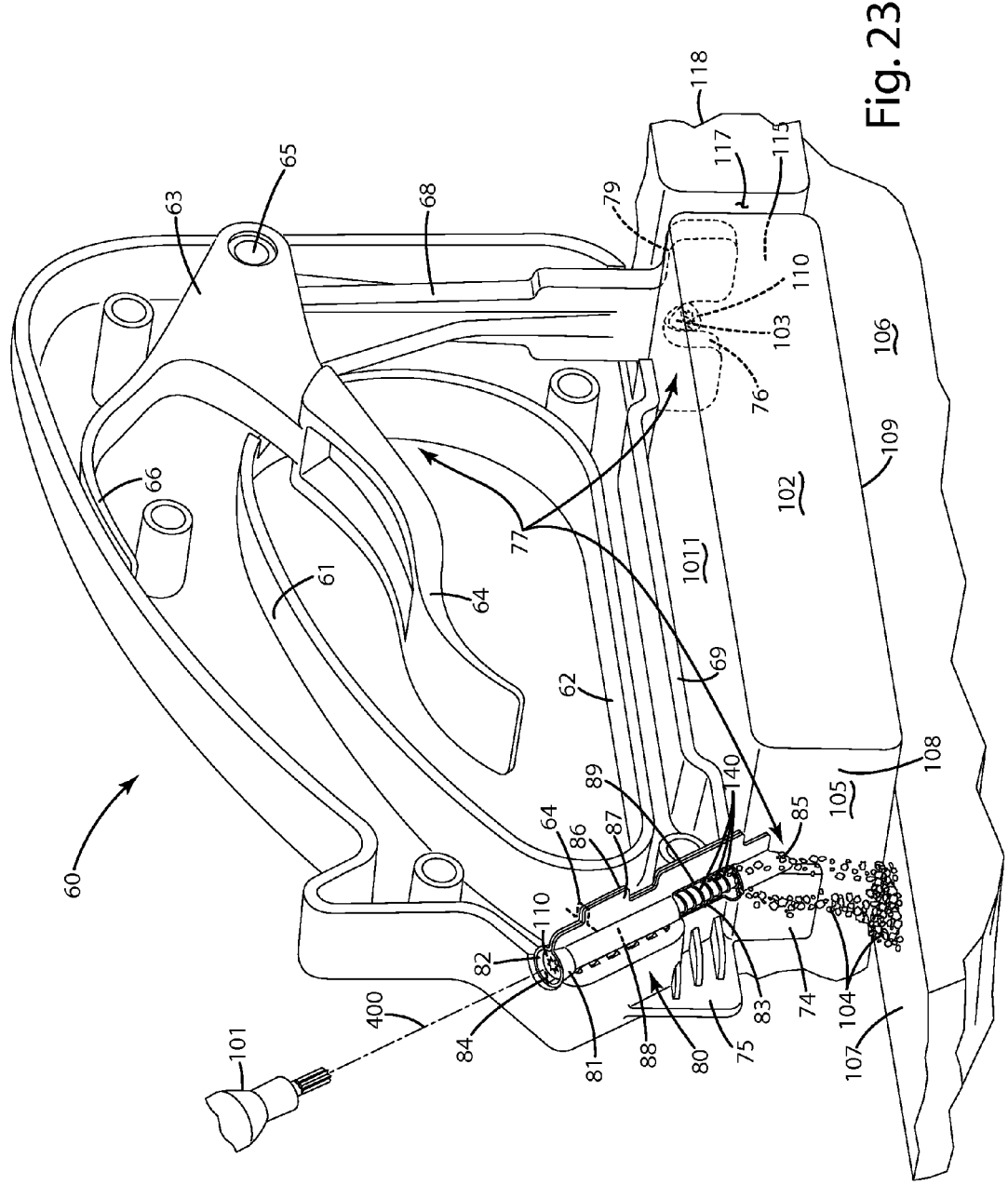
FIG. 23 is an end perspective view of the fastener installation tool.
Figure 24:
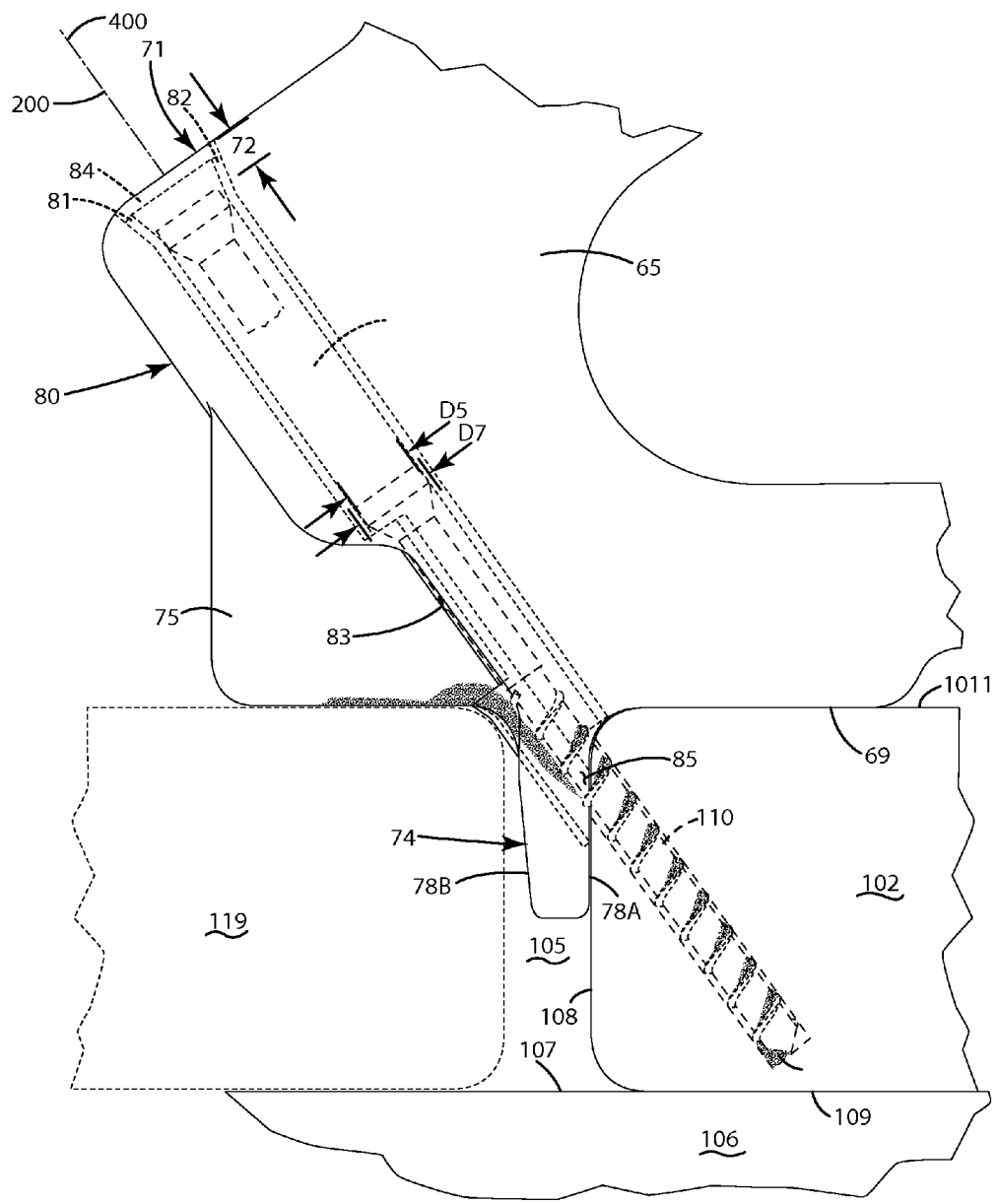
FIG. 24 is a close up view of the fastener installation tool in use installing a fastener.

A current embodiment of a tool suitable for such a fastener installation is illustrated in FIGS. 22-24, and generally designated 60. As shown there, the tool 60 can include a frame 62 including a handle 61, a guide 80 and an optional clamping assembly 77. The frame 62 can include a bottom surface 69 that is adapted to engage a top surface 1011 of a work piece 102. This work piece can be a board or any other type of structure described herein. The tool can be used to install a fastener 110 as described above through the first work piece 102 and into the second work piece 106.

Generally in the embodiments shown, the work piece 102 can include a first surface, also referred to as a side surface 108 that lays in a first plane 1013. Opposite the first surface or side surface 108, on the opposite side of the work piece, can be an opposing side surface 115, or fourth surface, that lays generally in a fourth plane 1016. The work piece 102 also can include a third surface or top surface 1011 that generally lies at least partially within a third plane 1012, and a second surface or bottom surface 109 that generally lies in a second plane 1014 that is parallel to and on the opposite side of the work piece from the top surface 1012. The first surface 108 and fourth surface 115 can be generally perpendicular to the top 1011 and bottom 109 surfaces of the work piece 102.

The guide 80 of the tool 60 can generally define an angled bore 88 that is positioned in a non-orthogonal angle, or generally angularly offset from 90°, relative to the side surface 108 of the first work piece 102 when the tool 60 readied for advancing the fastener. The angled bore can extend from a first opening 84 to a second opening 85. The first opening can be configured to receive a fastener and generally operate as an entrance into which a fastener can be inserted into the tool 60. The second opening 85 can serve as an exit through which the fastener exits the tool 60 as it advances into the work piece 102.

The angled bore 88 in this embodiment, and in particular the guide 80, can include first and second guide plates 81 and 82. These guide plates 81 and 82 can be constructed from stamped parts forming opposing halves of the angled bore. The stamped parts can be metal, such as steel, stainless steel or other metals, or optionally composites or polymers. The stamped metal halves cooperate to form the angled bore 88.

As shown in FIG. 23, the guide plates 81 and 82 can include opposing tabs 86 and 87 (FIG. 23) that extend radially outwardly generally from the angled bore and/or the axis 400 of the angled bore. These tabs 86 and 87 can be positioned in the frame 62 so that they engage and contact one another. To join the tabs 86 and 87, the tabs can be inserted in slots 64 defined by certain portions of the frame 62. When placed in the slots, the guide plate tabs 86 and 87 can be held in close proximity to one another to generally secure the opposing halves 81 and 82 of the guide 80 together. Of course, where other constructions are desired, the guide plates 81 and 82 can be of a unitary construction such that the tabs 86 and 87 are eliminated. For example, in the embodiments described below, the angled bore 84 can simply be defined by a unitary structure screw guide. Alternatively, the plates 81 and 82 can be joined with fasteners projecting through or otherwise fastening the tabs 86 and 87.

Optionally, a protective plate 92 can be included with the tool 60. This protective plate 92 can be placed adjacent the first opening 84 to generally protect the uppermost edges of the guide plates 81, 81 from damage when the fastener 110 or a portion of a tool 101 is inserted in the angled bore 88. For example, the protective plate 92 can define a plate bore 94, which can be generally aligned with and/or centered on the axis 400 of the bore 88. The inner edge of the protective plate 92 adjacent the plate bore 94 can extend over and at least partially or fully cover the edges 98 of the respective guide plates 81 and 82. With the inner edge of the protective plate covering the edges of the guide plates, a fastener 110 or portion of the tool 101 can be guided or generally deflected so it does not engage those edges 98. In turn, this can prevent chipping, marring, breaking or other damage to those edges 98 and more generally to the guide plates with the fastener or tool. Of course, if desired, the guide plates themselves can include integral protective plates extending therefrom, or the protective plate 92 and similar devices can be absent from the construction altogether.

The frame 62 and the other various components of the tool 60 can be constructed from stainless steel, steel, other metals, composites and/or polymers. For example, as mentioned above, the guide plates 81 and 82, as well as the optional protective plate 92 can be constructed from steel, while the like components of the frame 62, such as the handle 61, the secondary handle 64 and the spacers 74 and 79 can be constructed from a polymeric material such as a high impact resistant plastic.

Referring to FIGS. 22 and 23, the guide 80 and/or frame 62 can include a spacer 74 that extends downwardly from the bottom 69 of the frame 62. The spacer 74 includes opposing side surfaces 78A and 78B. The side surface 78A can be configured to engage and rest immediately adjacent or up against the side surface 108 of the work piece 102. The opposing side surface 78B of the spacer 74 can be configured to be positioned adjacent another work piece 119 positioned near the first work piece 102, as described below.

The spacer 74 can project downwardly or generally protrude into a space 105 that is immediately adjacent the side surface 108 of the work piece 102. This space 105 can be defined by the dimension or width of the spacer 74 between the side surface 78A and the second side surface 78B. Of course, if other types of spacers or indexing elements are desired, they can be included and extend outwardly from the bottom surface 69 of the frame 62. For example, the spacer 74 can be configured to fit in the space 105 that is immediately adjacent the side surface 108 of the work piece 102 as shown. The spacer can be of a dimension or width, for example about ⅛ to ½, 1/16 to 3/16, or about ¼ of an inch, to effectively set the preselected spacing or distance between a first work piece 102 and a third work piece 119 as shown in FIG. 22. Alternatively, the spacer can be dimensioned to precisely fit between already preinstalled work pieces or boards to further fasten those boards to underlying substructures or improve the fastening of the boards to other structures.

The side surface 78A of the spacer 74 also defines the second opening 85 of the angled bore 84 through which a fastener is adapted to exit. Further, the guide plates 81 and 82 can extend downwardly to the opening 85 and terminate at or adjacent the side surface 78A. The second opening 85 can be positioned a preselected distance away from the bottom surface of the frame 62 in certain applications. Although as shown the second opening 85 opens out the side surface 78A of the spacer 74, the angled bore alternatively can be constructed so that it opens out the bottom surface 69 of the frame 62 (not shown).

With the illustrated configuration of the guide 80 and the spacer 74, the angled bore 84 extends through these elements and generally through the space 105 immediately adjacent the side surface 108 of the work piece 102. The angled bore 88 can substantially encase or otherwise contain a fastener 110 all the way up to the side surface 108 of the work piece 102. Optionally, the opening 85 can be placed within about 1/16 to about ⅛, further optionally about 1/16 to about ¼ of an inch from the side surface of the work piece 102. Further optionally, the opening 85 can be configured so that at least a portion of it lays within a plane that is generally parallel to the plane 1013 in which the side surface 108 of the board lays.

Accordingly, when the fastener 110 is rotated, even when its end includes a chisel break point or other construction, that end is restrained and generally contained in the bore 88, so that it does not wobble excessively, even when beginning to penetrate the side surface 108 at the angle as illustrated or described in the embodiments of the fastener above. This can provide a precise alignment of the fastener 110 into the side surface of the work piece 102 and into or through other surfaces of that work piece 102 and underlying work pieces 106.

The fastener guide 80 can also be configured to include a material ejection port 83 that is in communication with the angled bore 88. As shown in FIG. 24, the guide plate 81 can define a material ejection port 83. The material ejection port 83 can be a hole that is located between the first opening 84 and the second opening 85. The precise location of the material ejection port 83 and its dimension can be selected based on the material to be augured or otherwise ejected or evacuated out from the angled bore 88. As illustrated, the material ejection port is positioned generally above the bottom surface 69 of the frame 62, and can be about ½" long. Of course, it can be of other dimensions, for example about ⅛ to about ¼ of an inch in length. Generally, it can be of a dimension that is sufficient to allow material augured by a fastener 110 to eject from the port 83.

The material ejection port 83 can be dimensioned and located so that it is defined on the underside of the angled bore 88 so that the material drops out from the bore via gravity through the port. The material ejection port 83 can be large enough to drop out fibers or other material augured from the work pieces, yet small or short enough so that a screw inserted into the angled bore 88 from the first opening 84 will not have its end drop out from, or otherwise protrude, or get hung up in the ejection port 83 while the screw moves toward the second opening 85.

The material ejection port 83 can include a lowermost rim 95 as shown in FIGS. 23 and 24. This lowermost rim can be positioned so that it is located above the top surface 1011 of the work piece 102, and/or so that it is also located above the top surface 1111 of an adjacent work piece 119. With such a positioning of the lowermost rim of the material ejection port, material augered up through the angled bore can be ejected out from the bore generally above the top surface 1011, as well as the top surface 1111 if the work piece 119 is in place adjacent the work piece 102. In turn, the ejected material can freely flow out from the port over or adjacent the lowermost rim 95. It is noted that the lowermost rim may be considered to be above the top surface 1011 of a particular work piece merely because it is above the plane in which the surface is located. For example, the lowermost rim 95 in FIG. 24 can be considered above the top surface 1011 even though it is not directly over that top surface 1011. Optionally, in certain applications, the material ejection port can be eliminated from the tool.

The material ejection port also can be housed between opposing frame flanges 75 which extend from the rearward portion of the frame 62. These flanges 75 can extend outward a sufficient distance to generally conceal the material ejection port 83. If desired, the flanges can form and include a pivot axis 73. The frame itself 62 can pivot about this pivot axis 73 in the direction of the arrow 75A after a fastener has been sufficiently advanced and installed in a work piece 102 to fasten or join it with another work piece 106. By pivoting the frame about the pivot axis 73 and in general having the frame rotate on the rearward portion of the flanges 75, undue stress and forces on the spacer 74 can be reduced or eliminated. This can add to the longevity of the spacer, particularly where it is constructed from a polymer material. Of course, the flanges 75 can be eliminated altogether if desired.

With further reference to FIG. 23, the material ejection port can include edges 89 constructed to function as wipers to wipe or pull material 104 entrapped within the threads 140 of the fastener 110 out therefrom. The edges can be configured to extend generally along or parallel to the axis 400 of the angled bore. Of course, the edges alternatively can be offset at a predetermined angle relative to that axis 400 as desired. The edges can be somewhat sharpened or otherwise disposed at a right angle relative to the rotation of the fastener 110. In this manner, any excessive material that protrudes from beyond the crests of the fastener threads can catch or otherwise engage the edges 89. In so doing, the edges can dislodge the material 104 from the threads and cause it to further drop out with the assistance of gravity from the port 83. Where the material 104 is taken from a work piece constructed from a composite or polymer or an extremely fibrous material, the wiper edges can act to wipe these materials from the fastener as it rotates the angled bore 88 to prevent or impair binding of the fastener 110.

Generally, the wiper edges can be generally linear, but of course can be tapered or curved as desired. Further, the edges can be positioned somewhere around the circumference of the fastener 110 so that as the fastener rotates at least a portion of it passes by and is capable of engaging augered material associated with the fastener against the edges. In some circumstances, where the material is known not to be of a type that would excessively bind the rotation of the fastener 110, the edges can be absent. For example, the material ejection port can extend all the way around the circumference of the angled bore 88.

The material ejection port can serve to remove or eject bored material from the angled bore to reduce some or all of the amount of material pulled back into the pre-bored hole by the fastener, which in some cases can cause damage, such as splitting or bulging of the work piece in the area surrounding the fastener. For example, the material ejection port can enable material augured up from the work piece to be ejected away from the threads and shaft of the fastener. In cases where the material ejection port is absent, or otherwise does not facilitate ejection of the material from the bore, and the head of the fastener is dimensioned so that it is almost the same dimension as the angled bore, the head might capture and drag all the pre-bored material back into the hole as the head advances toward the hole. That material would be captured in the space between the shaft and threads, and the walls of the angled bore, with the head acting like a cap or piston to pull the augered material between it and the work piece back into the pre-bored hole. With the material ejection port, the material augered or removed from the hole is ejected from the bore so that there is minimal, if any, augered or removed material for the head to pull into the hole. In turn, this can reduce the likelihood of damage to the work piece around the area of the hole caused by the material entering the hole, possibly along with the components of the fastener. Of course, in certain applications where material might not readily be pulled into the hole by the fastener, the material ejection port can be eliminated.

As shown in FIG. 24, the guide 80 optionally can include a beveled portion 83A adjacent the lower extremity of the port 83. This beveled portion can generally increase the internal area of the bore adjacent the port 83. The bore also can serve as a ramp to assist the material 104 being ejected out from the bore 88 through the port 83. The angled bore 88 can have an internal dimension D7, which can be in the form of a diameter about 0.1 to about 0.4 inches, optionally about 0.15 to about 0.75 inches, or other dimensions greater or less as desired. In general, the diameter D7 can be slightly larger than the dimension than the head D5 of the fastener 110. For example, the dimension of the diameter D5 can be about 0.001 to about 0.05 inches less than the diameter D7 of the angled bore 88.

Other tolerances can be suitable as well, depending on the application. The diameters D5 and D7 can be matched so that the head of the fastener does not excessively wobble or move other than rotationally and/or along the axis 400 of the angled bore 88. This in turn can reduce, impair or otherwise prevent wobble of the fastener 110 as it is advanced into the work pieces. It also can prevent or impair the axis of rotation 200 of the fastener 110 from becoming misaligned or substantially non-parallel with the axis 400 of the angled bore 88, which also can be considered the advancement axis of the fastener 110. In certain circumstances where the axis 200 of the fastener 110 becomes significantly deviates or is at a substantial angle relative to the axis of advancement 400 of the angled bore 88, it is possible that the portions of the fastener can bind against the material surrounding the second opening. In limited circumstances, this can impair advancement and/or rotation of the fastener and/or otherwise impair the functioning of the tool and its removal from the respective work piece.

The angled bore 88 as shown in FIGS. 22 and 24 can be configured so that it is of a length that closely corresponds to the length of the fastener 110. For example, the length of the angled bore 88 can be about 1.9 to about 2 inches in length, while the length of the screw is about 1.5 to about 1.9 inches in length. Of course, other lengths of the bore and fastener could be selected and still function suitably for other applications. With this particular embodiment, where the fastener is slightly shorter than the length of the angled bore 88, the fastener 110 can be substantially encased within the angled bore 88 immediately before it is advanced into the work piece. In this manner, the features of the fastener can be restrained or otherwise contained within the bore to prevent excessive wobble. For example, the end of the fastener can be closely constrained as it begins to penetrate the side surface 108 of the work piece 102.

Optionally, the angled bore can be about 0.01 to about 1.0 inches, further optionally about 0.25 inches longer than the fastener 110. Accordingly as shown in FIG. 24, when the fastener is positioned in the angled bore 88 before it is advanced into the work piece, as shown in broken lines in FIG. 24, the head of the fastener 110 can be a preselected distance 72 inward from the portion of the frame 71 surrounding the angled bore 88 and in particular the opening 84. Optionally, the angled bore 88 itself, in particular the guide plates 81 and 82 can include a slight frustoconical taper at or adjacent the first opening 84 extending outwardly to the surrounding portion 71 of the frame 62. With the head of the fastener 110 slightly disposed inwardly slightly from the surrounding surface, a user can quickly center a drive, such as a Philips or star drive feature associated with a drill, in the head of the fastener. The region of the angled bore 88 above the head of the fastener 110 can act to capture and guide the drive feature into the head more easily. Alternatively, if desired, the fastener 110 and angled bore 88 can be more grossly mismatched in length. For example, the fastener 110 can be longer than the angled bore 88 so that it protrudes outward beyond the surrounding portion 71 of the frame 62 a preselected distance in certain applications.

With reference to FIGS. 22-23, the tool 60 can also include a clamp assembly 77. This clamp assembly can include the first spacer 74 and a second spacer 79 spaced distal from the first spacer. The distance between the first and second spacers can be about the width or slightly larger than the width of the work piece into which the tool is designed to install fasteners. Further, this distance can be varied by operating the clamping assembly 77. For example, the second spacer 79 can be spaced about 5"-6" from the first spacer 74 and can be actuated to move closer to the first spacer 74 to close the distance between those elements to the precise dimension or width of the work piece 111 into which the fastener is to be driven. This can provide a clamping action to clamp the side surfaces 108 and 115 of the work piece 102 between these features of the tool. In turn, this can temporarily rigidly hold the guide 80 and/or spacer 74 in a fixed orientation relative to the board 102 and more particularly hold the axis 400 of the bore 88 in a desired alignment with the side surface 108 of the work piece 102. In turn, the fastener can be rotated and advanced precisely into a desired location through the side surface 108 and into and through the first work piece and/or second work piece. More generally, the clamp assembly 77 can hold the tool 60 in a desired orientation and aim the fastener 110 precisely into and/or through the work pieces.

Optionally, the clamp assembly 77, or more generally the tool when no clamp assembly is included, positions the first spacer side surface 87A immediately adjacent the side surface 108 of the work piece. The second opening 85 can also be placed immediately adjacent the side surface 108 of the work piece. In such a configuration, there may be little or no gap or void between the side surface and these elements. Accordingly, when a screw, for example, an embodiments of the fasteners described herein, is rotated in the angled bore, it is rotationally constrained right up to the side surface into which it is to advance. Where the end of the screw is configured to pre-bore a hole, this rotational constraint can offset the tendency of the screw end to wander or wobble when it is rotated against the work piece, and in turn assist in starting the screw in the work piece.

The clamp assembly further includes an arm 68, a secondary handle 64 and a biasing element 66, as shown in FIGS. 22 and 23. These elements can all be joined with a common element 63. The common element 63 can be rotatably mounted on a pivot axle 65. The arm 68 can extend downwardly through a portion of the frame 62 and be connected with the spacer 79. The secondary handle 64 can extend at another location outward from the common element 63 and can be disposed generally adjacent the handle 61. The secondary handle 64 can be moveable relative to the handle 61 and generally relative to the frame 62. The secondary handle 64 can be considered movably joined with a frame 62 and adapted to actuate the clamp assembly and move the second spacer 79 to effectuate a clamping action on the work piece 102.

Optionally, the secondary handle 64 can be spaced a preselected distance from the handle 61 so that a user can manually grasp simultaneously both the handle and the secondary handle and squeeze those elements so that they move closer to one another. In so doing, the secondary handle 64 rotates the common element 63 about the pivot axis, which in turn rotates the arm 68 and correspondingly the second spacer 79 toward the first spacer 74 to provide a clamping action on the work piece 102.

The secondary handle 64, as well as the arm 68 and spacer 79 can be biased toward the configuration shown in broken lines in FIG. 22 by the biasing element 66. This biasing element can be in the form of a biasing arm 66 that, when installed in the frame, can engage the interior surface 67 of the frame 62 and accordingly urge the common element 63 in the direction of the arrow 63A shown in FIG. 22. In turn, this can urge the secondary handle 64 and the arm 68 to the configuration shown in broken lines in FIG. 22 as well.

To overcome this biasing action, a user can manually grasp a secondary handle 64 and pull it toward the handle 61, which will cause a clamping action on the side surfaces 108 and 115 of the work piece 102, thereby holding the angled bore 88 and generally the axis 400 of the bore in a desired orientation relative to the side surface 108 of the work piece 102.

Other biasing elements can be used to provide the clamping action of the tool 60 on the work piece 102. For example, instead of the biasing element 66 being preformed and engaged against the interior of the frame, a coil spring or leaf spring could be positioned adjacent the common element 63 to urge the arm 68 and second spacer 79 in a desired direction about the pivot 65. Optionally, the pivot could have a coil spring built between it and the common element to provide a biasing force. Further optionally, the biasing element 66 could urge the arm and the spacer in a direction about the pivot axis 65 in the direction opposite that shown by the arrow 63A in FIG. 22. In such a construction, the user would then move the secondary handle 64 away from the handle 61 to open up the distance between the first spacer 74 and the second spacer 79. With such an alternative configuration, upon installing the respective spacer on the opposing side surfaces of the work piece 102, the user could release the handle so that the biasing element urges the respective spacers to move relative to one another and provide a clamping action on the work piece 102.

With reference to FIG. 23, the second spacer 79 can define a recess or hole 76 therein. This recess can extend all the way through, or only partially through, the second spacer 79. This recess 76 can be configured to straddle or otherwise extend around a hole in which another fastener 110 is positioned. This can be helpful in cases where the area surrounding the hole 103 is slightly raised due to the boring of the hole 103 by the fastener, or where the fastener is not of the type that pre-bores a hole, or where the fastener excessively bulges out material in the area surrounding the fastener 110. The recess 76 generally surrounds the area so that the bulge in the material does not affect the dimension of the space 117 between the adjacent side surfaces of the respective work pieces 102 and 118. Accordingly, the spacer 79, even when overlapping bulged out material surrounding previously installed fasteners can be consistently spaced to provide a clean, even appearance in the spacing between the adjacent work pieces. Although shown in a generally U-shape, the recess or hole 76 can be of square, rectangular, triangular, or some other geometric shape sufficient to surround a fastener hole or fastener head on an adjacent work piece. Further, the recess 76 can extend farther up the arm 68 depending on the application.

Referring to FIGS. 22-24, a method for installing a fastener with the tool 60 to join work pieces will be briefly described. To begin, a first work piece 102 is provided where the first work piece includes a top surface 111 and opposing bottom surface 109, a first side surface 108 and an opposing side surface 115. The bottom surface 109 of the work piece is placed adjacent the upper surface 107 of the second work piece 106. As illustrated, the second work piece 106 can be, for example, a underlying joist or subfloor. The first work piece 102 can be a deck board or other board constructed from any suitable board material as described above.

If a previous work piece 118 is already fastened to the underlying work piece 106, the spacer tool 60 can be placed atop the work piece 102 with the bottom surface 69 resting adjacent that the upper surface 1011 of that work piece 102. The spacer 79 can establish a preselected spacing that is the equivalent of the dimension or width of the second spacer 79 between the work piece 118 and work piece 102 and in particular the side surfaces of those work pieces that are adjacent one another.

The tool can be positioned so that the first spacer 74, and in particular the first side surface 78A of the first spacer 74 is positioned adjacent the side surface 108 of the work piece 102. In so doing, the second opening 85 also is positioned adjacent that side surface 108, with the angled bore 88 and related advancement axis 400 aligned at a predetermined non-orthogonal angle relative to the side surface 108 and the plane in which the side surface 108 lays. The second opening 85 is located so that it is immediately adjacent the first side surface 108 of the work piece 102. To further secure and hold the angled bore 88 and opening 85 in these respective locations, a user can manually grasp the secondary handle 64. In so doing, the handle actuates the common element 63 rotating it about the pivot axis 65. This rotates the arm 68 and accordingly moves the second spacer 79 toward the first spacer 74. In turn, this can provide a clamping action to clamp the first work piece 102 between the first spacer 74 and the second spacer 79. As an example, the first spacer 74 can engage the first side surface 108, and the second spacer 79 can engage the other side surface 115.

A fastener 110 can be installed in the angled bore 88. Assuming the fastener is an equal or lesser length than the angled bore, the fastener can bottom out and engage the side surface 108 of the work piece 102. A small distance 72 as shown in FIG. 24 will be left above the head of the screw. A user can then advance a driving tool 101 toward the frame. Due to the recessed configuration of the fastener head in the angled bore 88, the tool can center within the angled bore 88 and come to rest in the drive feature of the fastener 110.

While holding the tool 60 in a clamped configuration, with the axis 400 along a desired line of advancement into the work piece 102, a user can actuate the drive tool 101 to rotate the fastener 110 as described with the fastener embodiments described above, or some other fastener as desired. The fastener 40 can be advanced along the axis 400 within the angle bore 88 so the fastener enters the first side surface 108 of the work piece 102 immediately after exiting the second opening 85 of the angled bore. The fastener then travels partially out the bottom surface 109 of the work piece 102. Thereafter the fastener continues to rotate and penetrates the upper surface 107 of the second work piece 106 and continues to advance until the head of the fastener is at a desired location, which can be within a pre-bored hole created by the fastener, or generally so that the head of the fastener is at least partially concealed from view from above and generally does not obstruct the positioning of another work piece adjacent the first work piece 102.

Where the fastener of the embodiments described above is used, as the fastener is advanced into the work piece 102, it pre-bores a hole, and the material 104 from that hole is augured or otherwise fed up the threads. The material is ejected or evacuated generally from the angled bore 88 through the material ejection port 83. This action is shown in FIGS. 23 and 24. Where the material ejection port 83 includes an edge 85 adjacent the material ejection port 83, that edge can scrape augured material off from the threads or the remainder of the fastener 110, and assist in evacuating that scraped material from the angled bore 88.

After the first work piece 102 is installed and joined with the second work piece 106 with the fastener 110, a third work piece 119 (FIG. 22) can be installed adjacent the first work piece 102, atop the second work piece 106. The tool can be moved to a position atop the third work piece 119 in a manner such as that used in connection with the first work piece 102. The first 74 or second 79 spacer, depending on the orientation of the tool 60, can establish the desired spacing between the first work piece 102 and the third work piece 119. A new fastener can be inserted in the angled bore as with the previous fastener described above. That new fastener can be advanced along the advancement axis 400 in a manner described above to install the new fastener in the third work piece 119 and second work piece 106 to join those work pieces together. The above process can be repeated at worksite to install multiple work pieces and join them with other work pieces.

The tool above and any of the other alternative embodiments of the tool herein, can be used to install multiple deck boards on underlying substructure subfloor or joists. The work pieces can be boards, which as used herein can include deck boards, porch boards or other boards constructed from wood, particle board, composites, polymers, plastics, metal or other materials as desired. In installing the fasteners and work pieces to join them together, the tool can provide a way to quickly and precisely align the fasteners with the respective side surfaces of the work pieces or boards and install them in a manner such that they are generally concealed from view when viewed from a viewer directly above. Further, the angled bore of the tool, and in particular the guide surrounding the angled bore extending upwardly above the upper surface of an adjacent work piece, can effectively prevent the threads of an advancing fastener from gouging, damaging or marring an immediately adjacent work piece as that advancing fastener is advanced into an adjacent work piece.

V. First Alternative Tool Embodiment

Figure 25:
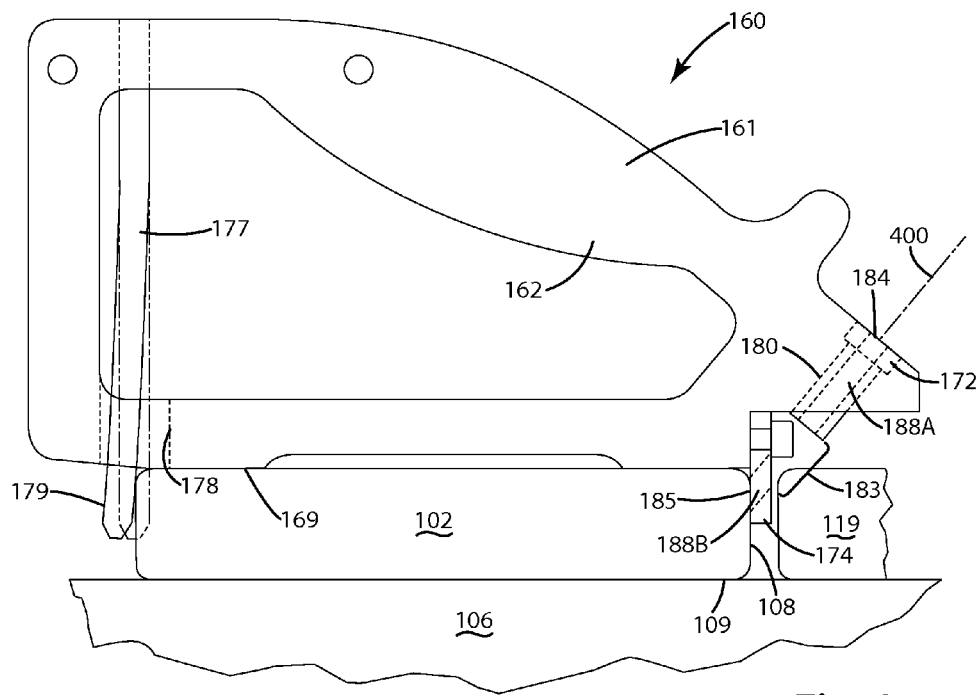
FIG. 25 is a side view of a first alternative embodiment of a fastener installation tool.
Figure 26:
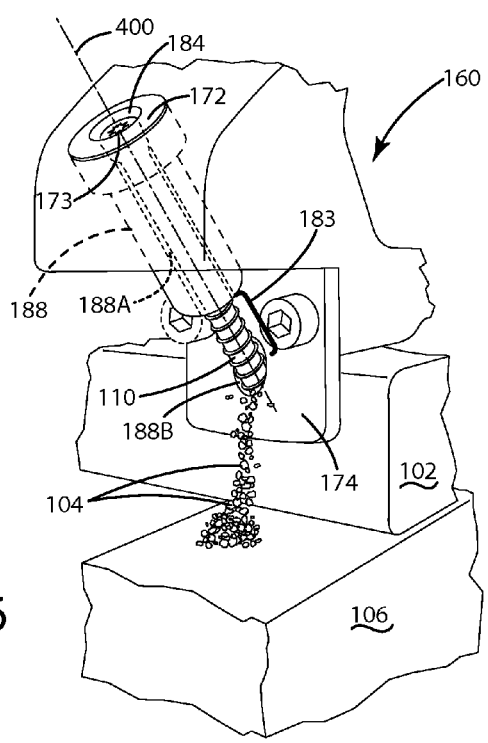
FIG. 26 is a close up view of the first alternative embodiment of the fastener installation tool in use installing a fastener.

A first alternative embodiment of the installation tool is shown in FIGS. 25 and 26 and generally designated 160. This embodiment of the tool is similar to the first tool embodiment described above with several exceptions. For example, the tool 160 generally includes a handle 161, a fastener guide 180, also referred to as a pilot element, and a spacer plate 174. The screw guide 80 can be installed in a frame 162 constructed from a polymeric or other material, which can generally be of a solid or hollow construction like that described in the embodiment above. The guide 180 can include an angled bore which includes first and second angled bore portions 188A and 188B. The first portion 188A can be defined by the primary guide element 172 and the second portion 188B can be defined by the spacer plate 174, which also can be referred to as a spacer. The primary guide element 172 can be configured at an angle relative to the spacer 174, however, the angled bore portions 188A and 188B can be aligned with and parallel to one another along the axis 400 of the angled bore. As with the embodiment above, this axis 400 can be configured and oriented at a fixed predetermined angle relative the side of the work piece 102 into which it advances a fastener 110. As with the above embodiment, a fastener 110 can be disposed within and generally circumferentiated by the primary 188A and secondary 188B portions of the angled bore 188. The primary and secondary portions can be dimensioned to be the same, and slightly larger than the outermost dimensions of the head and/or threads of the screw 110, so that as with the embodiment above, the screw can be constrained yet still rotate and advance along the axis 400 when driven and rotated by a powered or manual tool.

The primary and secondary portions 188A and 188B of the angled bore can be separated from one another by a gap 183 formed therebetween. This gap can also be referred to as a material ejection port and can operate similar to the material ejection port described in the embodiments herein. For example, material 104 that is scraped or pre-bored from a work piece 102 and augered up the angled bore can be ejected or extracted out the port 183 to prevent or impair binding of the fastener as it advances or rotates.

Although the material ejection port 183 is shown as being formed by separate elements, for example being formed between the spacer 174 and the primary guide portion 172, the gap can be replaced with an alternative structure. For example, the guide 180 and in particular the angled bore can extend all the way to the location adjacent the surface of the side surface 108 of the work piece 102. In this alternative construction, the guide 180 can include a transversely drilled hole or a milled gap at least partially therethrough to allow the removed material 104 to escape from the angled bore 188 as shown in FIG. 26. Optionally, the end of the guide 180 adjacent the work piece 102 can be at an angle that corresponds to the surface of the work piece. Alternatively, the end of the guide element can terminate at a plane that is orthogonal to the axis 400.

As shown in FIGS. 25 and 26, the spacer 174 can be in the form of a plate that is rigidly attached to the frame 162 with screws or other fasteners so that it does not move laterally or vertically relative to the remainder of the guide element 180 and/or the work piece as the fastener 110 is advanced through the tool 160. Accordingly, the features of the tool steadily aims the fastener toward a desired location on the side of the work piece 102, and constrains it, regardless of wobbling forces that are generated by the fastener engaging the work piece 102, as with the embodiments herein.

As illustrated in FIG. 25, the tool 160 also can include a second spacer 179. This spacer 179 can be mounted to an arm 177 that is further joined with a frame 162. The spacer can establish a gap between adjacent work pieces, much like that of the spacer in the first tool embodiment described above. The arm 177 and spacer 179 can project through a slot 178 that is defined in a portion of a frame 162. The spacer 179 can extend beyond the bottom surface 169 of the tool into a corresponding space between adjacent work pieces. The spacer 179 optionally can be adjustable, moving within the slot 178 to accommodate work pieces of different widths. For example, the spacer 179 can move toward or away from the first spacer 174 on the opposite end of the tool 160. With this construction, the spacer 179 can set a gap between the first work piece 102 being fastened down by the tool and a second work piece immediately adjacent that work piece. Optionally, the arm can be tensioned or under force so that it is urged against the opposing side surface of the work piece 102. In such a manner, it can act like a clamp to generally clamp the work piece between the first spacer 174 and the second spacer 179. The clamping action, however, can be somewhat less than that of the other tool embodiments described herein.

VI. Second Alternative Tool Embodiment

A second alternative embodiment of the fastener installation tool is illustrated in FIGS. 27-30 and generally designated 460. The installation tool shown there is similar in construction and operation to the embodiments described above with several exceptions.

Figure 27:
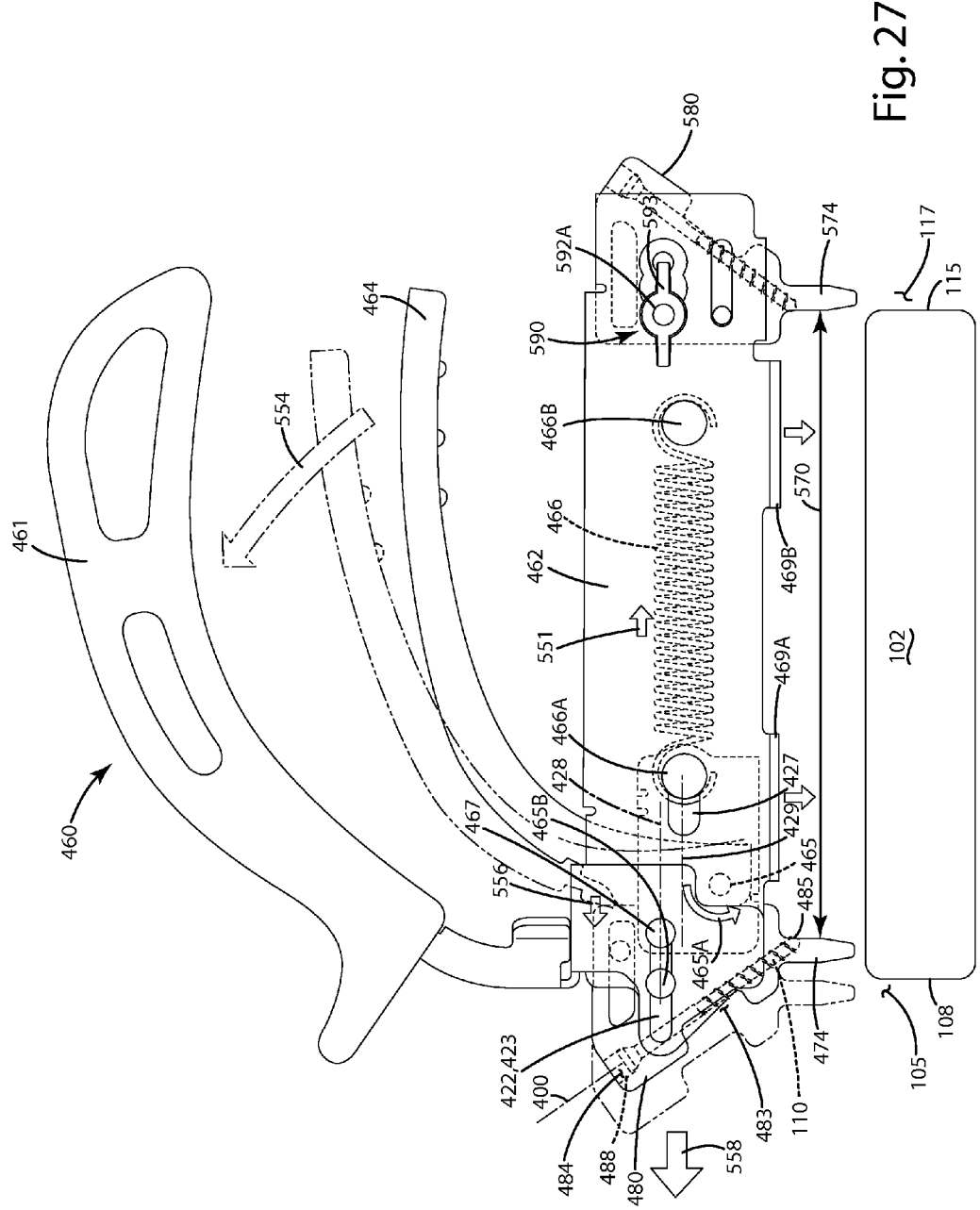
FIG. 27 is a side view of the second alternative embodiment of the fastener installation tool before being placed adjacent a work piece.

As shown in FIG. 27, the fastener installation tool 460 includes a handle 461 joined with a frame 462. The frame is joined with a first fastener guide 480 and a second fastener guide 580. A secondary handle 464 is operably joined to the frame 462 and a biasing element 466, as well as the first fastener guide 480. The secondary handle and biasing element 466 are adapted to move the first fastener guide 480 as described below.

Figure 31:
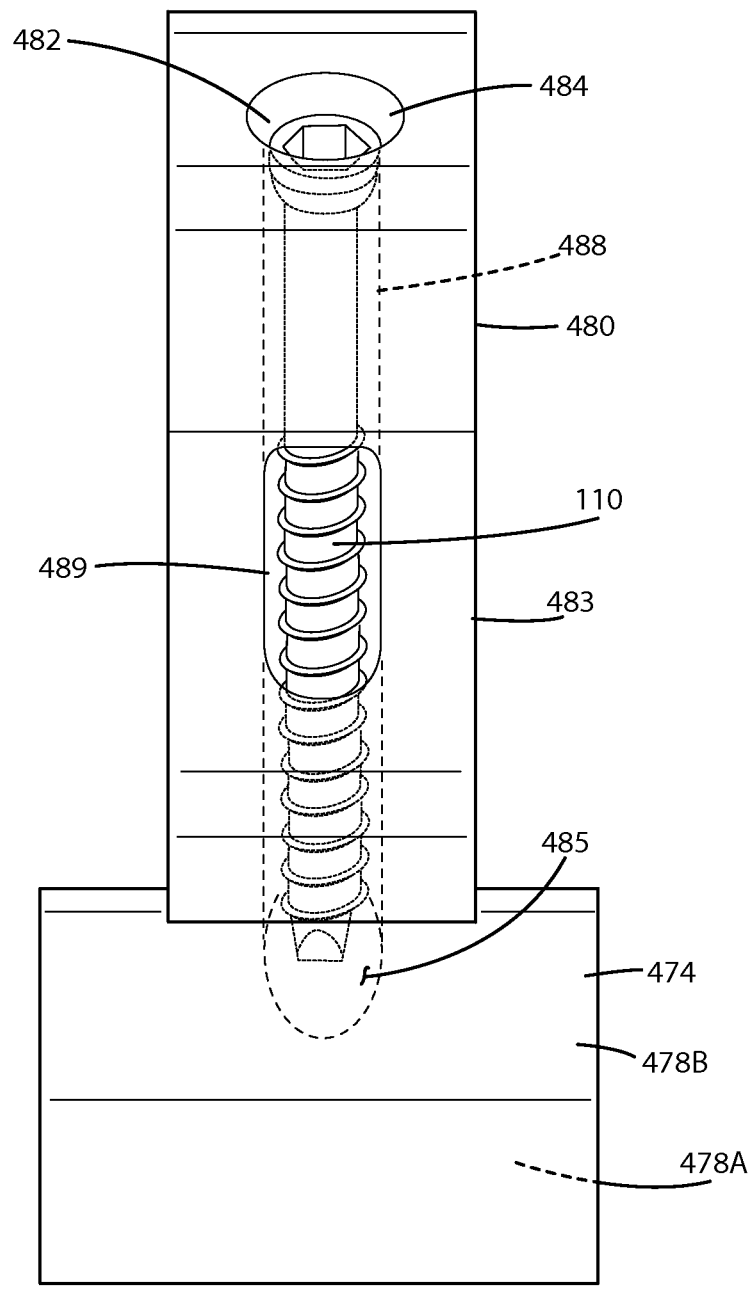
FIG. 31 is an enlarged end view of the fastener guide of the second alternative embodiment of the fastener installation tool.

Turning to FIGS. 27 and 31, the guides 480 and 580 are generally identical except reversed at opposite ends of the frame 462. Because the first and second guides are identical but simply reversed at opposite ends of the frame, only the first guide will be described here. The guide 480 is a monolithic structure that defines an angled bore 488 and further includes a or otherwise is joined with a spacer 474 that extends downwardly from the lower portion of the guide. The guide 480 can include a material ejection port 483 that is located between the first 484 and second 485 openings of the angled bore 488. The material ejection port can also include a lowermost rim 495 as described in the embodiments herein. Further, like the embodiments above, the angled bore can be aligned along an axis 400 along which the fastener 110 can be advanced in a manner similar to the above embodiments. The guide 480 can include a beveled region 482 (FIG. 31) adjacent the first opening 484 to guide the fastener 110 into the angled bore 488. Likewise, the angled bore 488 can be of a length that is less than the length of the fastener 110 as described above so that before being installed into a work piece, the top of the head is slightly recessed inward from the outer portion of the guide element to facilitate guiding of a drive feature of a tool into the head of the fastener 110.

Figure 30:
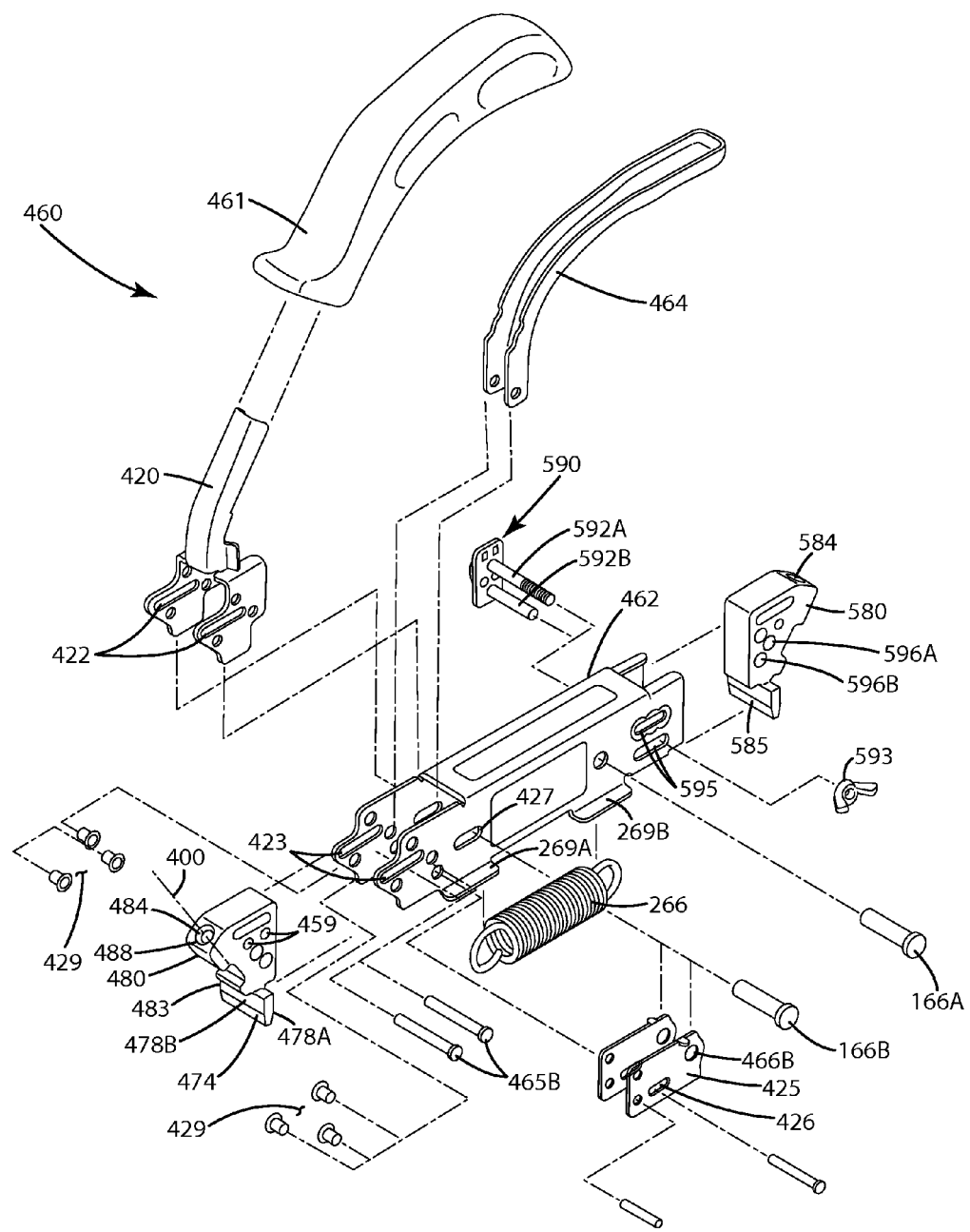
FIG. 30 is an exploded view of the second alternative embodiment of the fastener installation tool.
Figure 33:
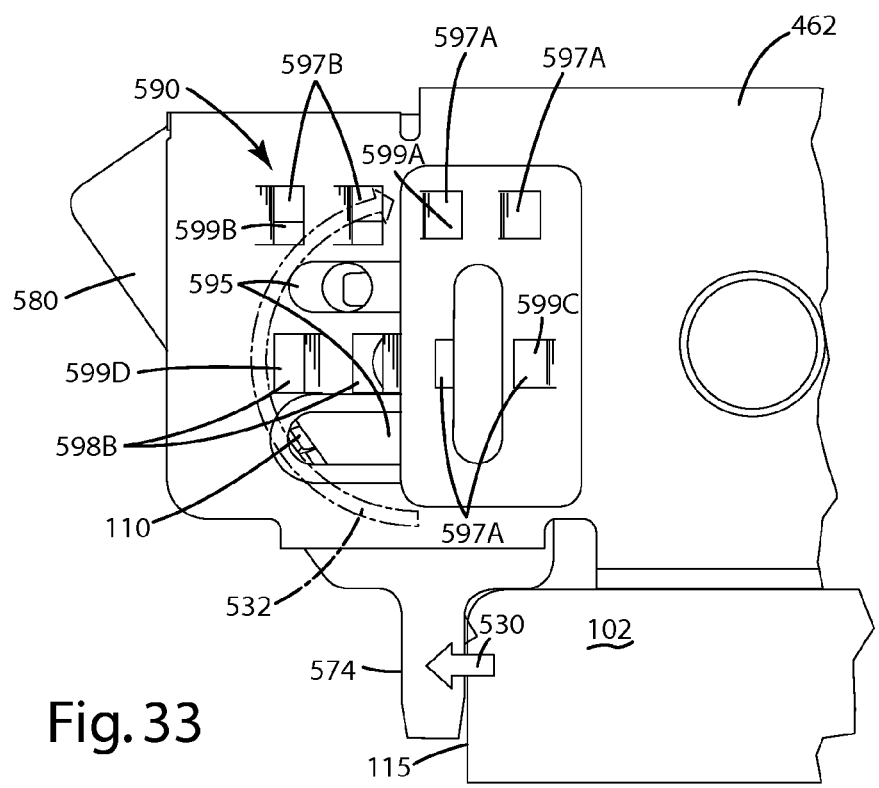
FIG. 33 is another side view of an adjustment element of the second alternative embodiment of the fastener installation tool.

The guide 480 also can include or be joined with a spacer 474 that can be monolithic with a remainder of the guide. The angled bore 488 can extend downwardly through the spacer 474 so that the spacer 474 defines at least a portion of the angled bore 488. The angled bore 488 can terminate at the second opening 485 which can be defined by the side surface 478A of the spacer 474. As with the above embodiments, when the tool is used to install a fastener, this opening and thus the fastener can be positioned immediately adjacent the side surface 108 of the respective work piece 102. Optionally, as shown in FIGS. 30 and 33, and described further below, the monolithic structure of either of the guides 480 and 580 including the spacer, bore, and material ejection port, can be removed and separated from the frame 462 as a unit for replacement or service.

The guide 480 can define additional apertures 489 (FIG. 30) through which pins 465B can fit to prevent excessive rotational movement of the guide 480 relative to the frame. These pins 465 can also be slidably disposed in a slots 422, 423 so that the pins can generally guide the guide 480 linearly in the direction of arrow 558.

Figure 28:
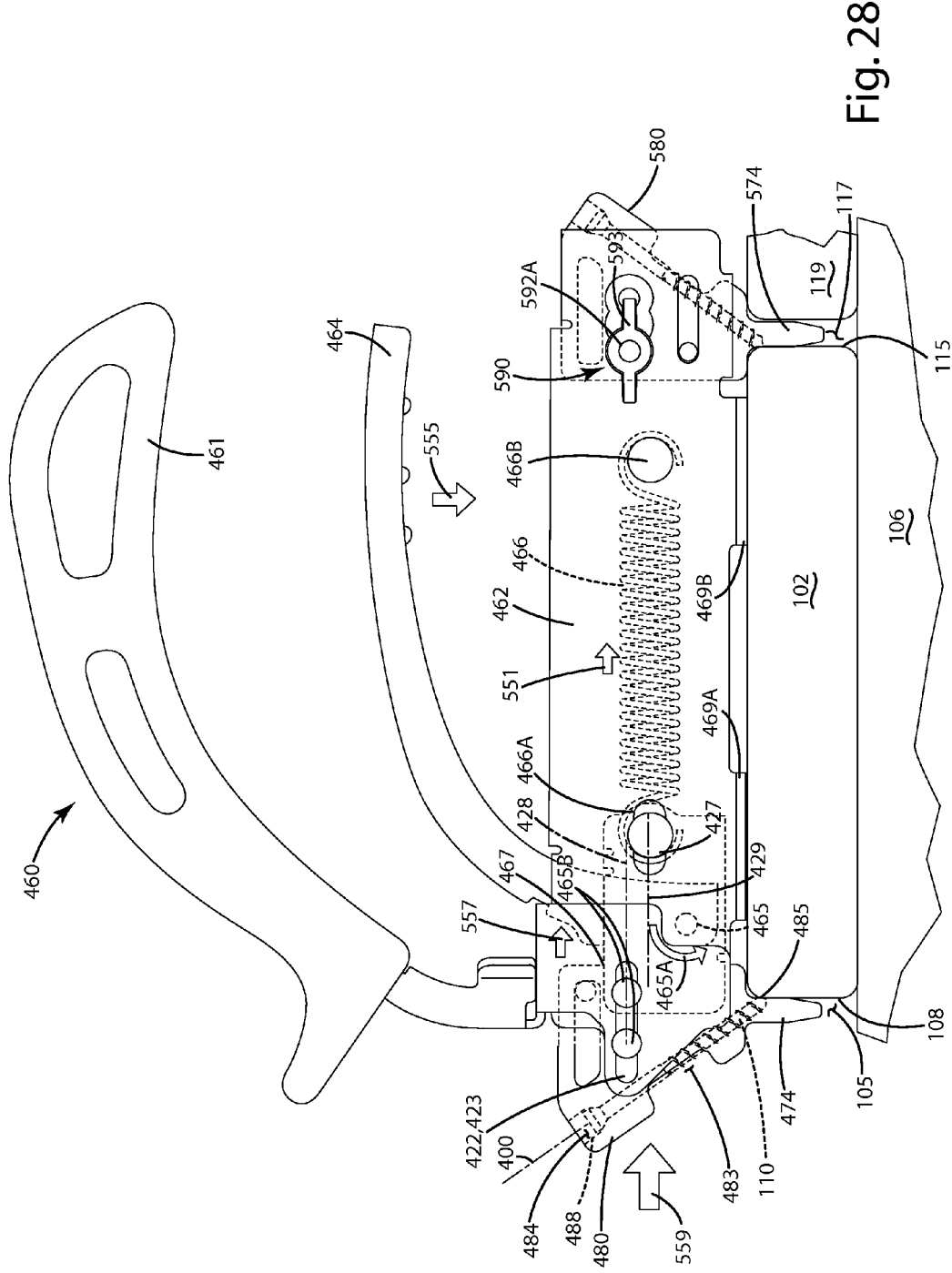
FIG. 28 is a side view of the second alternative embodiment of the fastener installation tool installed on a work piece.

The guide 480 can operatively be engaged against a portion of the secondary handle 464 at the handle portion 467. The handle 464 can be rotatable about the pivot axis 465. The movement of the handle 464, however can be constrained by the connection bracket 425, which can engage the secondary handle 464, and under the force of the biasing element 466, urge the handle in the direction 555 as shown in FIG. 28. The connection bracket 425 can be joined via a pin 466A with the biasing element 466.

The biasing element 466 can be in the form of a coil spring which is joined to the frame 462 in a relatively fixed location via a pin 466B at one end and is moveable with the pin 466A in the slot 427 at the opposite end thereof. Although shown as a coil spring, the biasing element 466 can be replaced with a variety of different biasing elements, for example leaf springs, elastomeric materials, pneumatic cylinders, hydraulic cylinders, solenoids, or other elements that can move the first guide 480 and/or second guide 580 relative to one another and/or the frame 462 to clamp or otherwise engage opposing surfaces of a work piece into which a fastener is to be installed within the tool 60.

Returning to FIGS. 27 and 30, the handle 461 can be joined with the frame 462 via a handle frame 420. This handle frame 420 can include an arm that extends upwardly into the handle 461. The handle frame 420 can also include slots 422 which can align with the slots 423 in the frame through which the pins 465B can project. The handle frame 422 can be fastened to the frame via fasteners such as rivets as illustrated. Of course other fasteners can be used, or the handle and handle frame can be monolithically formed with the remainder of the frame.

The frame 462 can include feet or tabs 269A and 269B which extend outward from the lateral sides of the frame a distance sufficient so that the width of the frame to the outer most portion of the feet on opposing sides is about 1.5 inches, which corresponds to the width of a common board used as a joist or underlying substructure. Of course, the feet can extend outward from the sides of the frame other distances, or may be alternatively folded inward depending on the particular application. Indeed, even if desired, the feet may be separate elements such as plates that are joined to the bottom of the frame and can extend outward a preselected distance from the frame depending on the desired application.

Figure 29:
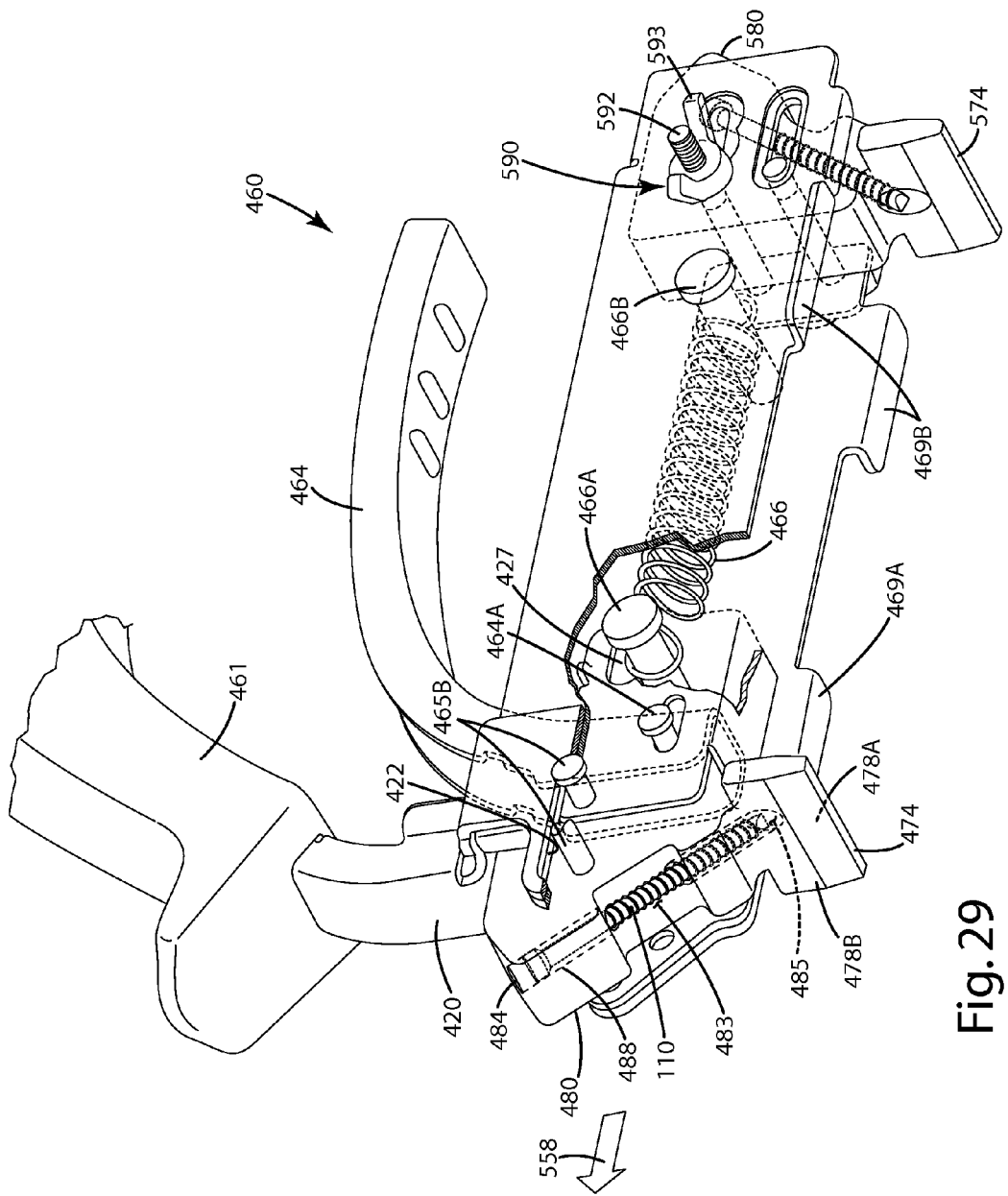
FIG. 29 is a bottom perspective view of the second alternative embodiment of the fastener installation tool.

As shown in FIGS. 27 and 29, the pins 465B are located through apertures 489 in the screw guide 480. Pins 465 are also linearly guided via their registration within the slots 422, 423 defined by the handle frame and frame. In operation, the forward portion 467 of the secondary handle 464 can engage the pins 465B or the guide 480 itself and push the pins forward in the slot 422, 423. Accordingly, the guide 480, joined with the pins 465B moves forward in direction 558. This movement of the guide 480 is generally along the linear axis 428. Optionally, to impair rotation of the guide 480 as it moves along in the direction 558, the guide can also be guided directly or indirectly along the second axis 429, by the pin 466A sliding in the slot 427, with the connection bracket 425 rigidly joined with the guide 480 so that the guide 480 does not rotate relative to the frame while moving in the direction 558. A variety of different slots and guide configurations can be substituted for those shown to ensure the guide 480 moves linearly in direction 558 rather than rotates. Of course, if a pivoting action or rotation of the guide 480 is desired for a certain application, those guides and slots could be modified to include curvilinear portions or otherwise facilitate rotation of the guide as desired.

Operation of the installation tool 460 on a work piece 102 will now be described with reference to FIGS. 27 and 28. As shown in FIG. 27, the installation tool is initially in a retracted mode shown in solid, but reconfigured to an extended mode shown in phantom, to fit the work piece 102. In the retracted mode, the biasing element 466 has urged the guide element 480 inward toward the other guide element 580 so that the dimension between the spacer 474 and spacer 574 are dimension 570. To increase that dimension so the spacers 474 and 575 can fit on opposing sides 108 and 115 of the work piece 102, a user manually grasps the secondary handle 464 and draws it in the direction 554. The user can do this simply by squeezing the secondary handle 464 and handle 461 together.

The movement of the secondary handle 464 rotates it about the pivot 465 in the direction of the arrow 465a as shown in FIG. 27. In turn, this engages a portion 467 of the secondary handle 464 against the pins 465B which causes the pins to slide in the slots 422, 423. This moves the guide 480, which is joined with the pins 465B in the direction 558 outward from the frame 462. This also moves the first spacer 474 away from the second spacer 479. When the dimension 570 is increased so that the spacers 474 and 574 can be positioned and slide downward along the sides 108 and 115 of the work piece, the user may do so. In so doing, the lower surface, and in particular the feet 469A and 469B are engaged against the upper surface of the work piece 102. After the feet are engaged against the upper surface and the spacers 474 and 574 have been disposed in the spaces 105 and 117 immediately adjacent the respective sides 108 and 115, the user can release the secondary handle 464.

As shown in FIG. 28 this release is shown generally as movement of the handle 464 in direction 555. When this occurs, the biasing element 466 exerts a force 551 on the pins 466A. This pulls the connection bracket 425 so that the pin 466A slides in the slot 427, thereby allowing the connection bracket 425 to pull the guide 480 in the direction 559. This provides a clamping effect between the spacers 474 and 574, which in turn causes the tool to clampingly engage the work piece 102. With the work piece clamped between the spacers, the angled bores 488 and 588 of the guides 480 and 580 are aligned along the respective advancement axes, and the side surfaces of the respective spacers are positioned against the respective sides of the work piece. Accordingly, the fasteners can be rotated and advanced in the respective angled bores of the respective guides and installed in a manner similar to that described in the embodiments herein. After the fasteners are sufficiently installed, the secondary handle 464 can again be engaged to move the spacer 474 away from the spacer 574 to release the clamp on the work piece. The tool 460 can then be removed from the work piece. After the tool is removed, another work piece can be installed adjacent the work piece 102 and the process can be repeated with the tool to install additional features.

The above clamping mechanism of the tool 460 utilizing the guide 480, the secondary handle 464 and related mechanisms, can provide fine adjustment of the tool to accommodate boards generally of the same nominal dimensions but which may have variations due to quality of inconsistency of those boards. For example, the adjustment with the handle 464 can generally adjust the guide 480 and spacers so that the tool accommodates certain boards, for example 5¾" wide boards that may have variation of an ⅛" to ¼". In applications where a user may want to switch to a different job and install a larger board, for example a 6" composite board, the tool optionally can include a more coarse adjustment mechanism 590, which allows the tool to be used with different width or dimensioned boards.

Figure 32:
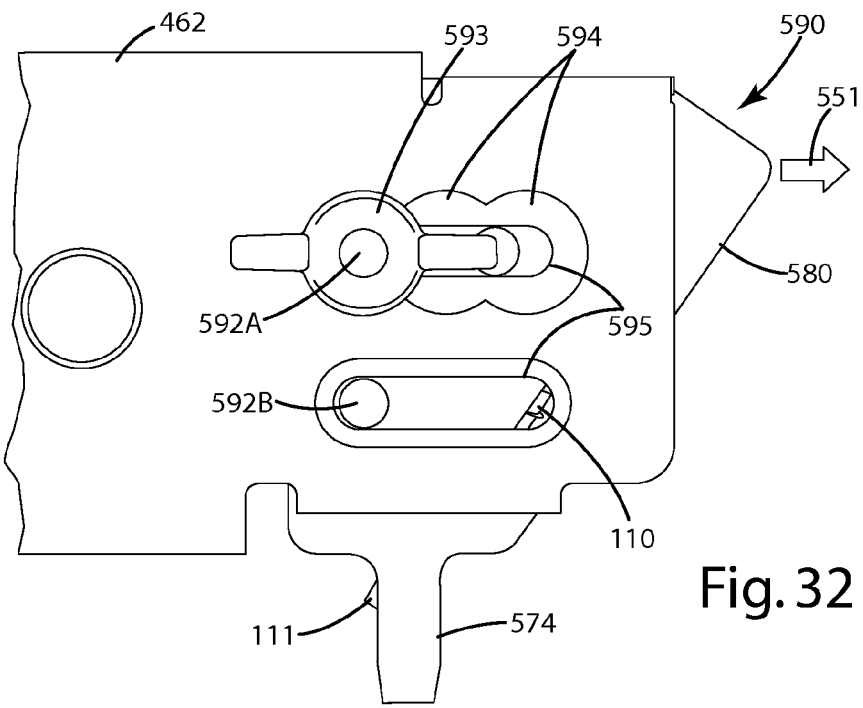
FIG. 32 is a first side view of an adjustment element of the second alternative embodiment of the fastener installation tool.

Referring to FIGS. 29-33, one suitable coarse adjustment mechanism 590 can include a stopper assembly including first and second stopper pins 592A and 592B. The stopper pins can extend through the respective slots 595 defined by the frame 462. One or both of the pins can be threaded. As shown in FIG. 32, the upper stopper pin 592A is threaded and can receive a wing nut 593 to secure the stopper assembly to the frame in a fixed position. The frame itself may define recesses 594 which can accommodate the dimensions of the wing nut 593 or whatever other fastener may be used.

The stopper assembly 590 can be prone to rotation due to forces exerted by a work piece on the tool during installation or a clamping action executed by the tool. For example, as shown in FIG. 33, the work piece 102 can exert a force 530 on the spacer 574 which can urge the spacer to rotate in the direction of the arrow 532 when the tool clamps the work piece 102. If the guide 580 is allowed to rotate significantly, it can misalign the spacer 574 with the side surface 115 of the work piece 102, which in turn can misalign the fastener 110 with the side surface 115 of the work piece. Accordingly, as the fastener 110 is advanced, it can damage the work piece 102 or otherwise bind in the angled bore of the screw guide 580. To counter this possible rotation in the direction of the arrow 532, or other rotation, the stopper assembly can include tabbed detents 597A that interfit within corresponding detents 597B. The angle of the upper detents 597A can be such that the free tabs engage the inner surfaces of the apertures 597B and prevent the stopper from rotating. Likewise, the lower tabs 598A can be angled inward and can be adapted so that the ends 599C of the tabs engage the flat surfaces of the apertures 599D to prevent rotation of the stopper assembly and subsequently to prevent rotation of the guide 580. There are a variety of other constructions that can prevent such rotation. Such constructions may be readily exchanged with the adjustment element 590 described herein.

As further illustrated with reference to FIGS. 30 and 32, the coarse adjustment mechanism 590 can be removed to remove and/or replace the guide 580. For example, a warn out guide 508 can be replaced with a new guide. Alternatively, a guide having a spacer with a first dimension, for example 3/16", can be replaced with a guide having a spacer of another dimension, for example 1/16" to provide different spacing between adjacent boards. In some cases, the smaller spacers, for example those of ¼", 3/16" or smaller can work well to limit the size of the gap established by the tool between adjacent boards, as described in more detail below. In turn, with the small gap between the boards, even where the boards are shrinkable boards and after such boards shrink, the resulting gap is still suitable.

Referring further to FIGS. 30 and 32, to effect the removal of the guide 580 and replace or interchange it with another guide, the nut 593 can be threaded off or generally removed from the stopper pin 592A. With the nut removed, the first and second stopper pins 592A and 592B can be removed from the respective slots 595 and stopper pin holes 596A and 596B, generally pulled out in the direction as shown in FIG. 30. From there, the guide 580 can also be removed from the frame of the tool 460 as shown. The guide can be serviced or replaced with another guide as desired. The guide 580 or some other replacement guide can be inserted in the frame 462 as shown, and the stopper pins can be reinserted into the respective stopper pin holes and slots. The nut or other fastening element can be reattached to the stopper mechanism to secure the guide 580 to the frame.

Although sometimes referred to as boards, the work pieces with which the fasteners and tools herein can be utilized can vary, for example, the work pieces can be composite materials, natural wood, polymeric sheets, particle board or other suitable building materials.

VII. Third Alternative Tool and Method Embodiment

Figure 34:
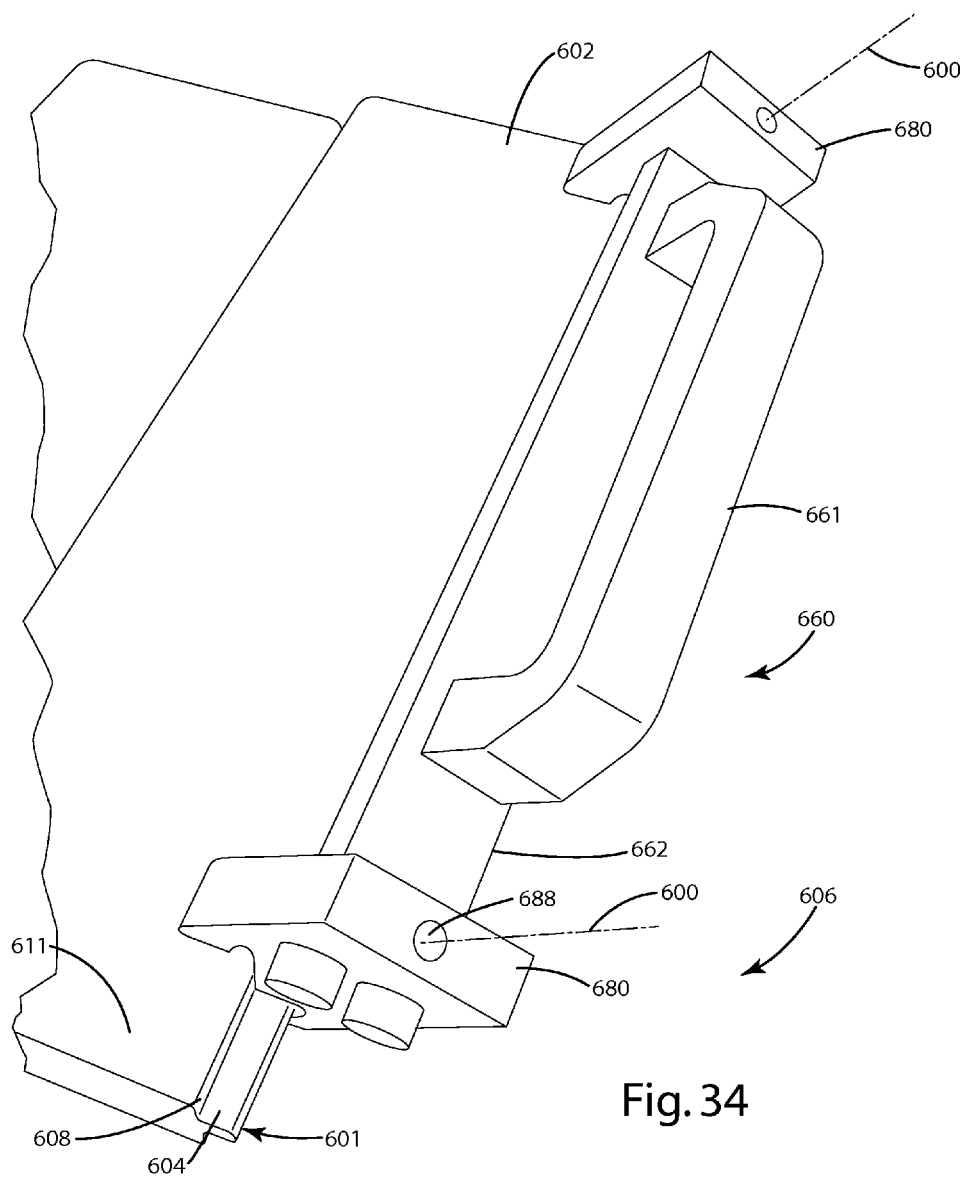
FIG. 34 is a perspective view of a third alternative embodiment of the fastener installation tool.
Figure 34A:
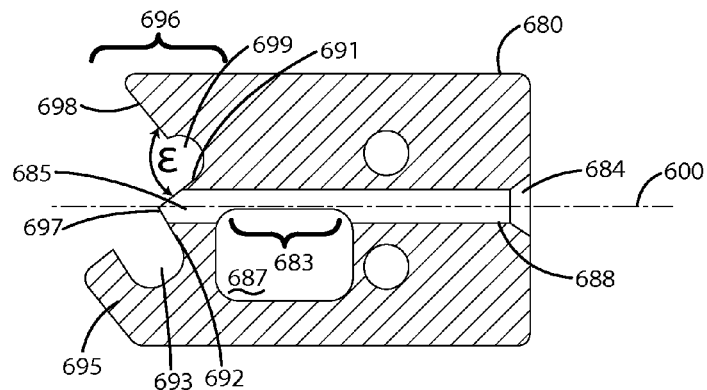
FIG. 34A is a side sectional view of a guide of the third alternative embodiment of the fastener installation tool.

A third alternative embodiment of the fastener installation tool is illustrated in FIGS. 34-41 and generally designated 660. The installation tool shown there is similar in construction and operation to the embodiments described herein with several exceptions. For example, as shown in FIGS. 34 and 34A, the fastener installation tool 660 includes a handle 661 that is joined with a frame 662. The frame 662 is further joined with fastener guides 680. These components can be joined via fasteners or welds, or the components can be of a monolithic, integral, single piece unit. The handle 661 can be of any of the constructions of the embodiments herein, or can be of a generally flattened and ergonomically acceptable shape. Further, although shown as including two fastener guides 680, the frame 462 can include multiple fastener guides or can include a single guide, depending on the application and the space within which the tool is used.

Figure 35:
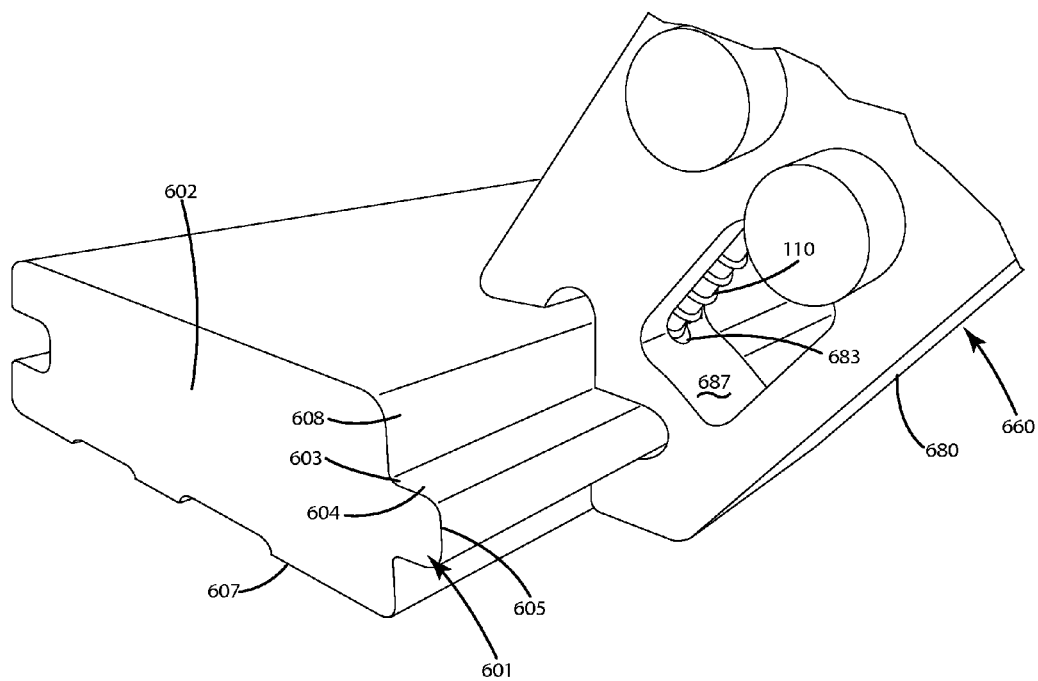
FIG. 35 is a close up perspective view of the third alternative embodiment of the fastener installation tool in use.

Referring to FIGS. 34, 34A and 35, the fastener guides 680 are substantially identical and accordingly only one side will be described here. The guide of this embodiment is suited to advance fasteners, of the types discussed in the embodiments herein, or other conventional fasteners, into work pieces that are of a particular configuration. For example, as show in FIGS. 34-37, the work pieces are formed as what is conventionally shown as "porch boards," or more generally boards that include a tongue-and-groove construction, where the tongue of one board is adapted to insert and be received by the corresponding groove defined by a side of an adjacent, similar board to enhance continuity between the boards and their connection to one another and/or an underlying substrate.

Figure 40:
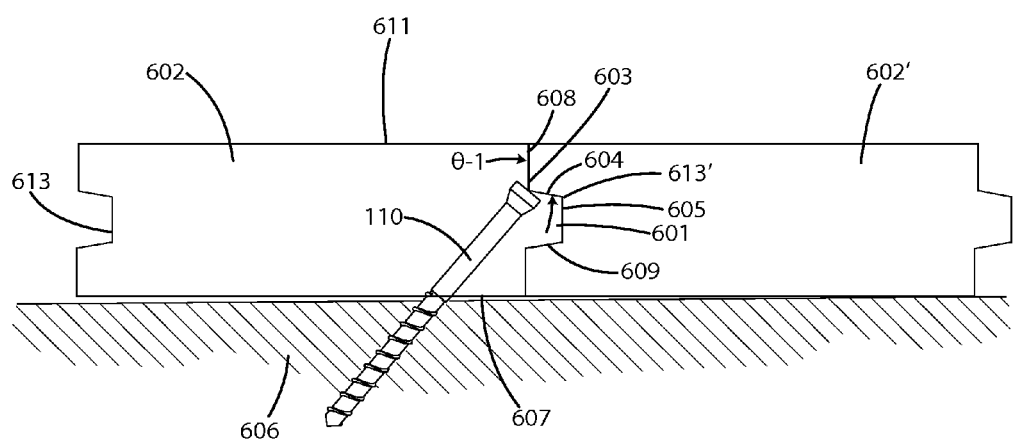
FIG. 40 is a side view of a first work piece fully installed with the third alternative embodiment of the fastener installation tool and a second work piece placed adjacent the installed work piece.

Referring to FIGS. 35 and 40, the work piece 602, also referred to here as a board, is joined with a substrate 606 using the fastener installation tool 660 and respective fasteners, for example, 10, 110, 210 and/or 310, or other fasteners as desired. The board 602 includes a side surface 608 that extends downwardly away from an upper surface 611 of the board. The side surface 608 joins the upper surface 611 at an upper corner. On the lower side of the board, the side surface 608 joins a lower surface of the board 607 at a second corner.

The side surface 608 includes a tongue 601 that projects outwardly from the side surface 608. The tongue 601 includes a tongue upper surface 604, a tongue side or end surface 605 and a tongue lower surface 609. The tongue upper surface 604 intersects the board side surface 608 at a corner 603. Although shown as generally planar and separate surfaces, the tongue upper surface 604, tongue side surface 605, and tongue lower surface 609 can alternatively form a multi-curved structure or can be of a generally continuous curved structure. For example, the multiple surfaces can be merged into a semi-circular or rounded structure, or a structure having multiple compound curvatures. As another option, the tongue 601 can be in the form of a triangle, rectangle, square, or other polygonal or curved geometric shape as desired.

With further reference to FIGS. 35 and 40, side surface 608 of the board and the upper surface of the tongue 604 meet at the corner 603, and at that corner generally form some angle the angle Θ-1, which can be of a variety of ranges, again depending on the geometric structure of the side surface and/or the tongue. For example, the angle Θ-1 can be optionally a 90° angle so the side surface 608 and tongue upper surface 604 are perpendicular to one another. In other cases, due to the specific formation of the board or manufacturing tolerances, the side surface 608 and the tongue upper surface 604 can be at angles Θ-1 ranging optionally from about 70° to about 120°, further optionally 80° to 110°, even further optionally 85° to 95°, or other angles therebetween. The side surface 608 and the lower tongue surface 609 can form similar angles, and can be joined at a corner formed similarly to corner 603 between the side surface 608 and the tongue upper surface 604.

FIG. 40 also illustrates the interaction of the tongue 601 of one piece 602 with a groove 613' of another piece 602'. The groove 613', which can be identical to the groove 613, can be formed in a side surface of work piece 602'. The groove 613' can have a geometric shape corresponding to that of the tongue 601 which is described above. If desired, all of the surfaces of the tongue 601 can be mirrored to corresponding surfaces of the groove 613'.

Returning to FIGS. 34-39, the installation tool 660 is useful for installing fasteners in boards such as those described herein. The tool can include a guide 680, which defines a bore 688 that extends along a bore axis 600. The bore extends generally from a first bore opening 684 to a second bore opening 685 along the axis 600. The angled bore 688 can be positioned in a non-orthogonal angle, or generally angularly offset from 90°, relative to the side surface 608 of the first work piece 602 when the tool 660 is readied for advancing the fastener, which, for exemplary purposes is fastener 110 from the embodiments above, but of course could be any screw embodiment herein, or other screws as desired.

The first opening 684 can be configured to receive the fastener 110 and generally operate as an entrance into which a fastener 110 can be inserted into the tool 660. The second opening 685 can serve as an exit through which the fastener exits the tool 660 as it advances into the work piece 602. Like the other embodiments herein, the bore can include a material ejection port 683 which is positioned and functions similar to the embodiments noted herein, so those descriptions of the other embodiments apply equally here.

Figure 36:
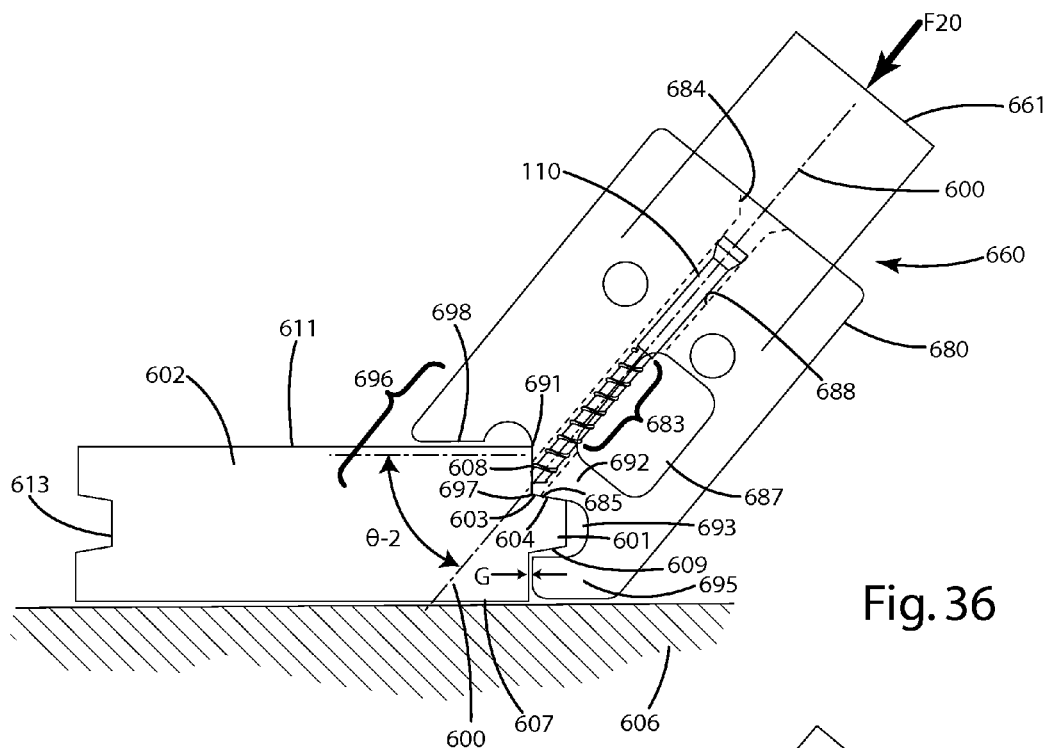
FIG. 36 is a side view of the third alternative embodiment of the fastener installation tool as a guided fastener first engages a first work piece.

The guide 680 can include an engagement head 696 which includes some features that are not described in other embodiments. For example, to accommodate the tongue-and-groove configuration of the work piece or board 602 and orient the bore 688 in a preselected configuration relative to the board, the engagement head 696 can include certain structural features. One such feature is the primary engagement surface 691, which is adapted to abut or generally engage the side surface 608 of the work piece 602 as shown in FIGS. 36 and 34A, generally above the tongue 601. Another is the second opening 685, which is defined at a corner or intersection 697 of the primary engagement surface 691 and a secondary engagement surface 692. The longitudinal axis 600 of the bore 688 can generally be centered so that it projects through the corner or intersection 697 of the primary engagement surface 691 and secondary engagement surface 692, and/or or adjacent to it, optionally offset 0.01 mm to 10 mm depending on the board structure.

Generally, the intersection 697 of the primary engagement surface 691 and secondary engagement surface 692 is configured to fit precisely adjacent or adjacent and/or in the corner 603 formed between the side surface 608 of the work piece and the tongue upper surface 604. With this type of arrangement, the engagement head 696 and therefore the guide 680 can be precisely positioned with the bore 688, and generally the longitudinal axis 600 of the bore, precisely aligned with the corner 603, or some other location on the side surface 608. In this manner, the fastener 110 can be started and advanced through the work piece in that region without splitting, cracking or bulging the tongue 601. Although shown as the intersection of two generally planar surfaces at a corner or point, the corner 697 can be rounded or chamfered at the intersection of the respective primary engagement surface 691 and secondary engagement surface 692 if desired.

Figure 41:
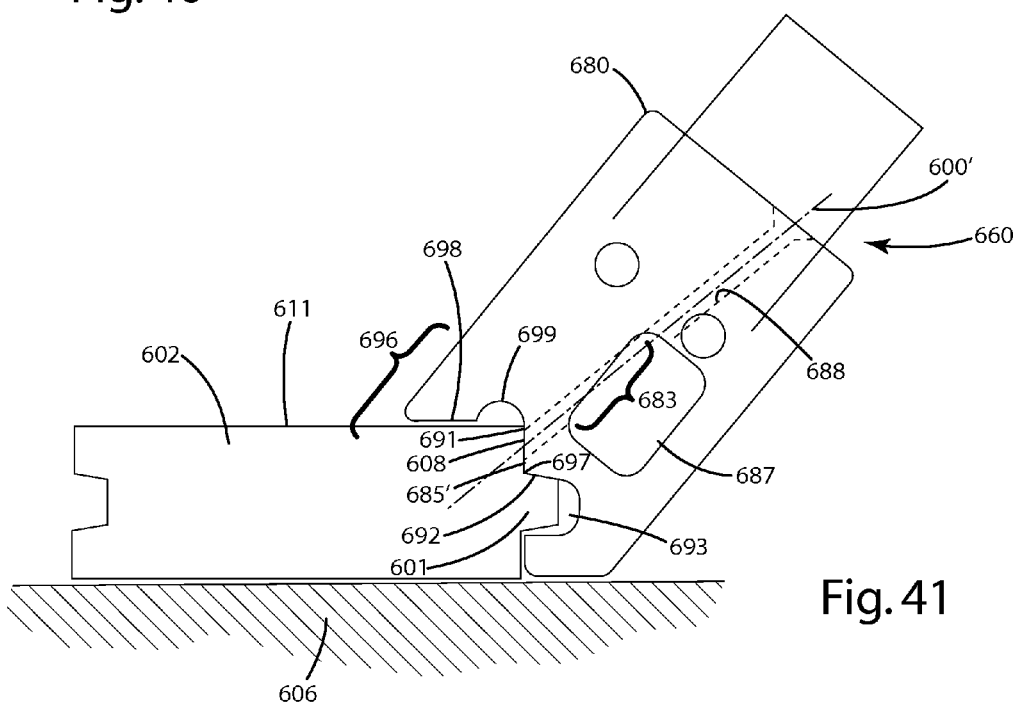
FIG. 41 is a side view of the third alternative embodiment of the fastener installation tool including an alternative guide bore configuration.

Optionally, the bore 688 can be offset from this intersection or corner 697 even farther, and defined substantially only in one of the primary engagement surface 691, as shown in FIG. 41. There, the bore 688' can be oriented so that when the guide 680, and in particular the engagement head 696 is placed adjacent the work piece 602, the bore 688' and longitudinal axis 600' are aligned with and aimed at the side surface 608 or and/or upper surface 611. In such a construction, the guide 680 is configured so that the primary engagement surface 691 defines substantially all of the first opening 685'. Optionally with this construction, the second opening 685' is defined only in the primary engagement surface 691 and is not defined in the secondary engagement surface 692. Accordingly, the bore does not intersect or overlap the corner 697 defined between the respective primary engagement surface 691 and secondary engagement surface 692. With this bore configuration, the bore is aimed at primarily only the side surface or upper surface of the board, so that the fastener, when advanced in the bore, will only penetrate these surfaces. Optionally, in such an alternative bore configuration, the fastener will not advance through the tongue 601, or any surfaces thereof.

Returning to FIGS. 36 and 34A illustrating the guide defining the bore 688, the second opening 685 is defined by the corner or intersection 697 of the primary engagement surface 691 and secondary engagement surface 692. Because it overlaps both the primary engagement surface 691 and the secondary engagement surface 692, the bore 688 at the second opening 685 is generally truncated by the intersecting planes of the respective primary and secondary engagement surfaces. Accordingly, each of the respective primary and secondary engagement surfaces 691 and 692 define at least a portion of the second opening 685. With this bore configuration, the bore is aimed generally at the side surface 608 as well as a portion of the tongue 601, for example, the tongue upper surface 604, so that when advanced in the bore 688 and into the board, the fastener 110 can engage and penetrate two or more of these multiple surfaces.

Optionally, although shown as being generally equally divided between the primary and secondary engagement surfaces 691 and 692, the second opening 685 can be defined by different proportions of those respective surfaces. And again, as noted in the optional embodiment above, the second opening 685 can be defined entirely within only one of the respective engagement surfaces 691 or 692 as desired.

Further optionally, when the installation tool 660 is used with certain types of boards, less of the second opening 685 can be defined in the respective secondary engagement surface 692, particularly where the tongue 601 of the respective board through which the fasteners is to be advanced is thin, or where the material from which the board is constructed is weak or prone to bubbling, splitting, expanding or bulging when a hole is bored through it and/or when a fastener is advanced into it.

Figure 37:
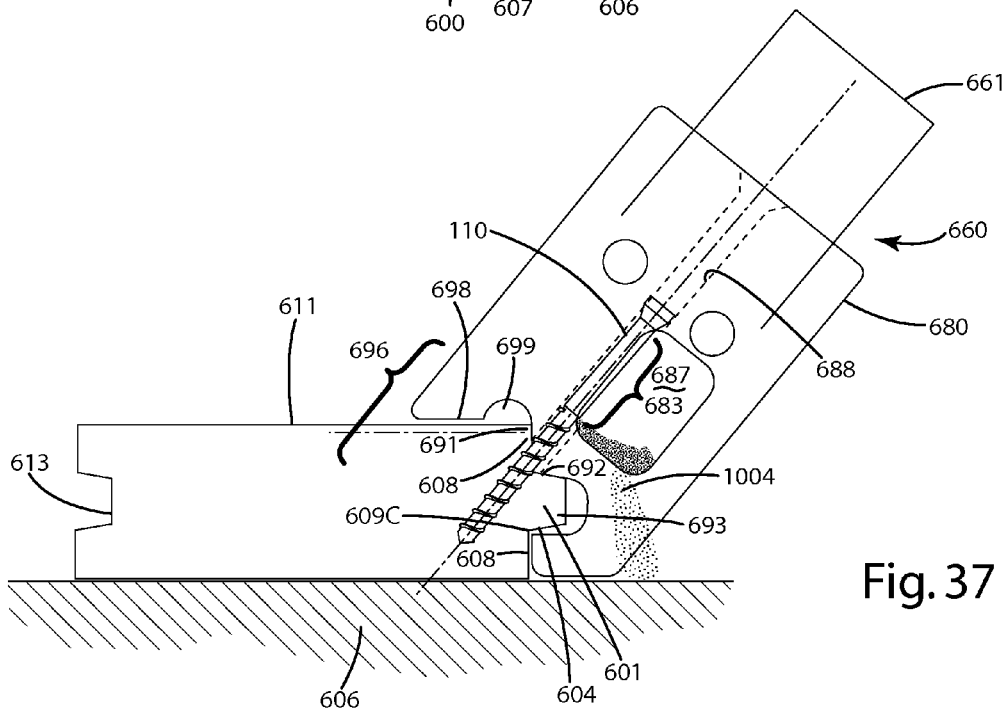
FIG. 37 is a side view of the third alternative embodiment of the fastener installation tool as the fastener is being initially installed in the first work piece.

With reference to FIG. 37, a configuration of the tool 660 is shown that advances the fastener so that it is generally a sufficient distance from certain portions of the tongue. For example, as shown, the tongue lower surface 609 intersects the side surface 608 at a corner 609C. The bore 688 is angled and configured so that when the guide 680 advances the fastener 110, it does not bore a hole or advance the fastener along a path that intersects or otherwise damages or passes through the corner 609C. If it did, then in such an embodiment, the fastener likely would protrude from the corner 609C into the space defined between the side surface 608 and the tongue lower surface 609. Accordingly, in such a case, when another board is placed with its groove 613 adjacent the tongue 601, the fastener likely would interfere with the inter-fitting of the tongue in the groove, and thus the boards could not be easily closely joined.

When using the installation tool 660 with certain materials, it can be desirable that the fastener 110 and its line of advancement are distanced sufficiently from the corner 609C. For example, with certain wood boards that are prone to bulge or split when a fastener advances through them, the bore 688 can be angled and distanced from the corner 609C, again as shown in FIG. 37. This can prevent unnecessary damage to or bulging of material adjacent the corner 609C. Again, that damage to or bulging of material possibly can interfere with the inter-fitment of the tongue 601 into a corresponding groove 613 of another board.

Figure 39:
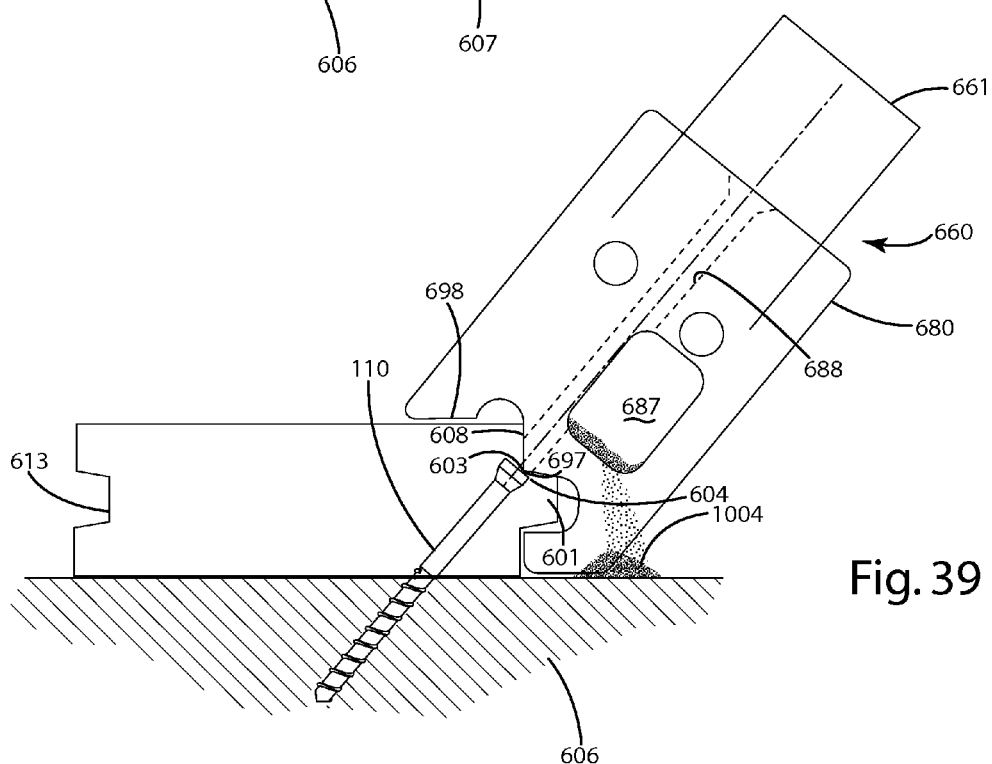
FIG. 39 is a side view of the third alternative embodiment of the fastener installation tool with the fastener fully advanced into the first work piece and an underlying structure.

As shown in FIG. 39, the installation tool 660 can be configured so the head of the fastener 110, upon full installation, is recessed inward, into the board, beyond the corner 603 where the side surface 608 and the upper tongue surface 604 meet. In this manner, the head of the fastener 110 does not interfere with the inter-fitment of the tongue 601 with a groove 613 defined by another board.

With further reference to FIGS. 36 and 34A, the guide 680 will now be further described. The guide 680 shown there, more particularly the head 696, can include a work piece upper surface engager 698 that is generally transverse to the primary engagement surface 691. This work piece upper surface engager can likewise be disposed at some angle $\epsilon$. This angle $\epsilon$ can be 90 degrees as shown, and can generally correspond to a board having an upper surface 611 generally perpendicular to a side surface 608 distal from the intersecting corner of these surfaces, which is common to many boards, and in particular to many tongue in groove type boards. If desired, however, the angle $\epsilon$ between the work piece upper surface engager 698 and the primary engagement surface 691 can vary optionally from about 75° to about 115°, further optionally about 80° to about 110°, even further optionally about 85° to about 105°, or at other ranges depending on the particular application and the configuration of the board.

The work piece upper surface engager 698 can define a first recess 699. This recess can be curvilinear or partially rounded as shown. Alternatively, it can be of an angular or rectangular shape, depending on the application. Generally this recess enables the work piece upper surface engager 698 to engage the upper surface 611 of the work piece 602 even when the corner or intersection of the upper surface 611 of the work piece and the side surface 608 is irregular, bowed, damaged, and/or bulging.

The work piece upper surface engager 698 also can generally be planar as shown or it can be of a rounded or other curvilinear shape. Generally, it can contact the upper surface 611 of the work piece, so in many circumstances, it can be of a planar or rounded (concave or convex), non-point contact configuration. Accordingly, without a pointed contact portion, the engager 698 can be prevented from marring or gouging the upper surface 611 of the work piece if forcibly engaged against that surface.

As shown in FIGS. 34A and 36, the engagement head 696 of the guide 680 also can define a tongue recess 693 positioned adjacent the secondary engagement surface 692. Indeed, the secondary engagement surface can bound a portion of the tongue recess 693 if desired. The second recess 693 can be oversized, that is, larger in dimension than the size of the tongue 601. With such an oversized recess 693, the engagement head 696 can fit over different portions of the same tongue that are of varying dimension or misshaped, and can fit over tongues of different boards that are of varying dimension or misshaped.

Generally, the recess 693 is of a rounded internal configuration so that if it engages certain portions of the surface portions or surfaces of the tongue 601, it will not gouge or mar the tongue, which potentially could impair the fitment of a tongue in a corresponding groove. Of course, the structure of the recess can be modified so that it does include angled corners or intersecting surfaces that mate perfectly or generally accommodate the different surfaces of the tongue 601.

As shown in FIG. 36, the head 696 also can include a guide foot 695 that extends from the head, optionally beyond the bore 680. The guide foot can be configured to project under the tongue 601. For example, the guide foot 695 can extend forwardly under the lower surface 609 of the tongue 601 so that it almost abuts, and in some cases does abut, the side surface 608 of the work piece when the guide 680 is appropriately placed adjacent the work piece 602. As shown, however, there can be a gap G established between the side surface 608 and the outermost portion of the guide foot 695 even when the guide is positioned with the bore 680 precisely aligned and positioned adjacent the side surface 608 and/or tongue 601.

In operation, the guide foot 695 can act as a spacer to properly space the corner 697 of the guide 680, or more particularly the bore 688, from the substrate 606 upon which the work piece 602 is positioned. Accordingly, a user can slide the guide 680 along the substrate 606, and more particularly slide the guide foot 695 along the substrate 606, until the tongue 601 registers in the tongue recess 693. At this point, the user can slightly angle or move the guide 680 so that the intersection 697 and the respective bore 688 aligns with and registers with the respective corner 603 or surface of the work piece to facilitate proper advancement of the fastener 110 into the work piece 602.

Returning to FIGS. 34A and 36-37, the guide 680 can define a material ejection port 683 that is similar in function, structure and location to the material ejection ports discussed above in connection with the other embodiments herein. Optionally, the material ejection port 683 can be located within a guide window 687 that is defined by the guide 680. The window 687 can extend from one side surface of the guide to the other side surface of the guide if desired. The window 687 can be configured and sized large enough so that material 1004 ejected from a hole bored by a respective fastener 110 can exit the material ejection port 683 and further exit the guide 680 through the window 687 on one or both sides of the guide 680.

Operation of the third alternative embodiment of the fastener installation tool 660 will be explained with reference to FIGS. 34, 35 and 36-39. Generally, the fastener installation tool 660 can be used to install a fastener of any of the types described herein, or other conventional fasteners. To begin installation, the tool 660 is positioned adjacent the board 602. As noted above, the guide foot 695 can engage the substrate 606 and can be slid across the substrate until the guide foot 695 is inserted generally under the tongue 601. If helpful, the guide 680 can be slightly rotated to position the work piece upper surface engager 698 against the upper surface 611 of the board. The guide also can further be pressed with a force F20 (FIG. 36) so that the bore 688, the second opening 685, and more generally the corner 697 is positioned in close engagement with the corner 603 of the work piece between the tongue 601 and side surface 608.

With the work piece upper surface engager 698 generally engaging the upper surface 611 of the work piece 602, the longitudinal axis 600 of the bore can be aligned with that upper surface at angle σ-2. The angle σ-2 can vary optionally from about 25° to about 65°, further optionally about 35° to about 55°, even further optionally about 40° to about 50°, or at other ranges depending on the particular application and the configuration of the board.

Alternatively or in addition to the work piece upper surface engager 698 engaging the upper surface 611 of the work piece, the angle σ-2 can be established by engagement of the guide foot 695 with the substrate 606 or the side surface 608 of the board 602. In this manner, the engagement head 696 becomes engaged sufficiently with the board 602 for installation of the fastener.

In another step, a force F20 can be applied to the tool 660 by a user, and a fastener 110 can be inserted in the bore 680. The fastener can engage the corner 603 of the work piece when placed in the bore 680. The fastener 110 can be engaged by a driving tool (not shown), such as a drill, screwdriver, wrench or other rotating tool, which rotates the fastener.

As shown in FIG. 37, as the fastener 110 is rotated, material 1004 can be ejected from the material ejection port 683 and further out through the guide window 687. The position of the guide 680 and engagement head 696 can be maintained throughout the fastener advancing operation.

Figure 38:
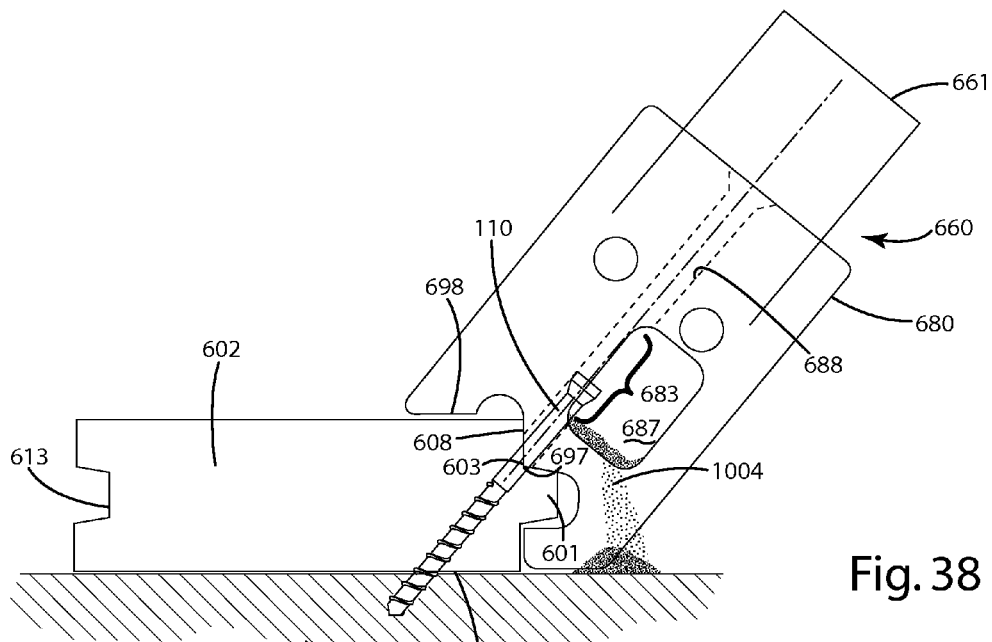
FIG. 38 is a side view of the third alternative embodiment of the fastener installation tool as the fastener is further advanced into the first work piece.

As shown in FIG. 38, the fastener 110 is further advanced so that it passes through the work piece 602 and into the underlying substrate 606, passing from side surface 608 through lower surface 607 and eventually into the substrate 606. As shown in FIG. 39, the fastener 110 continues to be advanced until it attains the fully advanced position noted in the embodiments herein, at which point the guide 660 can be moved. When the first work piece is sufficiently fastened to the substrate 606, the tool 660 can be removed.

As shown in FIG. 40, with the tool removed, a second work piece 602' can be placed on the substrate and slid so that the tongue of the first work piece 602 fits within the recess 613' of the second work piece 602', and interlocks with the first work piece 602. When so interlocked, the second work piece 602' can be fastened with one or more additional fasteners using the tool 660 as described in connection with the first work piece 602. This process can be repeated for multiple work pieces to fasten them to the substrate.

VIII. Fourth Alternative Tool Embodiment

Figure 42:
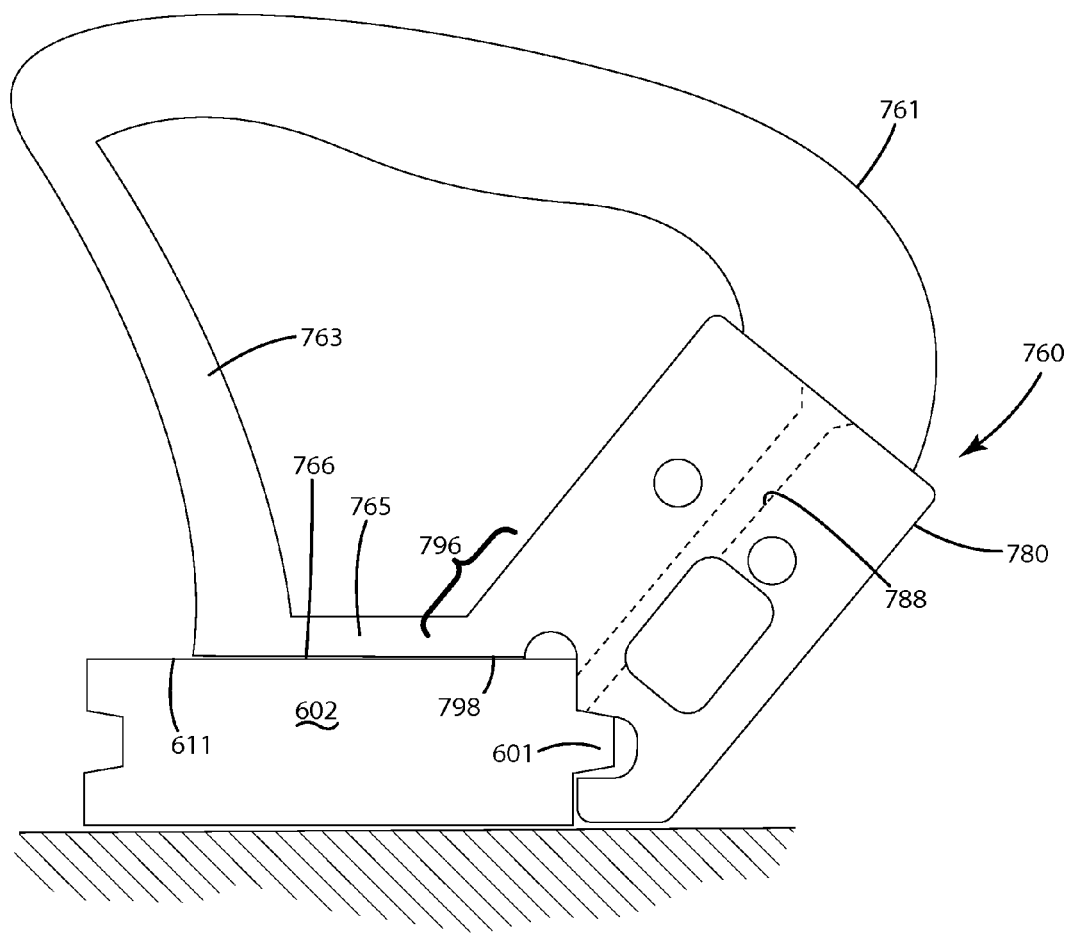
FIG. 42 is a side view of a fourth alternative embodiment of the fastener installation tool.

A fourth alternative embodiment of the fastener installation tool is illustrated in FIG. 42 and generally designated 760. The installation tool shown there is similar in construction and operation to the embodiments described above with several exceptions. For example, the tool 760 can includes only a single guide 780. To the guide, a handle 761 can be attached, however, the handle 761 can extend transversely to the length of the work piece 602. For example, the handle 761 can extend rearwardly from the guide 780 upward and over the upper surface 611 of the work piece 602. The handle can be ergonomically shaped and can include a base support 763 that extends downwardly to a base 765. The base 765 can extend toward and can be connected to the head 796 of the guide 780. The base 765 can be configured to engage the upper surface 611 of the work piece 602. If desired, the base can include a lower surface 766 that is contiguous with the work piece upper surface engager 798. Indeed, the two surfaces 766 and 798 can be continuous and can form a generally planar surface. Operation of this embodiment is similar to the embodiments described above and therefore not be described again here.

IX. Fifth Alternative Tool and Method Embodiment

Figure 43:
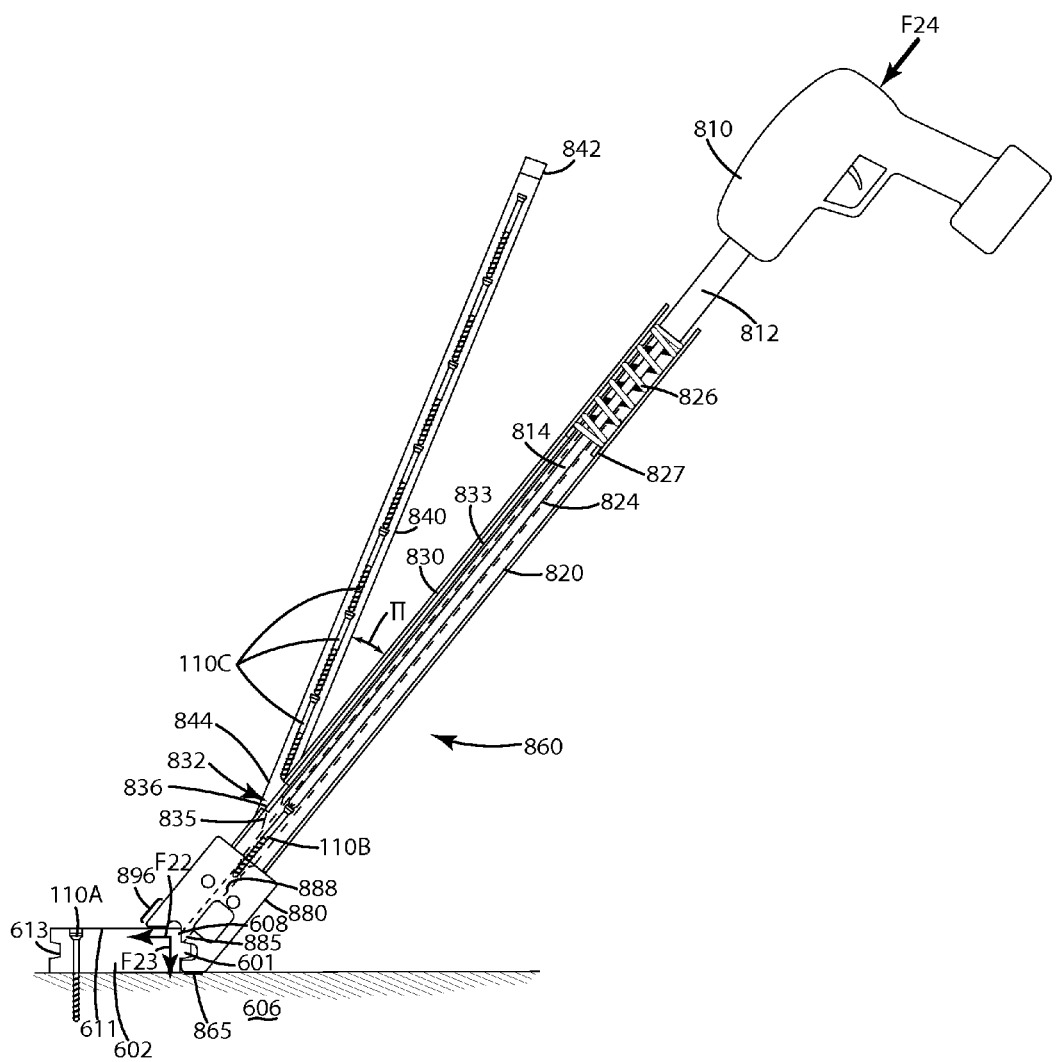
FIG. 43 is a side view of a fifth alternative embodiment of the fastener installation tool with fasteners loaded in the installation tool.
Figure 44:
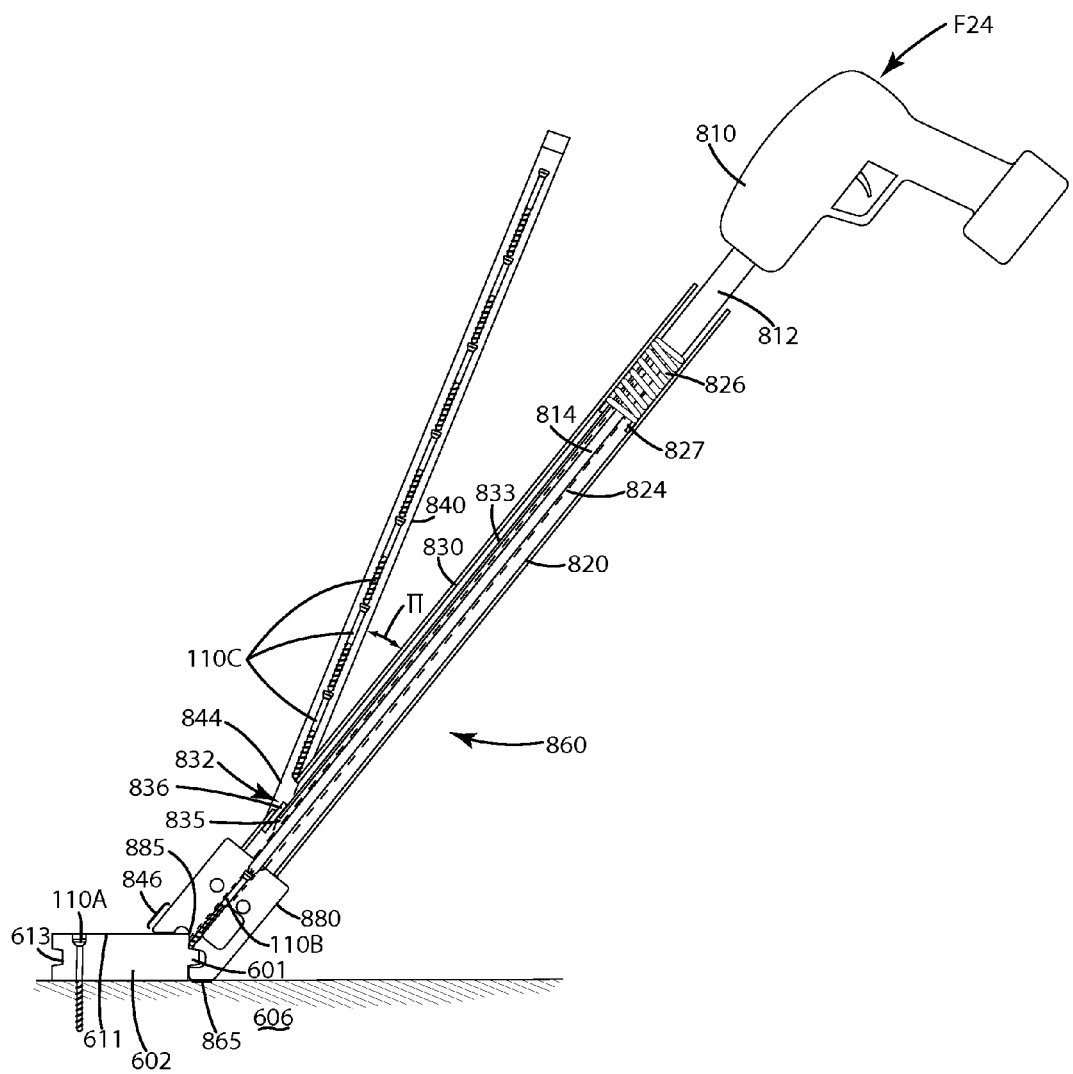
FIG. 44 is a side view of the fifth alternative embodiment of the fastener installation tool with a fastener adjacent the work piece, readied for installation in the work piece.
Figure 45:
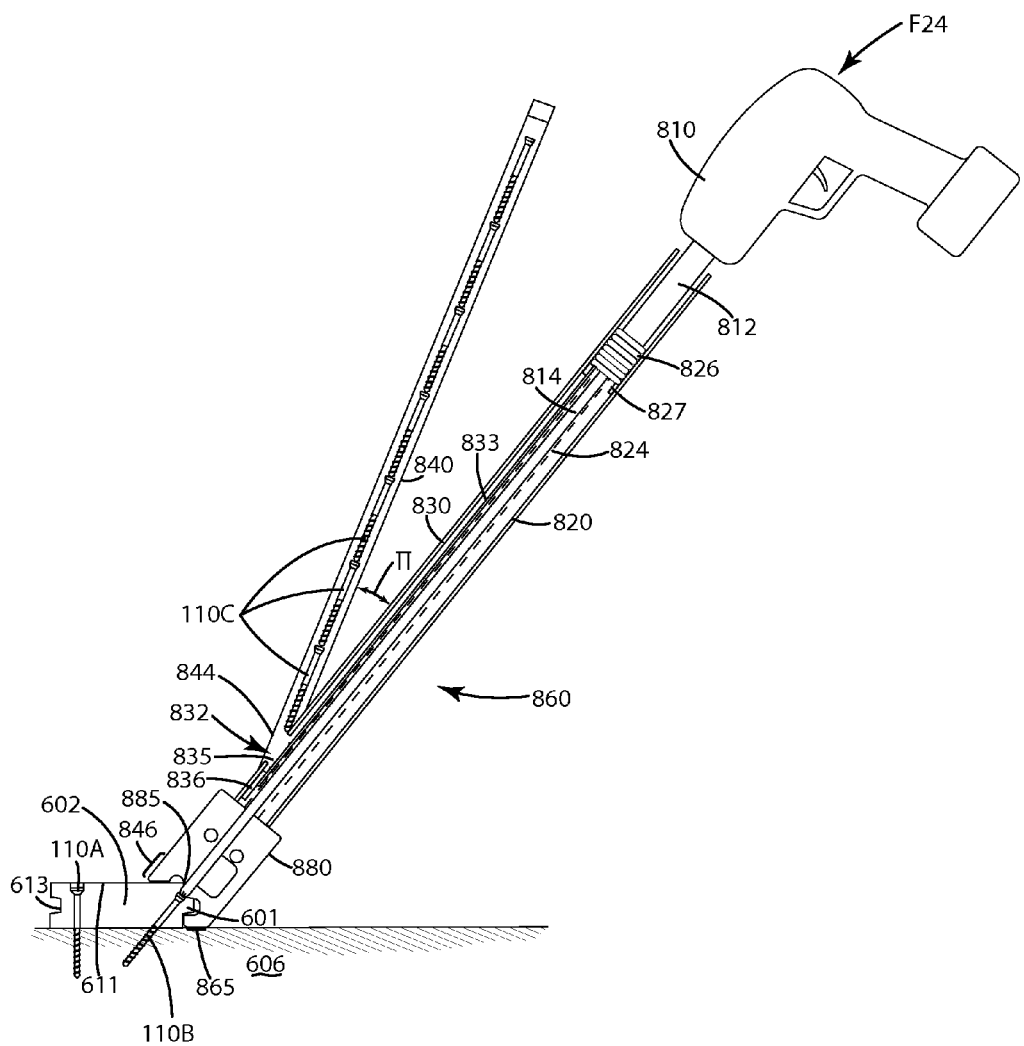
FIG. 45 is a side view of the fifth alternative embodiment of the fastener installation tool with the fastener fully installed in the work piece.

A fifth alternative embodiment of the fastener installation tool is illustrated in FIGS. 43-45 and generally designated 860. The installation tool shown there is similar in construction and operation to the embodiments described above with several exceptions.

For example, the tool 860 is configured to work in conjunction with an integral or selectively attachable driving tool 810, such as a drill (cordless or electric) or other device capable of rotating the fastener for advancement into boards. The tool 860 is also configured to automatically and sequentially feed fasteners for advancement into work pieces to join those work pieces with one another or a substrate. Further, the tool 860 can be configured so that a user thereof can operate the tool and install fasteners from a standing or otherwise elevated position, which can alleviate discomfort or the difficulties associated with having to bend over and install the fasteners.

The tool 860 can include a guide 880 which defines a bore 888 and includes a head 896 to engage the board 602 so that a fastener 110B can be advanced into and/or through the work piece 602 to connect it to the substrate 606 as described in connection with the embodiments herein. The guide 880, however, can be connected to an extension 820 which is further joined with the driving tool 810. A magazine 840 can be joined with the extension 820 so that multiple fasteners 110C stored in the magazine 840 can be sequentially fed into the extension 820 and/or the guide 880, and subsequently advanced into the board 602.

The extension 820 can define an extension bore 824, which can be sized and positioned to receive the next-to-be-advanced, or succeeding fastener 110B therein. The extension bore 824 can be further configured to receive a chuck or tool extension 814 that is joined with and designed to be rotated by the driving tool 810. The extension 814 can extend from the head 812 of the driving tool 810 toward the guide 880 to a position adjacent the guide 880. The extension can also be reciprocally mounted in the extension bore, as described below.

The extension 820 can further include a biasing element 826, for example a spring or compressible/rebounding material, which is mounted therein. The biasing element 826 can be positioned so that it engages and seats against a stop 827. Opposite the stop 827, the biasing element engages the head 812 of the driving tool 810. Although not shown, the head 812 can include a locking element to prevent the base 812 from being completely withdrawn from the extension 820. Of course, where it is desirable that the base and driving tool 810 be quickly and easily separable, any desired decoupling element can be utilized to provide such a connection.

A fastener supply container or magazine 840 can be joined with the extension 820. As shown, the magazine 840 can be offset from the extension 820 by some predetermined angle $\pi$. This angle $\pi$ can range optionally from about 1° to about 45°, further optionally about 3° to about 30°, even further optionally about 4° to about 20°, still further optionally about 5° to about 15°, or other ranges of angles as desired.

Generally, the magazine 840 can include a first end which may include a cap 842 to contain and store fasteners 110C therein. The magazine 840 can include a second end 844 that is joined with the extension 820, optionally near the guide 880. The magazine 840 can be of a length sufficient to store multiple fasteners 110C head to point or one on top of another. Although not shown, if desired, the magazine could be modified to store a coil, strip or roll of collated fasteners that are linked together with some sort of linking element, such as wire, a coil, tape, or other construction.

Figure 46:
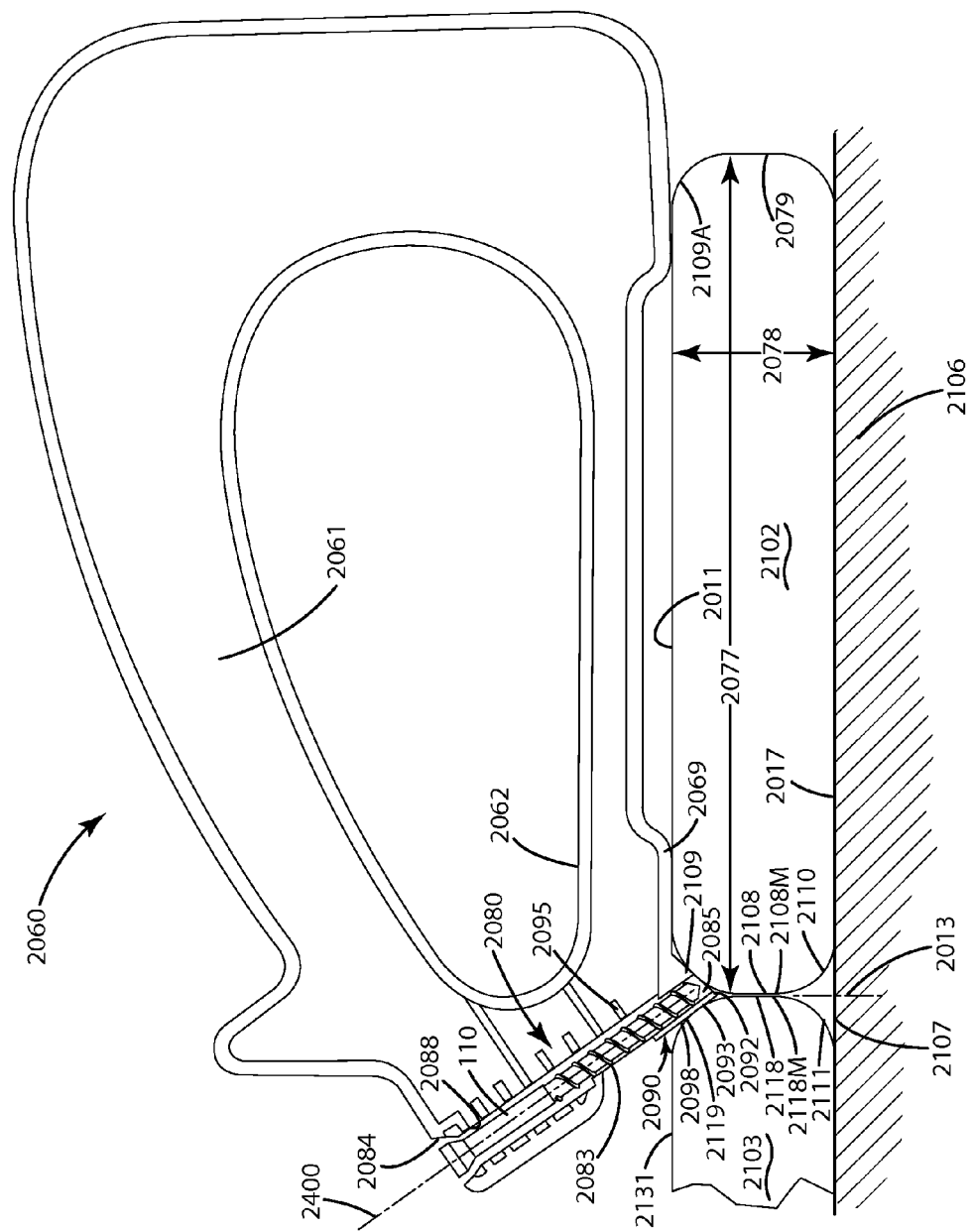
FIG. 46 is a side view of a sixth alternative embodiment of the fastener installation tool with a fastener about to be installed in a work piece that abuts another work piece, where there is no gap between the abutting work pieces.

Returning to FIG. 43, the second end 844 of the magazine 840 can be attached so that the magazine 840 generally is in feeding communication with the extension bore 824 and/or the bore 888 of the guide 880, and so the fasteners 110C can be sequentially fed into these elements. To prevent multiple fasteners 110C from dumping into the extension bore 824 and/or guide bore 880, the tool 860 can include a feeding mechanism 832 that meters and precisely feeds the fasteners. The feeding mechanism 832 can include an actuator bar 833 which is joined with a plate, door or hatch 836 at one end, and coupled to the biasing element 826 and/or head 812 of the driving tool 810 at the opposite end. Upon actuation of the head 812 or driving tool in general, and/or its movement into the extension 820, the operating bar 833 moves the plate 832 downward as shown in FIGS. 44 and 46, out of the way of the opening 835 in the extension 820. Accordingly, a subsequent fastener 110C can be fed through the feed aperture 835 defined by the extension 820, and into the position shown in FIG. 43, when the chuck 814 is appropriately retracted. Of course, there can be other types of feeding mechanisms used with the tool 860 that can sequentially feed the fasteners 110C into the guide 880 to ready them for installation in a work piece 602.

With reference to FIGS. 43-45, the operation of the tool 860 will now be described in further detail. In operation, a user grasps the driving tool 810 and positions the guide 680 generally in the upright configuration shown in FIG. 43. The user then slides the guide foot 865 of the guide 880 along the substrate 606, which in this case can be a subfloor or other flooring or base. The user slides the foot 865 until it is positioned adjacent the tongue 601, optionally under the tongue. Conveniently, the horizontal F22 and vertical F23 forces exerted by a user to engage the engaging head 896 with the work piece 602 can correspond to the natural movements of the user simply pushing the driving tool 810 and tool 860 toward and against the board.

With the bore 888 satisfactorily positioned adjacent the work piece 602, for example, with the second opening 885 adjacent the work piece side surface 608 and/or tongue 601, the user can further push the drive tool 810 with a force F24, which in turn pushes the tool head 812 against the biasing element 826 to compress it. This enables the chuck 814 to travel and move toward the work piece 602 within the bore 824. As the driving tool 810 is pushed with a force F24, the chuck 814 can be rotated by the driving tool 810. In turn, the end of the chuck 814, which can include a drive feature mating with the fastener 110B, can engage that fastener 110B and rotate it. As the fastener 110B rotates, it advances into the work piece 602 and optionally the substrate 606 in a manner discussed in the embodiments herein.

As the force F24 continues to be applied, the head 810 can move farther into the extension 820, thereby enabling the chuck 814 to continue to move with and engage the fastener, optionally fully advancing the fastener into the work piece 602 until it obtains the configuration shown in FIG. 45. When the fastener 110B is fully installed, the user can remove the force F24, in which case the biasing element 824 engages the head 812 and moves it away from the stop 827. Accordingly, the chuck 814 is retracted from the guide 880, and reciprocates away from the bore 888. Likewise, the feeding mechanism 832 is activated so that the plate 836 opens the feeding aperture 835 and the next in line or subsequent fastener 110C is fed into the extension bore 824 and/or the guide bore 888 so that fastener is readied for advancement into the same work piece or into another work piece which can be laid adjacent the illustrated work piece and interlocked therewith via the respective tongue and groove features of those work pieces. The process can be continued until the substrate is adequately covered.

If desired, as shown in FIG. 43, a first work piece 602 can be fastened down with a fastener 110A. Alternatively, and/or additionally, the end including the groove 613 of the work piece 602 can be placed adjacent a wall to start the application of multiple tongue and groove work pieces. Optionally, the components of the tool of the above embodiment can be incorporated into any other embodiments herein. Likewise, the components of any tool embodiment herein can be combined in virtually any combination with any other tool embodiment as desired.

X. Sixth Alternative Tool and Method Embodiment

A sixth alternative embodiment of the fastener installation tool and a related method is illustrated in FIGS. 46-49 and generally designated 2060. The installation tool shown there is similar in construction and operation to the embodiments described above with several exceptions.

For example, as shown in FIG. 46, the installation tool 2060 includes a frame 2062 optionally including a handle 2061, and a guide 2080. The frame 2062 can include a bottom surface 2069 that is adapted to engage a top surface 2011 of work pieces 2102 and/or 2103, which can be in the form of boards.

The tool 2060 of the sixth alternative embodiment is suited for any board, or other type of work piece as described herein. Optionally, however, the boards 2102 and 2103 can be particular types of boards if desired. These boards can be constructed from a material that with time, shrinks, that is, one or more of the board dimensions, such as width, thickness and/or length, decreases. As one example, the board can be constructed from wet, treated lumber. As the lumber dries over time, the board can shrink in width, thickness and/or length. This type of board is referred to herein as a "shrinkable board." Such a shrinkable board, over time, is prone to reduce or shrink in dimension, e.g., width 2077, and/or height 2078 (FIG. 46) by 0.5%, 1%, 2%, 3%, 4%, 5%, 10%, 15%, 20%, 25%, 30%, 35%, 40%, 45%, or more of the original dimension, depending on the particular material from which the shrinkable board is constructed.

As shown in FIG. 46, the work piece 2102, also referred to as the second board 2102, can include an upper surface 2011, a lower surface 2017, and side surfaces 2108 and 2079. The side surface 2108 can transition to the upper surface at an upper corner 2109, and to the lower surface 2017 at the lower corner 2110. As shown, the upper and lower corners, 2109 and 2110, can include a gradual radius which can be anywhere from a 1/32" radius to a 4" radius, or optionally a 1/4" radius to a 2" radius, or further optionally a 1/2" radius. Although shown as including a radius, any of the corners, for example, corners 2109, 2109A, or 2119, can alternatively be configured to include a compound angle or compound curved configuration. Even further optionally, the corners can be straight so that the side surfaces and upper surfaces of the respective work pieces meet at about a 90° angle.

Returning to the installation tool 2060, the bottom surface 2069 of the tool 2060 can be joined with the frame 2062, and the frame joined with the handle 2061, so that a user can exert different forces on the tool. These forces can be transferred through the bottom surface 2069 to one or more boards. The tool can include a guide 2080, which can be of the constructions described above and herein, and can define a longitudinal angled bore axis 2400 which extends along a length of the guide 2080, generally through an angled bore 2088 defined by the guide. As with the other embodiments herein, the angled bore 2088 can be configured to accommodate and constrain a rotating fastener, and can extend from a first opening 2084 to a second opening 2085. The angled bore 2088 can be positioned so that it is at a non-orthogonal angle, or generally offset from a right angle, relative to the side surface and/or corner of the respective boards when the tool is readied for advancing the fastener. This angle can be the same as the angles described in connection with other embodiments herein. The first opening 2084 can be configured to receive a fastener, for example, 10, 110, 210 and/or 310 herein, or other fasteners as desired, and can operate as an entrance into which the fastener can be inserted in the tool 2060. The second opening 2085 can serve as an exit through which the fastener exits the tool 2060 as it advances into a work piece.

The fastener guide 2080 also can be configured to include a material ejection port 2083 that is in communication with the angled bore 2088. The material ejection port 2083 can be a hole that is located between the first opening 2084 and the second opening 2085. The precise location of the material ejection port 2083 and its dimension can be selected based on the material to be augured or otherwise ejected or evacuated out from the angled bore 2088. As illustrated, the material ejection port is positioned generally above the bottom surface 2069 of the frame 2062, and can be about 1/2" long. Of course, it can be of other dimensions, for example about 1/8 to about 1/4 of an inch in length. Generally, it can be of a dimension that is sufficient to allow material augured by a fastener 110 to eject from the port 2083.

The material ejection port 2083 can be dimensioned and located so that it is defined on the underside of the angled bore 2088 so that the material drops out from the bore via gravity through the port. The material ejection port 2083 can be large enough to drop out fibers or other material augured from the work pieces, yet small or short enough so that a screw inserted into the angled bore 2088 from the first opening 2084 will not have its end drop out from, or otherwise protrude, or become hung up in the ejection port 2083 while the screw moves toward the second opening 2085.

Optionally, the material ejection port can serve to remove or eject bored material from the angled bore to reduce some or all of the amount of material pulled back into the pre-bored hole by the fastener, which in some cases can cause damage, such as splitting or bulging of the work piece in the area surrounding the fastener. For example, the material ejection port can enable material augured up from the work piece to be ejected away from the threads and shaft of the fastener. In cases where the material ejection port is absent, or otherwise does not facilitate ejection of the material from the bore, and the head of the fastener is dimensioned so that it is almost the same dimension as the angled bore, the head might capture and drag all the pre-bored material back into the hole as the head advances toward the hole. That material would be captured in the space between the shaft and threads, and the walls of the angled bore, with the head acting like a cap or piston to pull the augered material between it and the work piece back into the pre-bored hole. With the material ejection port, the material augured or removed from the hole is ejected from the bore so that there is minimal, if any, augered or removed material for the head to pull into the hole. In turn, this can reduce the likelihood of damage to the work piece around the area of the hole caused by the material entering the hole, possibly along with the components of the fastener. Of course, in certain applications where material might not readily be pulled into the hole by the fastener, the material ejection port can be eliminated.

As illustrated in FIG. 46, the tool 2060 also includes an alignment projection 2090 that projects about 1/32" to about 1/2", further optionally about 1/8" to about 1/4" from the bottom 2069 of the tool 2060. The precise distance of the projection of this alignment projection 2090 can vary depending on the particular board with which the tool 2060 is used. For example, when the tool 2060 is used in conjunction with a shrinkable board, the preselected distance from which the alignment projection 2090 extends from the lower surface 2069 of the tool is selected so that the projection can at least partially fit between opposing corners 2109 and 2119 of adjacent first and second work pieces 2103 and 2102, respectively, without extending between or promoting the formation of a gap between the first work piece 2103 and the and second work piece 2102.

Optionally, the alignment projection can generally be in the shape of a triangle having a generally rounded, downwardly projecting terminal end. If desired, the alignment projection can be in the form of an isosceles triangle, or an equilateral triangle, or other triangle depending on the application. The terminal end at the lowermost portion of the triangle can be rounded or curved so that it does not mar or gouge boards which it contacts.

The alignment projection 2090 can be configured so that the angled bore 2088 terminates generally at the alignment projection 2090, with the second opening 2085 being formed substantially entirely within an inner engagement surface 2092 of the alignment projection 2090. The inner engagement surface 2092 can transition to the bottom surface 2069 of the installation tool 2060, optionally without forming a portion of the bottom surface 2069, and further optionally along a radius or fillet.

The alignment projection 2090 also can include an outer engagement surface 2093 positioned opposite the inner engagement surface 2092. The outer engagement surface 2093 can transition to the inner engagement surface 2092 generally at a terminal end 2097 of the alignment projection. The terminal end can be rounded and/or curved when viewed from a side view as illustrated so that it does not mar or gouge boards which it contacts. Optionally, the terminal end can include a radius R10 (FIGS. 51, 52) between about 0.1 mm to about 50 mm, further optionally between about 1 mm to about 20 mm, and even further optionally between about 2 mm to about 10 mm, or other radii as desired. Further optionally, the terminal end can include multiple compound radii or angled intersecting portions to provide the rounded effect as illustrated.

Figure 51:
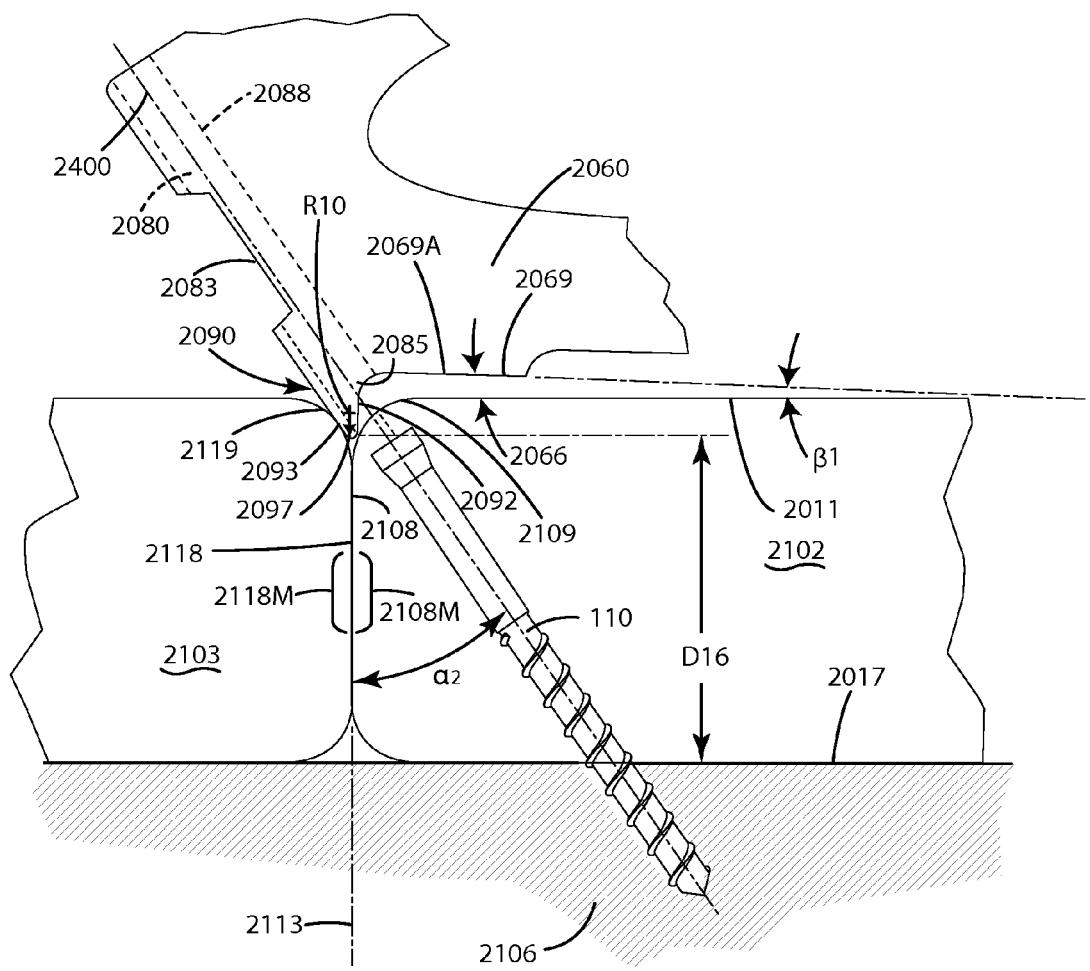
FIG. 51 is a close up view of the alignment projection of the sixth alternative embodiment of the fastener installation tool adjacent a second side of the second work piece, generally wedging between work piece corners.

With reference to FIG. 51, the precise angle between the inner and outer engagement surfaces, as well as the angle of the longitudinal axis 2400 relative to the engagement surfaces can be preselected based on the desired location at which the fastener will engage and advance into the corner and/or side surface of a board. The angle between the inner and outer engagement surfaces can vary, optionally from about 10° to about 90°, further optionally about 35° to about 65°, even further optionally about 40° to about 50°, or at other ranges depending on the particular application. Further, these surfaces can be non-parallel with one another if desired. Generally, the inner engagement surface 2092 and or the rounded or curved terminal end 2097 can be configured to engage the second board 2102 on which the bottom surface 2069 of the tool 2060 rests or is immediately adjacent or near when the tool 2060 is in position atop the board for installing a fastener.

As shown, the inner engagement surface 2092 optionally can be at about a 90° angle relative to the bottom surface 2069, but other angles from about 80° to about 100° can be selected. The inner engagement surface 2092 can be configured to directly engage the upper corner 2109 or side surface 2008 of the second board.

The outer engagement surface 2093 of the alignment projection can be at an angle relative to the bottom surface 2069 of optionally about 30° to about 70°, further optionally about 40° to about 60°, and even further optionally about 45°. The precise angle can be selected depending on the desired angle α2 (FIG. 51) at which the longitudinal axis and or corresponding trajectory of the fastener 110 is desired to be oriented relative to the side surface 2108.

The outer engagement surface 2093 of the alignment projection 2090 can be configured to directly engage the first corner 2119 and side surface 2118 of the first board 2103 as illustrated in FIG. 51. This engagement of the outer engagement surface 2093 against the corner 2119 and/or side surface 2118 effectively can set the height D16 (FIG. 51) at which the fastener 110 is advanced into the side surface 2108 or corner 2109 of the second board 2102 during a fastener installation operation with the tool. This engagement of the outer engagement surface 2093 against the corner 2119 and/or side surface 2118 can also set the angle α2 and/or orient the longitudinal axis along a desired fastener trajectory.

As shown in FIGS. 46-52, the entire bottom surface 2069 of the tool can be void of any spacer projections, that is, any projections which are configured to be positioned between the side surfaces of adjacent boards or work pieces to establish a predetermined distance therebetween, or a gap between the work pieces. With such a construction, the installation tool 2060 of this embodiment is constructed so that it is generally incapable of establishing a gap between adjacent installed boards, and in particular the side surfaces of those installed boards. In other words, the bottom surface of the tool itself can be void of any structures that extend downwardly along opposing side surfaces of the board 2102, when the tool 2060 is installed atop the board, with the bottom surface 2069 engaging the upper surface 2011 of that board. Further, the tool 2060 and/or bottom surface 2069 can be void of any projection that extends down along either the side surfaces 2108 or 2079 of the board. Of course, if desired, the alignment projection 2090 can extend downwardly adjacent one or more of the upper corners 2109, 2109A of the board 2102 to assist in aligning the guide 2080 with a desired trajectory of the fastener 110.

For example, the alignment projection 2090 can extend downwardly from the bottom surface 2069 of the tool 2060 a preselected distance so that when a user exerts a force F25 (FIG. 48) on the tool 2060, via the handle 2061, the alignment projection 2090 assists in pushing the second board 2102 adjacent the first board 2103, and more specifically, contacting the side surfaces 2108 and 2118 at least along a portion of the middle portions 2108M and 2118M of those respective boards. Optionally, during this application of force F25, the inner engagement surface 2092 transfers a substantial portion of the force F25 to the board 2102, which is further transferred to the board 2103.

The frame 2062 and the other various components of the tool 2060 can be constructed from stainless steel, steel, other metals, composites and/or polymers. For example, as mentioned above, the guide 2080 and angled bore 2088 can be constructed from steel, while the like components of the frame 2062, such as the handle 2061 and alignment projection 2090 can be constructed from a polymeric material such as a high impact resistant plastic.

Figure 47:
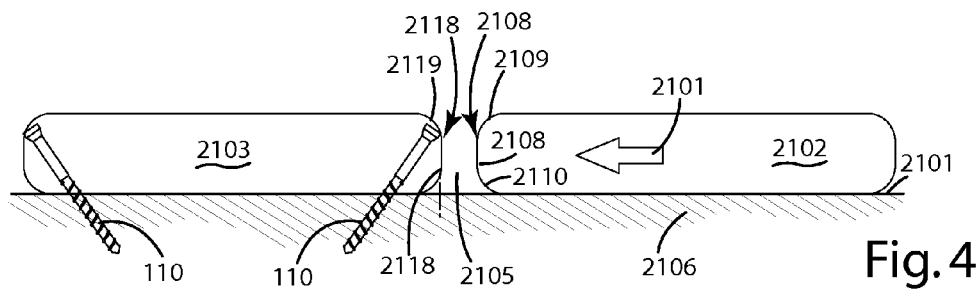
FIG. 47 is a side view of an installed first work piece and a second work piece being moved toward it so the first and second work pieces abut one another.
Figure 48:
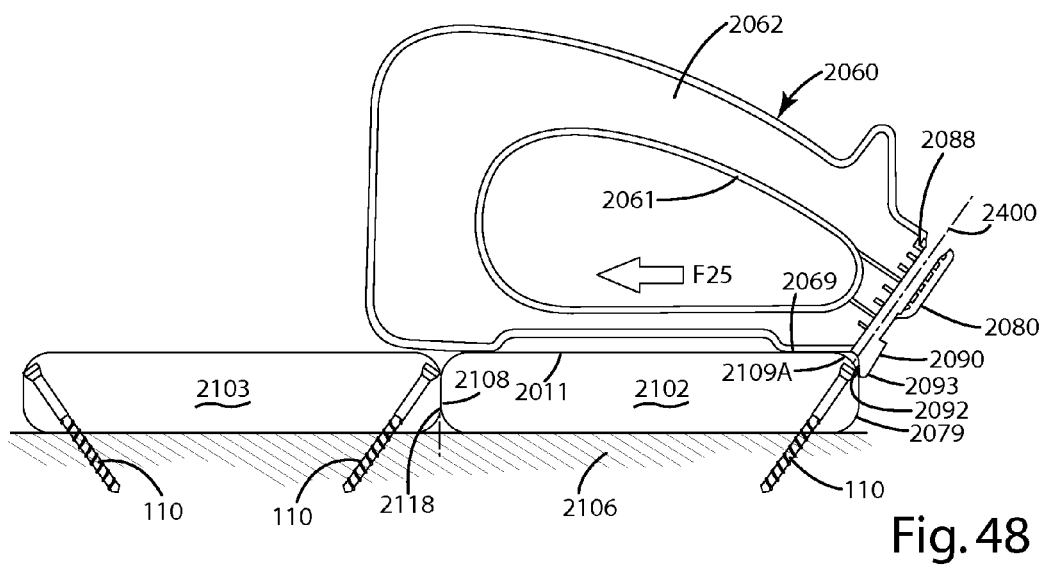
FIG. 48 is a side view of the sixth alternative embodiment of the fastener installation tool installing a fastener in the second work piece.
Figure 49:
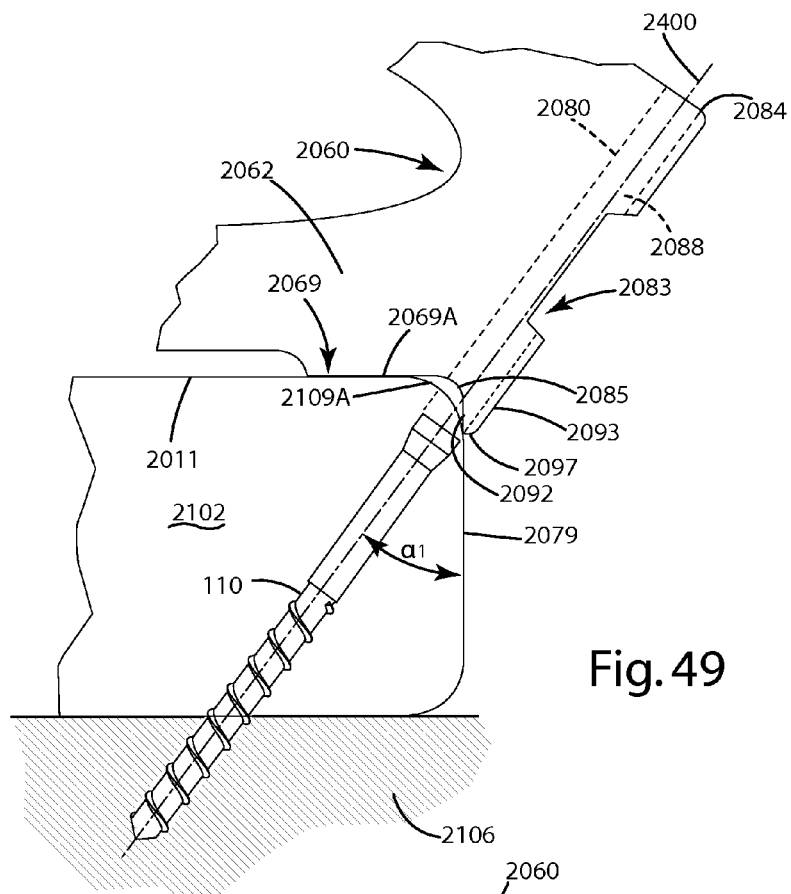
FIG. 49 is a close up view of the alignment projection of the sixth alternative embodiment of the fastener installation tool adjacent a first side of the second work piece.

With reference to FIGS. 47-49, a method for installing one or more boards, in the form of shrinkable boards, or other boards, with the installation tool 2060 will now be described. As shown in FIG. 47, a first board 2103 is first joined with a substructure 2106 with fasteners 110, or any other fasteners described herein or other conventional fasteners. These fasteners 110 can be installed at an angle, as described above, relative to the side surfaces of the board 2103 using the installation tool 2060, or at some other angle. For example, optionally, the board 2103 can be installed with the fasteners alternatively extending from the top surface of the board through the bottom surface, generally orthogonal to the board.

Figure 50:
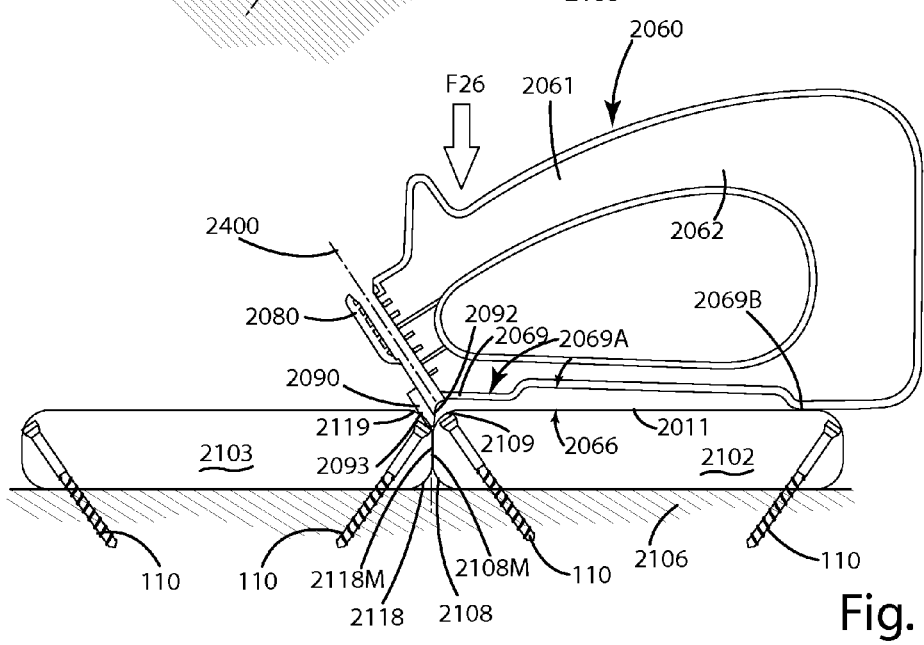
FIG. 50 is a side view of the sixth alternative embodiment of the fastener installation tool, rotated end for end relative to the configuration in FIG. 48, installing another fastener at a location where the first work piece and the second work piece abut one another.

With the first board 2103 installed, the second board 2012 is moved, generally in the direction 2101 toward the first board 2103. The second board 2102 is positioned so that the gap 2105 between the side surfaces 2118 and 2108 of the respective boards is closed along a substantial length, for example all the length, of the respective boards 2103 and/or 2102. The second board 2102 is moved adjacent the first board 2103 so that the first side surface 2118 engages and/or directly contacts the second side surface 2108 of the second board 2102. In this type of contact, there is substantially no gap between the respective first and second boards. Generally, the middle portions 2118M and 2108M of the respective first and second boards 2102 and 2103 directly engage or contact one another as shown in FIGS. 48, 50 and 51. In this engaging or contacting configuration, however, the board corners 2109 and 2119 can still be a distance from one another. Even though the board corners are distanced from one another, the boards are still considered to be positioned adjacent one another, directly engaging and/or contacting one another, so that there is no gap between the first and second boards.

Optionally, the movement of the second board 2102 can be either linear along the upper surface 2107 of the substructure 2106, as shown in FIG. 47, or alternatively the movement can include a combined pivoting and sliding motion. For example, the side surface 2108 of the second board 2102 can be placed adjacent the side surface 2118 of the first board 2103 with the second board 2102 generally at an angle of optionally about 20° to about 60° relative to the upper surface 2107 of the substructure 2106. The second board 2102 then can be moved or pivoted about its lowermost corner 2110 until it is positioned immediately adjacent the first board 2103 with the respective side surfaces 2108 and 2118 engaging or otherwise contacting one another.

In some cases, the shrinkable boards with which the installation tool 2060 is used may be warped, so that it is impossible to engage the respective first and side surfaces of adjacent boards in complete contact or in immediate adjacent engagement with one another along the entire lengths of the boards. In such cases, despite parts of the boards in warped regions not being in contact with one another, the boards and their respective side surfaces still may be considered to be in substantial engagement and/or contact with one another as those terms are used herein.

As shown in FIGS. 46 and 51, the respective outermost portions of the side surfaces 2108 and 2118, in particular, the middle portions 2118M and 2108M, can be aligned in parallel and can contact one another within the contact plane 2013. This contact plane can correspond with the region of contact between the immediately adjacent side surfaces of the first and second shrinkable boards 2102 and 2103.

A method of installing shrinkable or other boards using the tool 2060 is further shown in FIGS. 48-51. Referring to FIG. 48, the installation tool 2060 is positioned with its bottom surface 2069 engaging the upper surface 2011 of the second board 2102. The alignment projection 2090 is positioned so that its engagement surface 2092 generally engages and squarely faces the corner 2109A and/or the opposing side surface 2079, also referred to sometimes herein as the third side surface. In this configuration, the longitudinal axis 2400 of the bore 2088 is generally aligned with the corner 2109A and/or at least a portion of the side surface 2079. The user can exert a force F25 against the side surface 2079 through the handle 2061 and frame, ultimately through the alignment projection 2090.

Optionally, the inner engagement surface 2092 engages the corner 2109A and/or the side surface 2079, with that force being applied through that engagement surface to those respective features of the board 2102. This force F25 can move the second board 2102 into close contact or improved contact or engagement with first boards 2103, and optionally can provide improved engagement between the side surfaces 2108 and 2119 of these respective boards. The bottom surface 2069 of the tool 2060 can engage the upper surface 2011 of the second board 2102, and via friction between the bottom surface 2069 and the upper surface 2011, the force F25 on the installation tool 2060 can exert a further improved engagement or contact between the side surfaces of the respective boards.

With the second board 2102 forcibly pushed against the first board 2103 as shown in FIG. 48, and the respective side surfaces 2118 and 2108 sufficiently engaged and/or contacting one another, for example along their middle portions 2108M and 2118M, a fastener 110 can be advanced along the longitudinal axis 2400, through the second board 2102 and into the substructure 2106 in a manner as described in any of the embodiments described herein. With the board so installed, there effectively is no gap between the side surfaces of the first and second boards upon such installation.

With reference to FIG. 49, which is a close up of the fastener 110 being installed in the board 2102, the tool 2060 is configured so that the inner engagement surface 2092 is mounted against the upper most corner 2109A of the board 2102, and optionally engages at least a portion of the side surface 2079. In this configuration the bottom surface 2069, and more particularly the secondary bottom surface portion 2069A engages the upper surface 2011 of the work piece 2102. The longitudinal axis 2400 of the bore 2088 is aligned so that the fastener 110 advances along a trajectory that is generally at an angle α1 relative to the side surface 2079 of the work piece 2102. This angle α1 can be optionally about 30° to about 80°, further optionally about 40° to about 70°, and further optionally about 45° to 50° or other angles depending upon the precise configuration of the corner 2109 and the side surface 2079. Generally, in the configuration shown in FIG. 49, the outer engagement surface 2093 is outwardly disposed relative to the side surface 2079. Optionally, the engagement surface 2093 does not engage any other work pieces or boards during the advancing operation shown in FIG. 49 adjacent the side surface 2079 of the board opposite the first board 2103.

With the fastener 110 positioned and tacking down the second board 2102 near the second side surface 2079, the tool 2060 can be lifted so that the bottom surface 2069 disengages the upper surface 2011 of the board 2102. The installation tool 2060 can be rotated 180°, generally rotated end for end, and the bottom surface 2069 can again be placed atop the upper surface 2011 of the second work piece 2102. Upon such placement, the tool 2060 faces an opposite direction (FIGS. 50-51) relative to the previous installation procedure (FIG. 48). Depending on the profile of the alignment projection 2090, the bottom surface 2069 can mount flush with top surface 2011 of the work piece 2102 (FIGS. 46 and 52), or a portion of the bottom surface 2069A can remain a preselected distance 2066 above the top surface 2011, while a remaining portion 2069B engages another portion of the upper surface 2011 of the work piece 2102 (FIGS. 50 and 51).

As shown in FIGS. 46, 50, 51 and 52, the alignment projection 2090 does not establish a gap between the respective side surfaces 2118 and 2108, or the middle portions 2118M and 2108M, of the respective first and second boards 2013 and 2012. When a user applies a force F26, the alignment projection 2090 seats or wedges between the respective corners 2109 and 2119 of the work pieces, to align the longitudinal axis 2400 of the bore 2088 with a desired trajectory of the fastener 110. If a significant amount of force is exerted, the distance 2066 between the bottom surface 2069*a* of the tool and the side surface 2008 of the board 2102, atop which the tool 2060 is positioned, can be reduced to alter the angle of the longitudinal axis 2400 relative to the plane in which the upper surface 2011 of the work piece 2102 lays.

Optionally, where the alignment projection 2090 is wedged and between the corners 2109 and 2119, the alignment projection can be said to be generally positioned substantially within the region or crevice formed between the corners 2109 and 2119, but without extending below the crevice into a location adjacent or between the respective side surfaces of the first and second boards. Further optionally, the alignment projection can occupy the crevice between the upper board corners, but not a gap between the adjacent side surfaces of the boards.

With the alignment projection 2090 adequately wedged and between the corners 2109 and 2119, the fastener 110 can be advanced along the longitudinal axis 2400 through the corner 2109 and/or side surface 2108, further through the work piece 2102 and into the underlying substructure 2106 to secure the side of the board adjacent the side surface 2108 to the underlying substructure 2106. This process can be repeated multiple times along a particular side surface of a work piece, over and over, to securely fasten the work piece to the underlying substructure 2106.

A close-up view of the fastener advancement is shown in FIG. 51. There, as illustrated, the alignment projection 2090 is wedged between the corners 2109 and 2119 of the second work piece 2102 and the first piece 2103, respectively. The outer engagement surface 2093 and or terminal end 2097 specifically engages the corner 2119 of the first board 2103, while the inner engagement surface 2092 and or an opposing side of the terminal end engages the corner 2109 of the second board 2102. In this particular embodiment, due to the configuration of the corners and the alignment projection 2090 from the bottom surface 2069, the wedging action of the alignment projection 2090 does not enable the bottom surface 2069, and more particularly the bottom surface portion 2069A to directly engage the upper surface 2011 of the second work piece 2102.

For example, as shown in FIG. 51, the bottom surface portion 2069A is a distance 2066 from upper surface 2011 of the work piece 2102. Accordingly, the bottom surface 2069 is generally disposed at an angle β1 relative to the upper surface 2011 of the work piece 2102. This angle can vary, but generally can be between 0.1° and about 30°, further optionally about 1° and about 15°. This contrasts the orientation of the bottom surface 2069A/2069 shown in FIG. 49, where that bottom surface is generally coplanar with the upper surface 2011 of the board 2102. As shown in FIG. 51, the bottom surface 2069 is disposed at a different angle relative to the upper surface 2011 than the angle shown in FIG. 49 when the fastener is installed in the first corner 2109A and/or side surface 2079 of the work piece 2102, with the tool 2060 in a reverse orientation.

Optionally, the fastener shown in FIG. 49 can be installed with the bottom surface 2069 disposed at a first angle relative to the upper surface 2011 of the work piece 2102, generally coplanar with that surface, for example at a zero degree angle, while the second fastener shown in FIG. 51 can be installed on an opposite side of the board with the bottom surface 2069 disposed at a second, greater angle β1 relative to the upper surface 2011 of the board 2102.

FIG. 51 also illustrates the angle α2 along which the longitudinal axis 2400 is disposed relative to the side surface 2108 of the board 2102 into which the fastener 110 is advanced. The longitudinal axis 2400, and thus the trajectory of the fastener 110, is disposed at an angle α2 relative to the side surface 2108. That angle of advancement, relative to the side surface 2108 and/or the longitudinal axis 2400 relative to the side surface, is generally less than the corresponding angle α1 shown in FIG. 49. Again, this is because the tool 2060 has been shifted upward by engagement of the alignment projection 2090 wedging between the corners 2119 and 2109. The angle α2 can be less than angle α2 by about 1° to about 20°, further optionally about 2° to about 8°. Depending on the particular application, the relative difference between angle α1 and angle α2 on the opposite sides of the board 2102 can vary as desired.

As further shown in FIG. 51, the outer engagement surface 2093 and or terminal end 2097 engages the uppermost corner 2119 of the installed first work piece 2103. It is this engagement that generally sets or establishes the trajectory, or line of advancement of the fastener, or generally orients the longitudinal axis 2400 of the bore relative to the corner 2109 and/or side surface 2108 of the second board.

Figure 52:
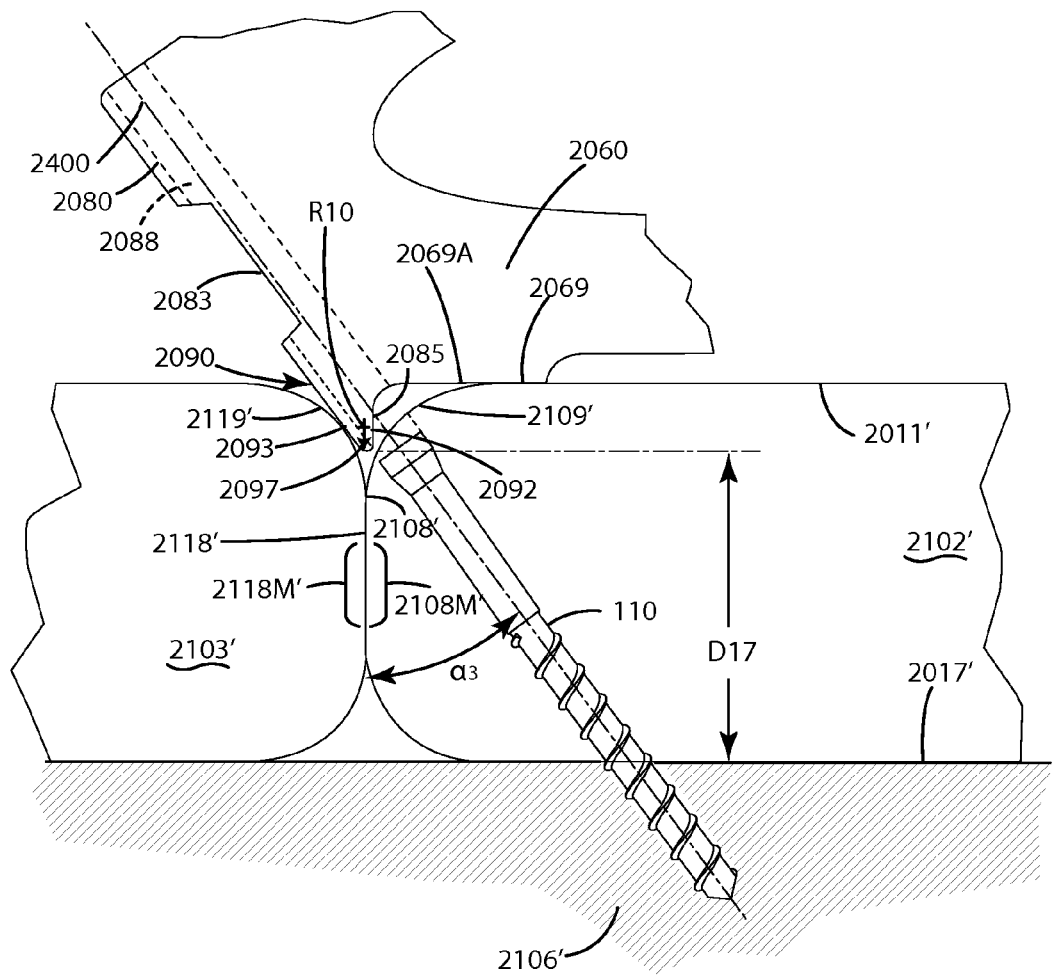
FIG. 52 is a close up view of the alignment projection of the sixth alternative embodiment of the fastener installation tool wedging between alternative work pieces having large radius corners.

The engagement of the outer engagement surface 2093, and/or terminal end 2097 of the alignment projection 2090, with the boards can vary depending on the particular profile of the corners 2119 and/or 2109. For example, as shown in FIG. 52, the corners 2119' and 2109' of the first work piece 2103' and second work piece 2102' are of a greater/larger radius than the corners 2119 and 2109 of the work pieces in FIG. 51. In turn, the distance between these corners 2109' and 2119' is generally greater, however, no gap is formed between the respective side surfaces 2108' and 2118' or more particularly the middle portions 2108M' and 2118M'. The alignment projection 2090 extends downwardly into the area established between the respective corners 2119' and 2109'. The bottom surface 2069, and more particularly the bottom surface portion 2069A adjacent the alignment projection 2090, engages the upper surface 2011' of the board 2102'. In turn, this ensures that the fastener 110 is advanced into the board at a lower location on the side of the board 2102'.

For example, as shown in FIG. 52, the fastener 110 is advanced and enters the board 2102' generally at a distance D17 from the bottom surface 2017' of the second board 2102'. This is due to the larger radius of the corner 2119' and the alignment projection 2090 being able to be disposed further into the crevice or region between the respective corners 2119' and 2109'. This contrasts the greater distance between the point of entry of the fastener 110 shown in FIG. 51. There, the fastener 110 enters the second board 2102 at a distance D16, which is greater than the distance D17 in FIG. 52, because the alignment projection 2090 cannot extend sufficiently downward into the area between the respective corners 2119 and 2109. The alignment projection 2090 interferes and wedges against those corners, preventing the bottom portion 2069A from engaging the upper surface 2011 of the second board 2102. Thus, the profile of the alignment projection 2090 of the installation tool 2090, and more particularly the configuration of the outer engagement surface 2093, can influence the height at which the fastener is advanced into the corner and/or side surface of the board relative to the bottom surface of the board.

The profile of the board and/or the profile of the alignment projection 2090 also can influence the angle at which the fastener 110 is advanced relative to the side surface 2108 of the board 2102. For example, again referring to FIG. 52, with the larger radiused corners 2119' and 2109' of the boards 2103' and 2102', the angle α3 between the respective longitudinal axis 2400 of the angled bore (which also corresponds to the trajectory or line of advancement of the fastener 110) is offset relative to the side surface 2108' of the second board 2102'. Generally, that angle α3 can correspond to or can be equal to the angle α1 (FIG. 49) such that the angles of the advanced fasteners relative to the respective side surfaces are about the same or equal.

This contrasts the geometries shown in FIG. 51, where the alignment projection 2090 wedged between the corners results in the bottom surface 2069 being raised a distance 2066 and at an angle β1 relative to the top surface 2011. There, the angle of advancement and the longitudinal axis 2400 is offset from the side surface at angle α2, which is different from angle α1 in FIG. 49. In comparing FIGS. 49 and 51, when the tool 2060 is used to advance a first fastener into the second board 2102 having a relatively small radius inside corner, that first fastener in a first side of the second board 2102 is advanced at a first angle α1. However, a second fastener advanced in a second, opposite side of the second board 2102, is advanced at a second, different, and generally smaller angle α2. Where, however, the radii of the corners of the boards are larger, like that shown in FIG. 52, the advancement of the first fastener in one side surface of the board 2079 (FIG. 49) is at an angle α1, and that angle α1 is generally the same or equal to an angle α3 at which another fastener 110 is advanced adjacent the opposite side surface 2108', as shown in FIG. 52.

Optionally, the distance from the lower surface of the board, where the fastener 110 enters the respective corners and/or side surfaces of the board, can vary depending on the size of the radii of the respective corners of the board, and/or can vary depending on the distance that the alignment projection 2090 extends from the bottom surface 2069 of the tool 2060. Depending on the particular application, desired angle of advancement of the fastener, and the board to be fastened, the alignment projection and tool can be specifically configured to provide the desired fastening capabilities and advancement of the fasteners. Further optionally, the engagement of the outer engagement surface 3093 and/or terminal end 3097 with the corner 3119 of the first work piece, which may already be secured to the substrate with a fastener, can affect the depth or distance downward from the upper surface 2011 at which the fastener is advanced. This engagement can also affect the angle α3 at which the fastener is advanced into the board.

After the fastener 110 fastens down the work piece adjacent the side surface 2108, regardless of the configuration of the tool or board, that side surface 2108 is in substantial engagement and/or contact with the side surface 2118 of the first board 2103. In other words, there is no gap established between these respective side surfaces 2108 and 2118, other than the distance between the corner 2109 and 2119 and/or 2110 and 2111 (FIGS. 46, 50, 51). Of course, with shrinkable boards, after time, those boards can dry and reduce in dimension as noted above. As they dry over a period of one week to three months, a gap can start to form between the work pieces 2103 and 2102, and in particular the side surfaces and/or middle portions of the work pieces.

The above process of installing a second board adjacent a first board, engaging the side surface of the first board with the second board so that they remain substantially engaged and/or be in contact along the length of the board, while fastening an opposing side of the second board so that no gap is established between the opposing first side of a board, and then adjusting the tool to guide another fastener 110 into the side of the second board adjacent the first board can be repeated multiple times with multiple boards to produce a deck or flooring structure.

XI. Seventh Alternative Tool and Method Embodiment

A seventh alternative embodiment of the fastener installation tool and related method is illustrated in FIGS. 53-56 and generally designated 3060. This embodiment, like that of the sixth alternative embodiment above can be well suited for use with shrinkable or other types of boards as described herein. The installation tool shown there is similar in construction and operation to the embodiments described above with several exceptions.

Figure 53:
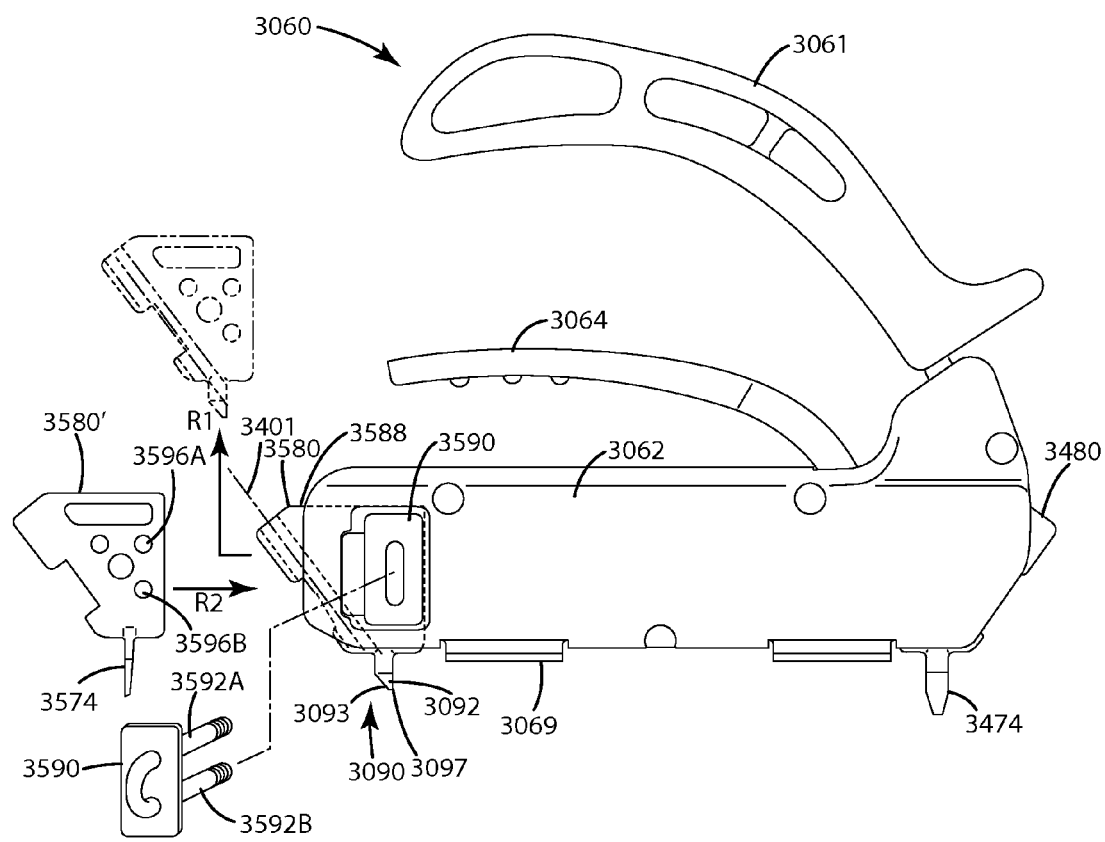
FIG. 53 is a side view of a seventh alternative embodiment of the fastener installation tool, illustrating replaceable alignment guides and an adjustment mechanism.

For example, as shown in FIG. 53, the installation tool 3060 includes a frame 3062 including a handle 3061 and first and second guides 3480 and 3580 at opposite ends of the frame. The installation tool can include a secondary handle 3064 that can move the guide 3580 similar to that in the second alternative embodiment above, shown in FIGS. 27-30, to provide a clamping effect on a board located adjacent the tool, for example, to clamp the board between a spacer and an alignment projection as described below.

The guide 3480 and respective spacer 3474 can be similar to the guide 480 and spacer 474 shown in figures of the second alternative embodiment. The opposing guide 3580 can generally be similar to the guide 580 in that embodiment as well with several distinctions. For example, instead of including a spacer 3574, the guide 3580 can include an alignment projection 3090. This alignment projection can include an inner engagement surface 3092 and an opposing outer engagement surface 3093 that are structured and function generally the same as that of the sixth alternative embodiment above. Indeed, the geometric configurations and angles between these respective surfaces can be identical to that of the sixth alternative embodiment described above if desired. For example, the inner engagement surface 3092 can define an opening through which a fastener exits to enter a board. That surface 3092 can be substantially planar and can be on the opposite side of the alignment projection 3090 from the other substantially planar outer engagement surface 3093. The two engagement surfaces can be joined and transition to one another via the terminal end 3097. As shown, this terminal end 3097 can also have the same function and configurations as those of the terminal end of the sixth alternative embodiment.

Optionally, all of the descriptions and features of the alignment projection in this embodiment, and its orientation, as well as its engagement with different features of shrinkable boards and/or work pieces are the same as those of the alignment projection of the sixth alternative embodiment of the installation tool 3060.

The installation tool 3060 as shown in FIG. 53 can also include an adjustment mechanism 3590 similar to that described in connection with the second alternative tool embodiment above. For example, the first adjustment mechanism 3590 can include stopper pins 3592A and 3592B. These respective stopper pins can be inserted through respective stopper pin holes 3596A and 3596B of a guide to hold the guide in place. As with the embodiments above, the guide 3580 can be removed and/or replaced for service or change out of the alignment projection 3090 for a spacer 3574. The spacer, unlike the alignment projection, can be configured to extend between the sides of boards and establish a gap therebetween as a fastener is installed using the installation tool 3060.

Optionally, the guides of the tool can be interchangeable so a first guide having a first alignment projection can be exchanged for a another guide having a differently shaped alignment projection or spacer that extends a different distance from the frame bottom surface than the first alignment projection. This can enable the same tool to be used with different types of boards, or to work in a particular manner to set particularly sized gaps or no gap between shrinkable boards upon installation.

Returning to FIG. 53, to remove or replace the guides, the adjustment mechanism 3590 can be removed from the guide 3580 by removing the stopper pins 3592A and 3592B from corresponding stopper pin holes of the guide. The guide is then removed in direction R1. The replacement guide 3580' can be replaced in the same position in the frame 3062 in direction R2. With the second guide 3580' in position, the respective stopper pins 3592A and 3592B can be installed so that they project through the stopper pin holes 3596A and 3596B. The adjustment mechanism 3590 can be resecured to the frame to hold the replaced second guide 3580' block in position relative to the frame 3062.

Figure 54:
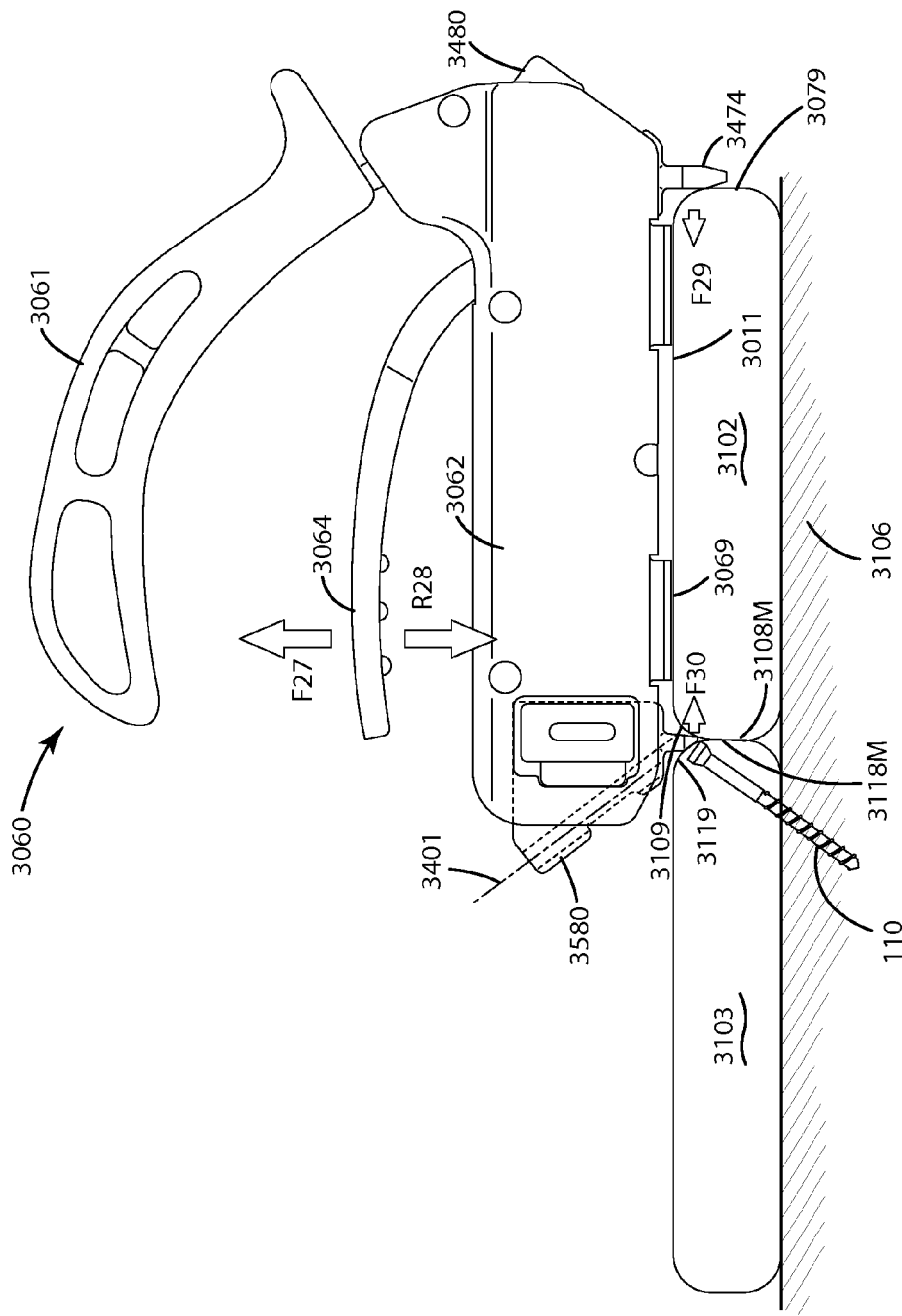
FIG. 54 is a side view of the seventh alternative embodiment of the fastener installation tool adjacent work pieces.

Operation of the installation tool 3060 in the seventh alternative embodiment will be described in more detail with reference to FIGS. 54-56. Generally, the installation and engagement of the alignment projection 3090 with the respective components of the boards is similar to that of the sixth alternative embodiment described above with a few exceptions. For example, as shown in FIG. 54, the installation tool 3060 is positioned over a second shrinkable board 3102 that is placed adjacent the first shrinkable board 3103, generally with no gap being located between the first and second shrinkable boards. The respective side surfaces 3118 and 3108 engage and abut one another and specifically, the middle portions 3108M and 3118M engage and abut one another so that substantially no gap is established between the side surfaces of the first and second shrinkable boards 3103 and 3102. Of course, where other types of boards are used, the same procedure for operating the installation tool can be implemented if appropriate.

As noted above, the tool 3060 is similar to that of the second alternative embodiment tool, so the alignment projection 3090 and spacer 3074 can be separated a distance by exerting a force counter to an internal bias member. This can be effected by pulling the second handle 3064 in direction F27. The alignment projection 3090 can be placed between the first corner 3119 of the first board 3103 and the second corner 3109 of the second board 3102, with the spacer 3474 positioned adjacent a third side 3079 of the second shrinkable board 3102. The bottom surface 3069 of the tool 3060 can rest on, or at least be adjacent, the upper surface 3011 of the second work piece 3102 as described in the sixth alternative embodiment above. The tool can be operated to release the handle in direction R28, which in turn enables the bias member to effect a clamping force via forces F29 exerted by spacer 3474 on the third side 3079 and F30 exerted by the alignment projection 3090 on the corner 3109 and/or side 3108.

Figure 55:
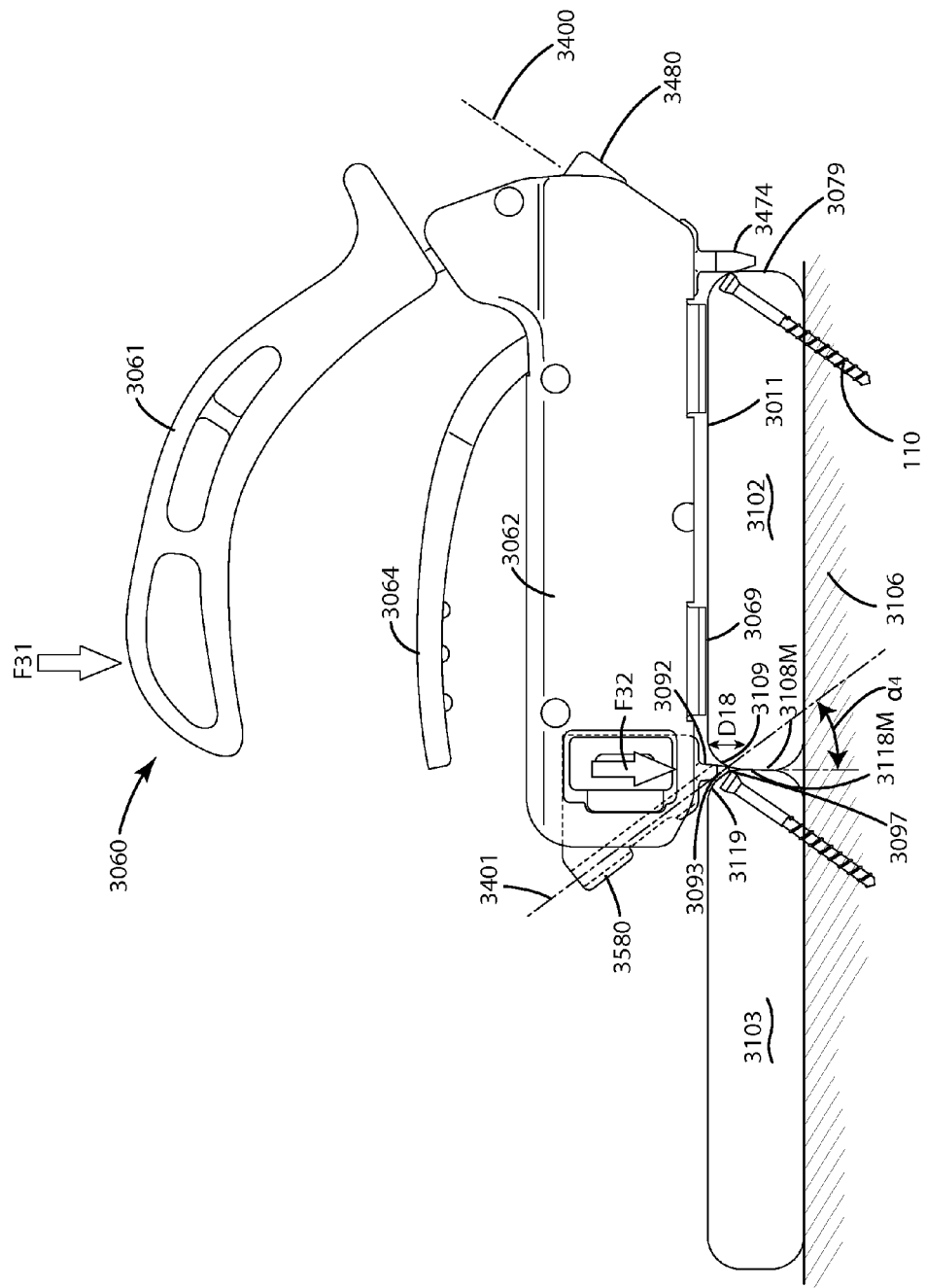
FIG. 55 is another side view of the seventh alternative embodiment of the fastener installation tool including a fastener installed through a corner or side surface of a work piece.
Figure 56:
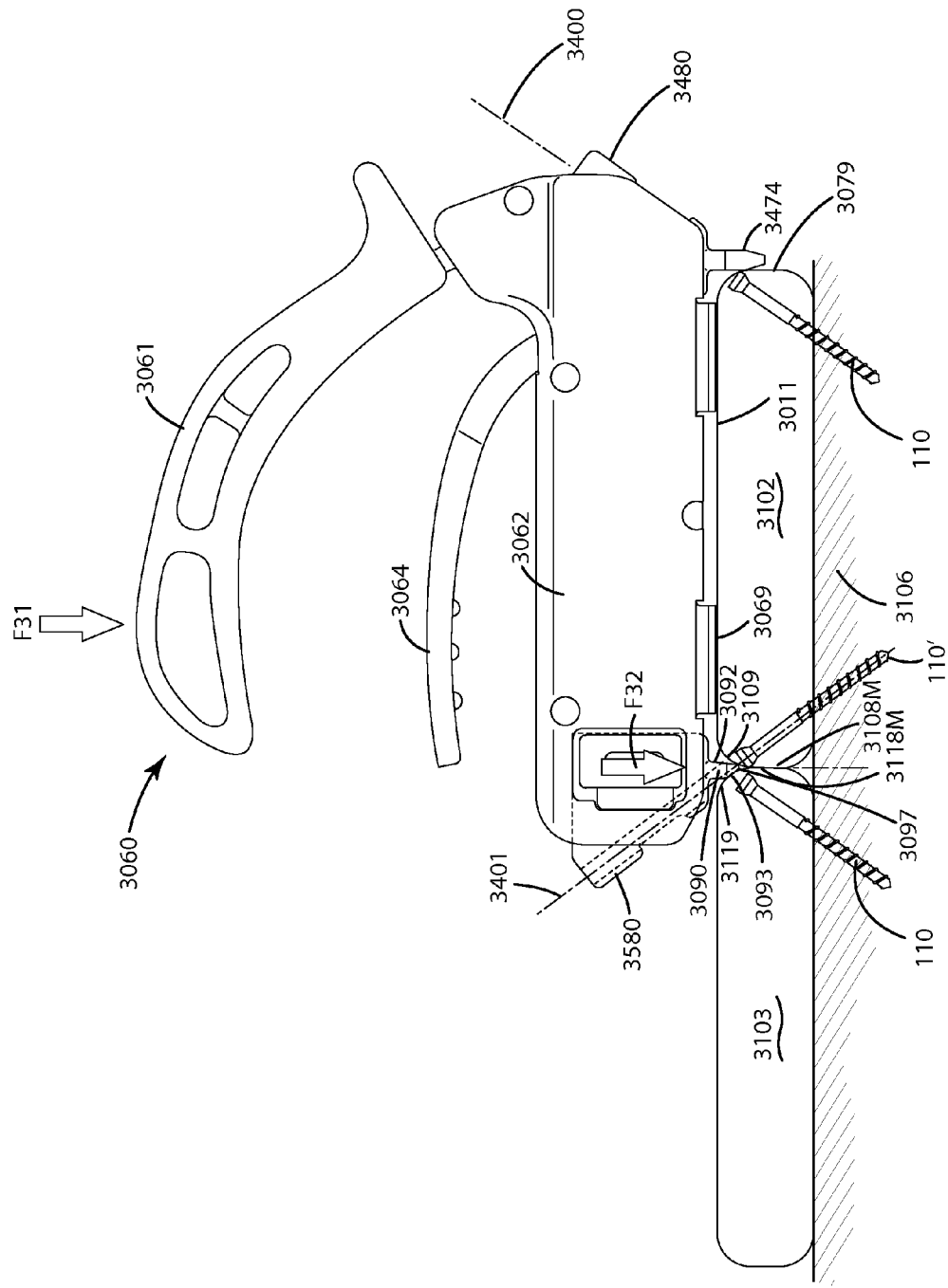
FIG. 56 is a yet another side view of the seventh alternative embodiment of the fastener installation tool with another fastener installed in another corner or side surface of the work piece.

With the tool clamped in place, as shown in FIG. 55, the fastener 110 can be installed in the guide 3480 and advanced along a bore axis 3400 into the side surface 3079 of the third opposing side of the second board 3102. The advancement can continue until the board 3102 is satisfactorily secured to the substrate 3106.

Optionally, the installation tool 3060 can then be adjusted by pulling again on the handle 3064 with force F27 to reduce the clamping forces on the board 3102, then pushing downward with force F31 as shown in FIG. 55 to further drive the alignment projection 3090 into the crevice or region between the first 3119 and second 3109 corner. This force can be translated to a more localized force F32 through the alignment projection, again to drive the projection into the crevice or region between the respective upper corners of the respective boards. This can be done to overcome any shifting in the tool while the fastener was driven into the third opposing side 3079. It also can be done to precisely engage the outer engagement surface 3093 against the first corner 3119, which in turn can set the appropriate depth D18 down the corner and/or sidewall at which the fastener will be advanced into the same. Generally, this adjustment can set the angle α4 at which the axis 3401 is set as well. Optionally, this angle can be the same as the angles α2 and α3 as discussed above.

With the outer engagement surface properly set and engaged with the corner 3119, and the alignment projection generally in position between the corners, the handle 3064 can be released to exert a clamping force on the second shrinkable board 3102 as described above. Another fastener 110' is installed in the second opposing guide 3580 and advanced generally along the longitudinal axis 3401 of the guide into the second opposing side 3108 and/or second corner 3109 of the second board 3102. As described above and with the sixth alternative embodiment, the depth of the screw and/or the height at which it is installed in the corner 3109 or side surface 3108 of the second shrinkable board 3102 can be established by virtue of the engagement of the outer engagement surface 3093 with the first corner 3119 of the first board 3103. Likewise, the respective angles of advancement can also be established in similar manners to that as the sixth alternative embodiment above.

During the advancement of the fastener 110' at an angle through the second shrinkable board, the first side surface 3118 and second side surface 3108 are maintained in contact with one another. Further, immediately after the advancing and installation of the fasteners, these side surfaces remain in contact with one another as with the sixth alternative embodiment above. After the fasteners are installed, the tool can be moved along the second shrinkable board 3102 to install another set of fasteners in a similar fashion. This process can be repeated along the entire length of the board until the board is satisfactorily joined with the substructure 3106.

The above description is that of current embodiments. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of installing a fastener comprising:
   providing an installation tool including a handle, a frame, a guide defining an angled bore configured to accommodate and constrain a rotating fastener, and an alignment projection extending downwardly from the frame;
   providing a first shrinkable board including a first side surface, a first upper surface and a first lower surface;
   placing a second shrinkable board adjacent the first shrinkable board, the second shrinkable board including a second side surface, a third opposing side surface that is opposite the second side surface, a second upper surface and a second lower surface;
   engaging the first side surface of the first shrinkable board against the second side surface of the second shrinkable board so that the first side surface and the second side surface contact one another with no gap established between the first side surface and the second side surface;

placing a first fastener in the angled bore;

positioning the frame so that the frame contacts the second upper surface, and the angled bore adjacent the third opposing side surface of the second shrinkable board;

advancing and rotating the first fastener at an angle through the second shrinkable board while maintaining the first side surface of the first board in contact with the second side surface of the second shrinkable board;

positioning the alignment projection between a first corner of the first shrinkable board and a second corner of the second shrinkable board, but without establishing a gap between the respective first side surface and second side surface of the respective first and second shrinkable boards with the installation tool; and advancing and rotating a second fastener through the second shrinkable board with the first and second side surfaces of the respective first and second shrinkable boards remaining engaged in contact with one another during said advancing of the second fastener, wherein the positioning step includes wedging the alignment projection between and adjacent the first corner and the second corner, respectively, without the alignment projection extending downwardly beside the first and second side surfaces, wherein the alignment projection includes an inner engagement surface and an outer engagement surface disposed downwardly at a preselected angle relative to one another, wherein the outer engagement surface is configured to engage the first corner of the first board to establish a distance below the second upper surface at which the angled bore is positioned to advance the second fastener into the second shrinkable board, wherein the first and second shrinkable boards form part of a deck that is subject to exposure to the environment.

2. The method of claim 1 comprising rotating the tool about 180° after said advancing the first fastener step but before said advancing the second fastener step.

3. The method of claim 1 comprising positioning the alignment projection adjacent the third opposing side surface of the second shrinkable board and pushing the second shrinkable board toward the first shrinkable board to ensure contact between first side surface and second side surface of the respective first and second shrinkable boards.

4. The method of claim 1 wherein the alignment projection is wedged a preselected distance between the opposing first and second corners so that the frame is disposed at an angle from the second upper surface of the second shrinkable board, and so that a portion of the frame adjacent the alignment projection is positioned a preselected distance above and out of contact with the second upper surface of the second shrinkable board, while another portion of the frame remains in contact with the second shrinkable board.

5. The method of claim 1 wherein the outer engagement surface is substantially parallel to the angled bore.

6. The method of claim 5,
wherein the inner engagement surface engages the second corner of the second shrinkable board when the alignment projection is positioned between a first corner of the first shrinkable board and a second corner of the second shrinkable board,
wherein the inner engagement surface transitions to the outer engagement surface at a rounded terminal end.

7. The method of claim 5 wherein the inner engagement surface is disposed at an angle of from about 10° to about 90° relative to the outer engagement surface.

8. The method of claim 1 wherein the alignment projection extends downwardly adjacent the first and second corners without extending to the respective first side surface of the first shrinkable board in contact with the second side surface of the second shrinkable board during said advancing steps.

9. A method of installing a fastener comprising:
providing an installation tool including a handle joined with a frame having a frame bottom surface, a guide defining an angled bore, and an alignment projection extending downwardly away from the frame;

placing the installation tool atop a second board that is laying immediately adjacent and contacting the first board so that the frame contacts the second board; wedging the alignment projection between a first corner of the first board and a second corner of the second board without breaking contact between the second board and the first board, so that no gap is established between a first side surface of the first board and an adjacent second side surface of the second board, and without the alignment projection extending downwardly beside the first and second side surfaces;

advancing and rotating a first fastener through at least one of the second corner and the second side surface of the second board, with the second side surface maintained in contact with the first side surface immediately after installation of the first fastener, wherein the alignment projection includes an outer engagement surface and an inner engagement surface that are non-parallel with one another, wherein the outer engagement surface engages the first corner of the first board to establish a trajectory of the first fastener as the first fastener is advanced through at least one of the second corner and the second side surface of the second board, wherein the first and second boards form part of a structure that is subject to exposure to the environment.

10. The method of 9 wherein the first outer engagement surface is substantially parallel for the angled bore.

11. The method of claim 9 wherein the alignment projection is generally in the shape of a triangle when viewed from a side view and includes a rounded terminal end that at least one of abuts and is adjacent the second corner of the second board during the wedging step.

12. The method of claim 9 comprising advancing a second fastener adjacent a third opposing side surface of the second board at a first angle that is different from a second angle at which the first fastener is advanced.

13. The method of claim 9 wherein the alignment projection wedges against at least one of the first and second corners so as to prevent the frame bottom surface from engaging a portion of an upper surface of the second board adjacent the alignment projection.

14. A method of installing a fastener comprising:
providing an installation tool including a frame having a frame bottom surface, a guide defining an angled bore, and an alignment projection extending downwardly away from the frame, the alignment projection including an inner engagement surface and an outer engagement surface, with an exit opening defined by the alignment projection;

engaging the installation tool against a second board that is laying immediately adjacent and contacting a first board so as to assist in aligning the alignment projection with a crevice between a first corner of the first board and a second corner of the second board;

wedging the alignment projection in the crevice between the first corner of the first board and a second corner of the second board without breaking contact between the second board and the first board, so that no gap is established between a first side surface of the first board and an adjacent second side surface of the second board; and rotating a fastener so that it advances through at least one of the second corner and the second side surface of the second board, with the second side surface maintained in contact with the first side surface immediately after installation of the fastener, wherein the rotation of the fastener and advancement through the at least one of the second corner and the second side surface of the second board causes the fastener to remove material from a hole pre-bored with the fastener, whereby the likelihood of damaging or splitting the at least one of the second corner and the second side surface of the second board is reduced.

15. The method of claim 14 wherein the alignment projection includes an outer engagement surface and an inner engagement surface that are non-parallel with one another, wherein the outer engagement surface engages the first corner of the first board to establish a trajectory of the first fastener as the first fastener is advanced through the at least one of the second corner and the second side surface of the second board, wherein the first and second boards form part of a structure that is subject to exposure to the environment.

16. The method of claim 15, wherein the inner engagement surface engages the second corner of the second board and the outer engagement surface engages the first corner of the first board during said wedging, wherein the frame engagement of the upper surface of the second board, the inner engagement surface engaging the second corner, and the outer engagement surface engaging the first corner align a longitudinal axis of the angled bore at an angle of about 40° to about 60° relative to the second side surface.

17. The method of claim 14 wherein the frame engages an upper surface of the second board during said engaging and said wedging.

18. The method of claim 14 wherein the alignment projection wedges against at least one of the first and second corners so as to prevent a first portion of the frame bottom surface from engaging a portion of an upper surface of the second board adjacent the alignment projection, and so as to allow a second portion of the frame bottom surface to contact and engage the second board distal from the alignment projection during said wedging.

* * * * *